United States Patent
Gukal et al.

(10) Patent No.: US 9,985,988 B2
(45) Date of Patent: May 29, 2018

(54) DECEPTION TO DETECT NETWORK SCANS

(71) Applicant: Acalvio Technologies, Inc., Cupertino, CA (US)

(72) Inventors: Sreenivas Gukal, Santa Clara, CA (US); Vaishali Palkar, San Jose, CA (US); Linh Do, Santa Clara, CA (US)

(73) Assignee: ACALVIO TECHNOLOGIES, INC., Cupertino, CA (US)

(*) Notice: Subject to any disclaimer, the term of this patent is extended or adjusted under 35 U.S.C. 154(b) by 0 days. days.

(21) Appl. No.: 15/488,387

(22) Filed: Apr. 14, 2017

(65) Prior Publication Data

US 2017/0353491 A1 Dec. 7, 2017

Related U.S. Application Data

(60) Provisional application No. 62/344,267, filed on Jun. 1, 2016.

(51) Int. Cl.

| | |
|---|---|
| *G06F 11/00* | (2006.01) |
| *H04L 29/06* | (2006.01) |
| *G06F 21/55* | (2013.01) |
| *H04L 12/751* | (2013.01) |
| *H04L 12/26* | (2006.01) |

(Continued)

(52) U.S. Cl.
CPC ........ *H04L 63/1491* (2013.01); *G06F 21/552* (2013.01); *H04L 41/12* (2013.01); *H04L 43/50* (2013.01); *H04L 45/02* (2013.01); *H04L 63/145* (2013.01); *H04L 63/1408* (2013.01)

(58) Field of Classification Search
CPC .............. H04L 63/1416; H04L 63/145; H04L 63/1491; H04L 41/12; H04L 43/50; H04L 45/02; H04L 45/22; H04L 63/0428; H04L 63/10; H04L 63/1408; H04L 63/1441; G06F 21/552

See application file for complete search history.

(56) References Cited

U.S. PATENT DOCUMENTS

| | | | |
|---|---|---|---|
| 8,713,306 B1* | 4/2014 | Bennett | H04L 63/1491 370/252 |
| 9,356,942 B1* | 5/2016 | Joffe | H04L 63/1408 |

(Continued)

*Primary Examiner* — Gary S Gracia
(74) *Attorney, Agent, or Firm* — Kilpatrick Townsend & Stockton LLP

(57) ABSTRACT

Provided are systems, methods, and computer-program products for using deceptions to detect network scans. In various implementations, a network device, configured as a decoy network device can be configured to determine a particular network address. The network device can determine that the particular network address is unassigned. The network device can configure itself with the particular network address, wherein the network device uses the particular network address to monitor network activity for a network scan. The network device can receive a packet addressed to the particular network address. The network device can determine that received packet is associated with a scan of the network, including associating the received packet with other packets in the monitored network activity. The network device can configure one or more security settings for the network when the received packet is determined to be associated with a scan of the network.

30 Claims, 25 Drawing Sheets

(51) Int. Cl.
*H04L 12/24* (2006.01)
*G06F 12/14* (2006.01)

(56) References Cited

U.S. PATENT DOCUMENTS

| | | | |
|---|---|---|---|
| 2004/0078592 A1* | 4/2004 | Fagone | H04L 63/0272 726/22 |
| 2004/0103314 A1* | 5/2004 | Liston | H04L 63/1408 726/23 |
| 2004/0172557 A1* | 9/2004 | Nakae | H04L 63/0227 726/22 |
| 2006/0101515 A1* | 5/2006 | Amoroso | H04L 29/12009 726/23 |
| 2008/0098476 A1* | 4/2008 | Syversen | H04L 63/0227 726/23 |
| 2008/0163354 A1* | 7/2008 | Ben-Shalom | H04L 63/1441 726/12 |
| 2012/0311691 A1* | 12/2012 | Karlin | H04L 63/0236 726/12 |
| 2014/0096229 A1* | 4/2014 | Burns | H04L 63/1491 726/15 |
| 2014/0101724 A1* | 4/2014 | Wick | H04L 63/1491 726/4 |
| 2015/0121529 A1* | 4/2015 | Quinlan | H04L 63/1491 726/23 |

* cited by examiner

DECEPTION TO DETECT NETWORK SCANS

CROSS-REFERENCES TO RELATED APPLICATIONS

This application claims the benefit of and priority to U.S. Provisional Application No. 62/344,267, filed on Jun. 1, 2016; which is incorporated herein by reference in its entirety.

BRIEF SUMMARY

Network threats, such a hackers and malware, often conduct scans of a target network to obtain intelligence about the network. A network scan can systematically test nodes in a network, and obtain information about each node. Such information can include, for example, which Internet Protocol (IP) addresses are presently in use in the network, the Media Access Control (MAC) addresses associated with each active IP address, available Transmission Control Protocol (TCP) and Uniform Datagram Protocol (UDP) services running on each device in the network, the operating system being used by devices in the network, and/or any network security filtering that is between the devices in the network and the system from which the scan is being launched.

Network administrators have access to a suite of tools that can be used to scan a network for legitimate purposes. For example, network administrators may scan a network for security assessments and system maintenance, among other reasons. These same tools, however, can also be used by network threats. Thus, determining that an unexpected scan has occurred can be defense against an impending attack.

Provided are systems, methods (including computer-implemented methods), and computer-program products for using deceptions to detect network scans. In various implementations, a network device on a network can be configured to determine a particular network address. The network device can configured as a decoy network device. A decoy network device monitors network activity and does not participate in network activity. The network device can further be configured to determine that the particular network address is unassigned. A network address is unassigned when the network address is not currently participating in the network activity, and packets addressed to an unassigned network address are not expected to be received. The network device can further be configured to configure the network device with the particular network address, wherein the network device uses the particular network address to monitor network activity for one or more network scans. The network device can further be configured to receive a packet addressed to the particular network address. The network device can further be configured to determine that received packet is associated with a scan of the network. Determining that the received packet is associated with a scan of the network can include associating the received packet with one or more other packets in the monitored network activity. The network device can further be configured to configure one or more security settings for the network when the received packet is determined to be associated with a scan of the network.

In various implementations, the network device can further be configured to determine a pattern of packets. The pattern can be determined from the monitored network activity. The pattern of packets can include a series of network addresses. Associating the received packet with the other packets can includes determining that the particular network address is associated with the series of network addresses.

In various implementations, the network device can further be configured to receive a second packet addressed to a second network address. The second network address can be associated with a non-decoy network device on the network. The second packet can be a broadcast packet. The network device can further be configured to determine that the second packet is associated with the scan of the network. Determining that the second packet is associated with the scan of the network can include determining that the second packet is associated with a pattern of packets that includes the received packet.

In various implementations, the network device can further be configured to generate a response packet using the received packet, and transmit the response packet onto the network.

In various implementations, the network device can further be configured to transmit contents of the received packet using another network address. The other network address can be associated with a non-decoy network device on the network. The network device can further be configured to receive a response packet, and use the response packet to respond to the unexpected packet.

In various implementations, the network device can further be configured to determine a pattern of packets. The pattern can be determined from the monitored network activity, and the pattern of packets can includes a series of network addresses. The network device can further be configured to determine a second unassigned network address. The second unassigned network address can be associated with the series of network addresses, and the pattern of packets does not include a packet addressed to the second unassigned network address. The network device can further be configured to configure the network device with the second unassigned network address.

In various implementations, the network device can further be configured to determine, using the monitored network activity, that the scan of the network has concluded. The network device can further be configured to configure the network device to stop using the particular network address.

In various implementations, the network device can further be configured to maintaining a list of network addresses. The list of network addresses can include assigned and unassigned network addresses. The particular network address can be determined using the list of network addresses.

In various implementations, the network device can further be configured to receive data associated with another decoy network device. The data can include additional monitored network activity. The network device can further be configured to determine that one or more packets in the additional network activity are associated with the scan of the network.

In various implementations, the network device can further be configured to receive data associated with a non-decoy network device on the network. The network device can further be configured to determine, using the data, that a network connection was made to the non-decoy network device, wherein the network connection is associated with the scan of the network.

In various implementations, the network device can further be configured to determine a category for the network connection. The category can be determined using a network protocol associated with the connection.

In various implementations, the network device can further be configured to determine a category for the network connection, where the category can be determined using a port number associated with the connection.

In various implementations, the network device can further be configured to determine that a second network connection was made to another network device on the network. The network device can further be configured to determine a category for the network connection and the second network connection, where the category is determined using a time interval between the connection and the second connection.

In various implementations, the network device can further be configured to transmit the one or more security settings. When a security setting is received at another network device on the network, the security setting can facilitate defending the other network device from a network threat associated with the scan of the network.

BRIEF DESCRIPTION OF THE DRAWINGS

Illustrative embodiments are described in detail below with reference to the following figures.

DETAILED DESCRIPTION OF THE INVENTION

Figure 1:
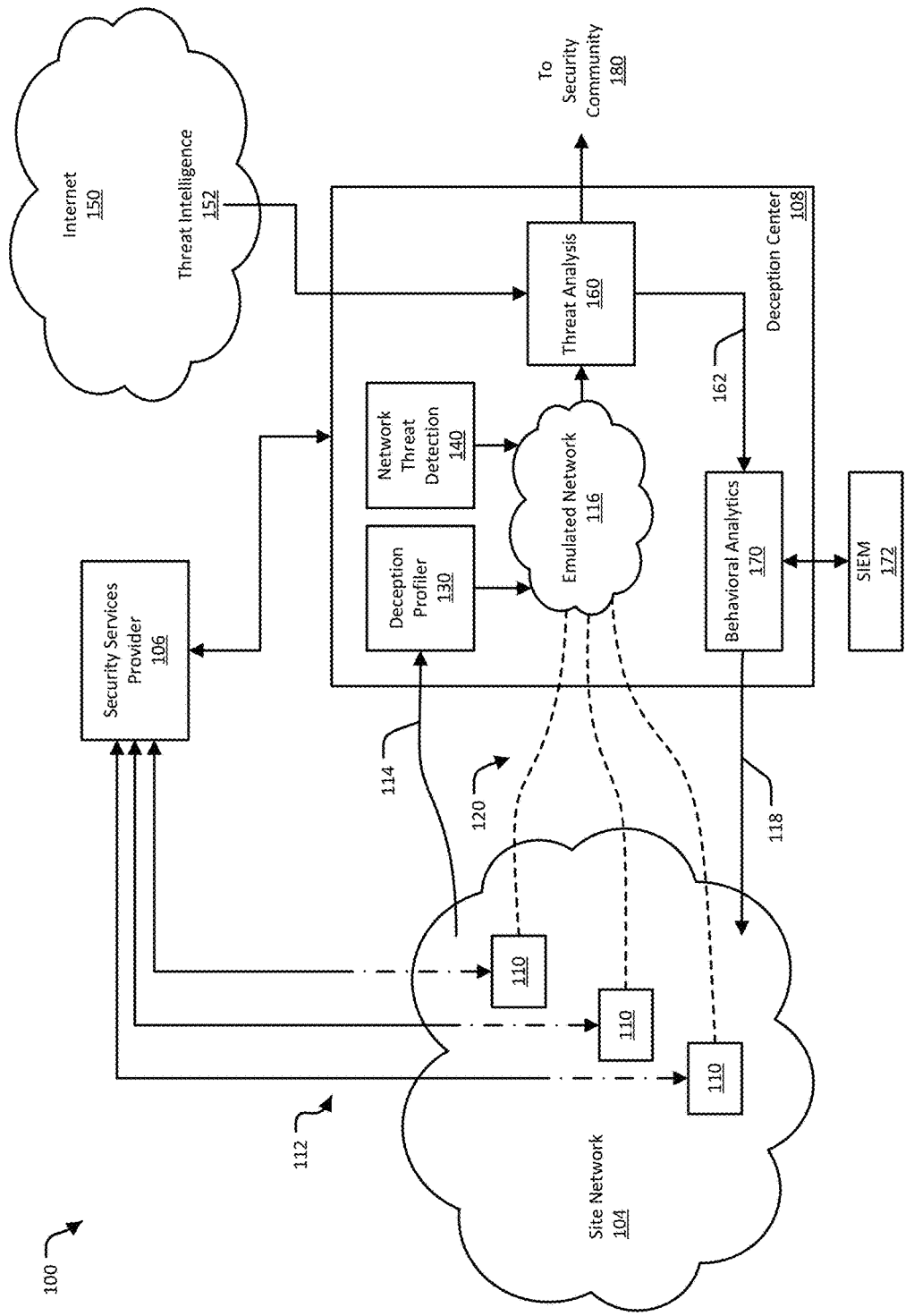
FIG. 1 illustrates an example of a network threat detection and analysis system, in which various implementations of a deception-based security system can be used.

Network deception mechanisms, often referred to as "honeypots," "honey tokens," and "honey nets," among others, defend a network from threats by distracting or diverting the threat. Honeypot-type deception mechanisms can be installed in a network for a particular site, such as a business office, to act as decoys in the site's network. Honeypot-type deception mechanisms are typically configured to be indistinguishable from active, production systems in the network. Additionally, such deception mechanisms are typically configured to be attractive to a network threat by having seemingly valuable data and/or by appearing vulnerable to infiltration. Though these deception mechanisms can be indistinguishable from legitimate parts of the site network, deception mechanisms are not part of the normal operation of the network, and would not be accessed during normal, legitimate use of the site network. Because normal users of the site network would not normally use or access a deception mechanism, any use or access to the deception mechanism is suspected to be a threat to the network.

"Normal" operation of a network generally includes network activity that conforms with the intended purpose of a network. For example, normal or legitimate network activity can include the operation of a business, medical facility, government office, education institution, or the ordinary network activity of a private home. Normal network activity can also include the non-business-related, casual activity of users of a network, such as accessing personal email and visiting websites on personal time, or using network resources for personal use. Normal activity can also include the operations of network security devices, such as firewalls, anti-virus tools, intrusion detection systems, intrusion protection systems, email filters, adware blockers, and so on. Normal operations, however, exclude deceptions mechanisms, in that deception mechanisms are not intended to take part in business operations or casual use. As such, network users and network systems do not normally access deceptions mechanisms except perhaps for the most routine network administrative tasks. Access to a deception mechanism, other than entirely routine network administration, may thus indicate a threat to the network.

Threats to a network can include active attacks, where a network threat interacts or engages with systems in the network to steal information or do harm to the network. A network threat may be a person, or may be an automated system. Examples of active attacks include denial of service (DoS) attacks, distributed denial of service (DDoS) attacks, spoofing attacks, "man-in-the-middle" attacks, attacks involving malformed network requests (e.g. Address Resolution Protocol (ARP) poisoning, "ping of death," etc.), buffer, heap, or stack overflow attacks, and format string attacks, among others. Threats to a network can also include self-driven, self-replicating, and/or self-triggering malicious software. Malicious software can appear innocuous until activated, upon which the malicious software may attempt to steal information from a network and/or do harm to the network. Malicious software is typically designed to spread itself to other systems in a network. Examples of malicious software include ransomware, viruses, worms, Trojan horses, spyware, keyloggers, rootkits, and rogue security software, among others.

Network threats, such a hackers and malware, often conduct scans of a target network to obtain intelligence about the network. A network scan can systematically test nodes in a network, and obtain information about each node.

Such information can include, for example, which Internet Protocol (IP) addresses are presently in use in the network, the Media Access Control (MAC) addresses associated with each active IP address, available Transmission Control Protocol (TCP) and Uniform Datagram Protocol (UDP) services running on each device in the network, the operating system being used by devices in the network, and/or any network security filtering that is between the devices in the network and the system from which the scan is being launched. Having obtained this information, a network threat may be able to identify devices in the network that are vulnerable to attack.

Network administrators have access to a suite of tools that can be used to scan a network for legitimate purposes. For example, network administrators may scan a network for security assessments and system maintenance, among other reasons. Some tools can be used for high-level host discovery, which involves determining information such as the number of network devices in a network, the location (e.g., IP address) of each device, and possibly also the MAC address for each device. With information such as an IP, address, some tools can be used to scan the ports on a specific network device. Scanning ports can inform the network administrator about which ports on a device are "open," meaning available to receive network traffic and having a service running that can process that traffic, and which ports are "closed," or unavailable for receiving network traffic. Port scanning can possibly also be used to "fingerprint" open ports; that is, determining a version of a running service, and/or a patch level. Information such as an IP address and/or a list of open ports can further be used to for operating system fingerprinting, a process by which a network administrator can determine the operating system running on a device by examining the device's responses to certain kinds of network traffic.

While information obtained from network scans can be used by a network administrator for legitimate reasons, a network threat can use the same tools to probe the network for vulnerabilities. Determining that an unexpected network scan is occurring or has occurred can be useful, for example, to configure the network's security infrastructure to block such scans and/or to defend against a possible incoming attack, and/or to identify compromised systems in the network, among other things.

Identifying unexpected network scans, however, can be difficult. All but the smallest networks have millions of packets in flight every second. Among so many packets, it can be difficult to find packets associated with scans. One method for identifying scan-related packets is to examine every single packet transmitted across the network. But doing so can require significant processing resources and may add undesirable delays across the network.

Additionally, packets used for scanning are sometimes also used in the network for other reasons. For example, when a network device legitimately joins the network, the network device may check whether the IP address that the network device is using is not already being used by another device in the network. The packets sent to determine this information are similar to packets that can be used to scan the network. Unlike a scan, in the preceding example, the new network device might not systematically test other IP addresses. Thus, identifying network scans can require determining the difference between routine but irregular network traffic and systematic, organized network traffic.

In various implementations, systems and methods can be used to detect a scan of a network. In various implementations, these systems and/or methods can be implemented using a network device on the network. In various implementations, the network device can be configured as a deception sensor, which herein refers to a device in a network configured to monitor the network. In various implementations, the deception sensor can project decoy network devices onto the network, where the decoys use IP addresses that are not currently assigned to a device in the network. No network traffic is expected to be received at the decoys, however, hence any network traffic that is received is automatically suspect.

In various implementations, the deception sensor can determine whether a packet received by the deception sensor is associated with a network scan. To do so, the deception sensor can examine monitored network activity, and determine whether the packet is associated with any of that activity. For example, the deception sensor may identify a pattern of packets in the monitored network activity, where the packets in the pattern are ones that can be used for scanning the network. In this example, the deception sensor can further determine that the packet received by the deception sensor falls within the pattern.

Once the deception sensor has determined that a scan may be occurring or has occurred, the deception sensor can use this information for various purposes. For example, the deception sensor can request or obtain information from another, non-decoy network device to determine whether the non-decoy network device has been subjected to a deeper probe. As another example, the deception sensor can coordinate with other deception sensors in other networks to confirm that a scan has occurred. As another example, the deception sensor can transmit information to a system, such as a deception center, which is able to configure security settings for the network. In this example, the network security infrastructure for the network can be modified to block the scan, defend against a possible, and/or identify compromised network devices within the network, among other things.

I. Deception-Based Security Systems

FIG. 1 illustrates an example of a network threat detection and analysis system 100, in which various implementations of a deception-based security system can be used. The network threat detection and analysis system 100, or, more briefly, network security system 100, provides security for a site network 104 using deceptive security mechanisms, a variety of which may be called "honeypots." The deceptive security mechanisms may be controlled by and inserted into the site network 104 using a deception center 108 and sensors 110, which may also be referred to as deception sensors, installed in the site network 104. In some implementations, the deception center 108 and the sensors 110 interact with a security services provider 106 located outside of the site network 104. The deception center 108 may also obtain or exchange data with sources located on the Internet 150.

Security mechanisms designed to deceive, sometimes referred to as "honeypots," may also be used as traps to divert and/or deflect unauthorized use of a network away from the real network assets. A deception-based security mechanism may be a computer attached to the network, a process running on one or more network systems, and/or some other device connected to the network. A security mechanism may be configured to offer services, real or emulated, to serve as bait for an attack on the network. Deception-based security mechanisms that take the form of data, which may be called "honey tokens," may be mixed in with real data in devices in the network. Alternatively or additionally, emulated data may also be provided by emulated systems or services.

Deceptive security mechanisms can also be used to detect an attack on the network. Deceptive security mechanisms are generally configured to appear as if they are legitimate parts of a network. These security mechanisms, however, are not, in fact, part of the normal operation of the network. Consequently, normal activity on the network is not likely to access the security mechanisms. Thus any access over the network to the security mechanism is automatically suspect.

The network security system 100 may deploy deceptive security mechanisms in a targeted and dynamic fashion. Using the deception center 108 the system 100 can scan the site network 104 and determine the topology of the site network 104. The deception center 108 may then determine devices to emulate with security mechanisms, including the type and behavior of the device. The security mechanisms may be selected and configured specifically to attract the attention of network threats. The security mechanisms may also be selected and deployed based on suspicious activity in the network. Security mechanisms may be deployed, removed, modified, or replaced in response to activity in the network, to divert and isolate network activity related to an apparent attack, and to confirm that the network activity is, in fact, part of a real attack.

The site network 104 is a network that may be installed among the buildings of a large business, in the office of a small business, at a school campus, at a hospital, at a government facility, or in a private home. The site network 104 may be described as a local area network (LAN) or a group of LANs. The site network 104 may be one site belonging to an organization that has multiple site networks 104 in one or many geographical locations. In some implementations, the deception center 108 may provide network security to one site network 104, or to multiple site networks 104 belonging to the same entity.

The site network 104 is where the networking devices and users of the an organization's network may be found. The site network 104 may include network infrastructure devices, such as routers, switches hubs, repeaters, wireless base stations, and/or network controllers, among others. The site network 104 may also include computing systems, such as servers, desktop computers, laptop computers, tablet computers, personal digital assistants, and smart phones, among others. The site network 104 may also include other analog and digital electronics that have network interfaces, such as televisions, entertainment systems, thermostats, refrigerators, and so on.

The deception center 108 provides network security for the site network 104 (or multiple site networks for the same organization) by deploying security mechanisms into the site network 104, monitoring the site network 104 through the security mechanisms, detecting and redirecting apparent threats, and analyzing network activity resulting from the apparent threat. To provide security for the site network 104, in various implementations the deception center 108 may communicate with sensors 110 installed in the site network 104, using network tunnels 120. As described further below, the tunnels 120 may allow the deception center 108 to be located in a different sub-network ("subnet") than the site network 104, on a different network, or remote from the site network 104, with intermediate networks (possibly including the Internet 150) between the deception center 108 and the site network 104.

In some implementations, the network security system 100 includes a security services provider 106. In these implementations, the security services provider 106 may act as a central hub for providing security to multiple site networks, possibly including site networks controlled by different organizations. For example, the security services provider 106 may communicate with multiple deception centers 108 that each provide security for a different site network 104 for the same organization. In some implementations, the security services provider 106 is located outside the site network 104. In some implementations, the security services provider 106 is controlled by a different entity than the entity that controls the site network. For example, the security services provider 106 may be an outside vendor. In some implementations, the same entity that controls the site network 104 controls the security services provider 106.

In some implementations, when the network security system 100 includes a security services provider 106, the sensors 110 and the deception center 108 may communicate with the security services provider 106 in order to be connected to each other. For example, the sensors 110, which may also be referred to as deception sensors, may, upon powering on in the site network 104, send information over a network connection 112 to the security services provider 106, identifying themselves and the site network 104 in which they are located. The security services provider 106 may further identify a corresponding deception center 108 for the site network 104. The security services provider 106 may then provide the network location of the deception center 108 to the sensors 110, and may provide the deception center 108 with the network location of the sensors 110. A network location may take the form of, for example, an Internet Protocol (IP) address. With this information, the deception center 108 and the sensors 110 may be able to configure tunnels 120 to communicate with each other.

In some implementations, the network security system 100 does not include a security services provider 106. In these implementations, the sensors 110 and the deception center 108 may be configured to locate each other by, for example, sending packets that each can recognize as coming for the other. Using these packets, the sensors 110 and deception center 108 may be able to learn their respective locations on the network. Alternatively or additionally, a network administrator can configure the sensors 110 with the network location of the deception center 108, and vice versa.

In various implementations, the sensors 110 are a minimal combination of hardware and/or software, sufficient to form a network connection with the site network 104 and a tunnel 120 with the deception center 108. For example, a sensor 110 may be constructed using a low-power processor, a network interface, and a simple operating system. In various implementations, the sensors 110 provide the deception center 108 with visibility into the site network 104, such as for example being able to operate as a node in the site network 104, and/or being able to present or project deceptive security mechanisms into the site network 104, as described further below. Additionally, in various implementations, the sensors 110 may provide a portal through which a suspected attack on the site network 104 can be redirected to the deception center 108, as is also described below.

In various implementations, the deception center 108 may be configured to profile the site network 104, deploy deceptive security mechanisms for the site network 104, detect suspected threats to the site network 104, analyze the suspected threat, and analyze the site network 104 for exposure and/or vulnerability to the supposed threat.

To provide the site network 104, the deception center 108 may include a deception profiler 130. In various implementations, the deception profiler may 130 derive information 114 from the site network 104, and determine, for example, the topology of the site network 104, the network devices included in the site network 104, the software and/or hardware configuration of each network device, and/or how the network is used at any given time. Using this information, the deception profiler 130 may determine one or more deceptive security mechanisms to deploy into the site network 104.

In various implementations, the deception profiler may configure an emulated network 116 to emulate one or more computing systems. Using the tunnels 120 and sensors 110, the emulated computing systems may be projected into the site network 104, where they serve as deceptions. The emulated computing systems may include address deceptions, low-interaction deceptions, and/or high-interaction deceptions. In some implementations, the emulated computing systems may be configured to resemble a portion of the network. In these implementations, this network portion may then be projected into the site network 104.

In various implementations, a network threat detection engine 140 may monitor activity in the emulated network 116, and look for attacks on the site network 104. For example, the network threat detection engine 140 may look for unexpected access to the emulated computing systems in the emulated network 116. The network threat detection engine 140 may also use information 114 extracted from the site network 104 to adjust the emulated network 116, in order to make the deceptions more attractive to an attack, and/or in response to network activity that appears to be an attack. Should the network threat detection engine 140 determine that an attack may be taking place, the network threat detection engine 140 may cause network activity related to the attack to be redirected to and contained within the emulated network 116.

In various implementations, the emulated network 116 is a self-contained, isolated, and closely monitored network, in which suspect network activity may be allowed to freely interact with emulated computing systems. In various implementations, questionable emails, files, and/or links may be released into the emulated network 116 to confirm that they are malicious, and/or to see what effect they have. Outside actors can also be allowed to access emulated system, steal data and user credentials, download malware, and conduct any other malicious activity. In this way, the emulated network 116 not only isolated a suspected attack from the site network 104, but can also be used to capture information about an attack. Any activity caused by suspect network activity may be captured in, for example, a history of sent and received network packets, log files, and memory snapshots.

In various implementations, activity captured in the emulated network 116 may be analyzed using a targeted threat analysis engine 160. The threat analysis engine 160 may examine data collected in the emulated network 116 and reconstruct the course of an attack. For example, the threat analysis engine 160 may correlate various events seen during the course of an apparent attack, including both malicious and innocuous events, and determine how a network threat infiltrated and caused harm in the emulated network 116. In some cases, the threat analysis engine 160 may use threat intelligence 152 from the Internet 150 to identify and/or analyze an attack contained in the emulated network 116. The threat analysis engine 160 may also confirm that suspect network activity was not an attack. The threat analysis engine 160 may produce indicators 162 that describe the suspect network activity, including indicating whether the suspect activity was or was not an actual threat.

The threat analysis engine 160 may share these indicators 162 with the security community 180, so that other networks can be defended from the attack. The threat analysis engine 160 may also send the indicators 162 to the security services provider 106, so that the security services provider 106 can use the indicators 162 to defend other site networks.

In various implementations, the threat analysis engine 160 may also send threat indicators 162, or similar data, to a behavioral analytics engine 170. The behavioral analytics engine 170 may be configured to use the indicators 162 to probe 118 the site network 104, and see whether the site network 104 has been exposed to the attack, or is vulnerable to the attack. For example, the behavioral analytics engine 170 may search the site network 104 for computing systems that resemble emulated computing systems in the emulated network 116 that were affected by the attack. In some implementations, the behavioral analytics engine 170 can also repair systems affected by the attack, or identify these systems to a network administrator. In some implementations, the behavioral analytics engine 170 can also reconfigure the site network's 104 security infrastructure to defend against the attack.

The behavioral analytics engine 170 can work in conjunction with a Security Information and Event Management (SIEM) 172 system. In various implementations, SIEM includes software and/or services that can provide real-time analysis of security alerts generates by network hardware and applications. In various implementations, the deception center 108 can communicate with the SIEM 172 system to obtain information about computing and/or networking systems in the site network 104.

Using deceptive security mechanisms, the network security system 100 may thus be able to distract and divert attacks on the site network 104. The network security system 100 may also be able to allow, using the emulated network 116, an attack to proceed, so that as much can be learned about the attack as possible. Information about the attack can then be used to find vulnerabilities in the site network 104. Information about the attack can also be provided to the security community 180, so that the attack can be thwarted elsewhere.

II. Customer Installations

The network security system, such as the deception-based system described above, may be flexibly implemented to accommodate different customer networks. FIGS. 2A-2D provide examples of different installation configurations 200a-200d that can be used for different customer networks 202. A customer network 202 may generally be described as a network or group of networks that is controlled by a common entity, such as a business, a school, or a person. The customer network 202 may include one or more site networks 204. The customer network's 202 site networks 204 may be located in one geographic location, may be behind a common firewall, and/or may be multiple subnets within one network. Alternatively or additionally, a customer network's 202 site networks 204 may be located in different geographic locations, and be connected to each other over various private and public networks, including the Internet 250.

Different customer networks 202 may have different requirements regarding network security. For example, some customer networks 202 may have relatively open connections to outside networks such as the Internet 250, while other customer networks 202 have very restricted access to outside networks. The network security system described in FIG. 1 may be configurable to accommodate these variations.

Figure 2A:
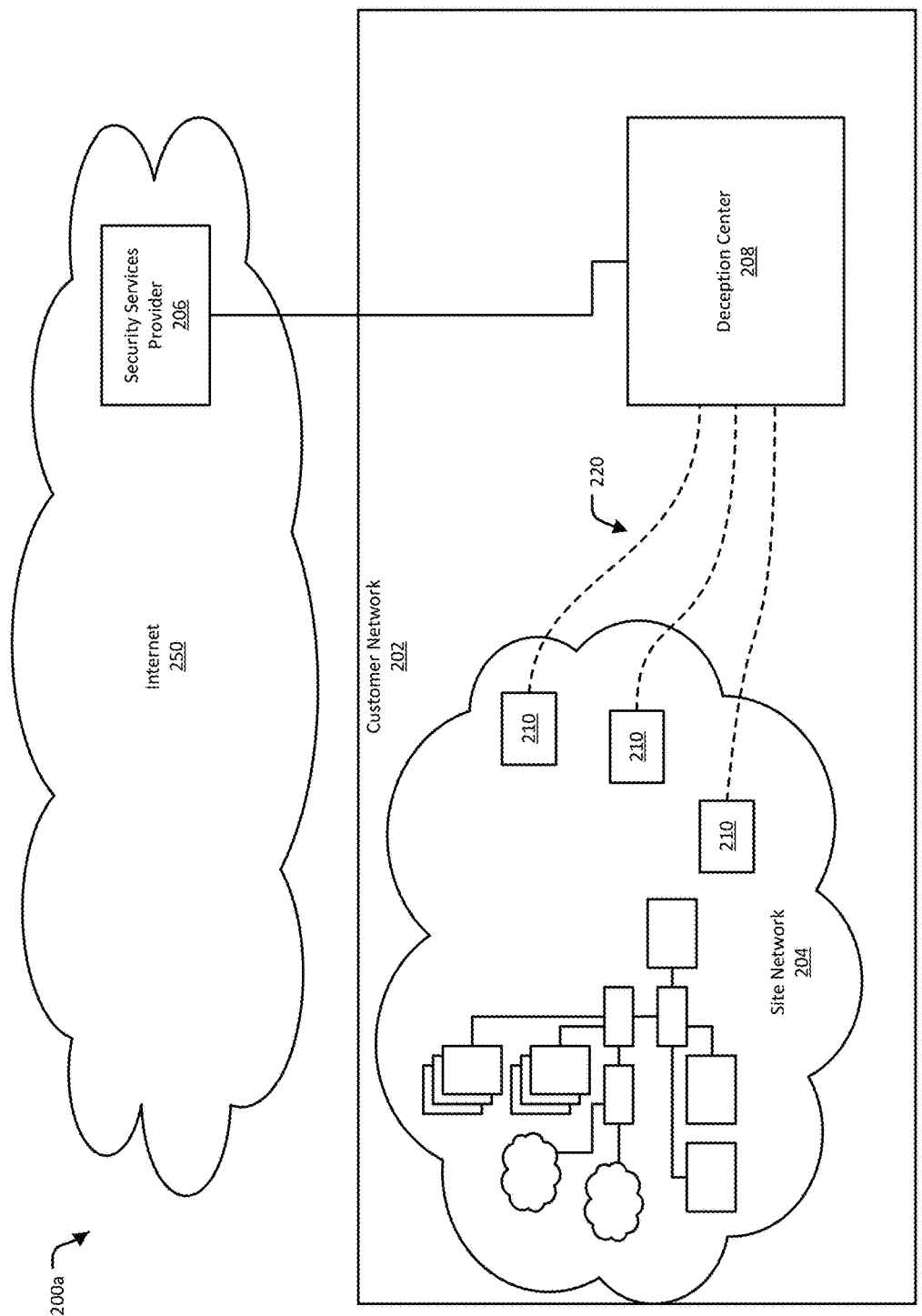
FIGS. 2A-2D provide examples of different installation configurations that can be used for different customer networks.

FIG. 2A illustrates one example of an installation configuration 200a, where a deception center 208 is located within the customer network 202. In this example, being located within the customer network 202 means that the deception center 208 is connected to the customer network 202, and is able to function as a node in the customer network 202. In this example, the deception center 208 may be located in the same building or within the same campus as the site network 204. Alternatively or additionally, the deception center 208 may be located within the customer network 202 but at a different geographic location than the site network 204. The deception center 208 thus may be within the same subnet as the site network 204, or may be connected to a different subnet within the customer network.

In various implementations, the deception center 208 communicates with sensors 210, which may also be referred to as deception sensors, installed in the site network over network tunnels 220 In this example, the network tunnels 220 may cross one or more intermediate within the customer network 202.

In this example, the deception center 208 is able to communicate with a security services provider 206 that is located outside the customer network 202, such as on the Internet 250. The security services provider 206 may provide configuration and other information for the deception center 208. In some cases, the security services provider 206 may also assist in coordinating the security for the customer network 202 when the customer network 202 includes multiple site networks 204 located in various geographic areas.

Figure 2B:
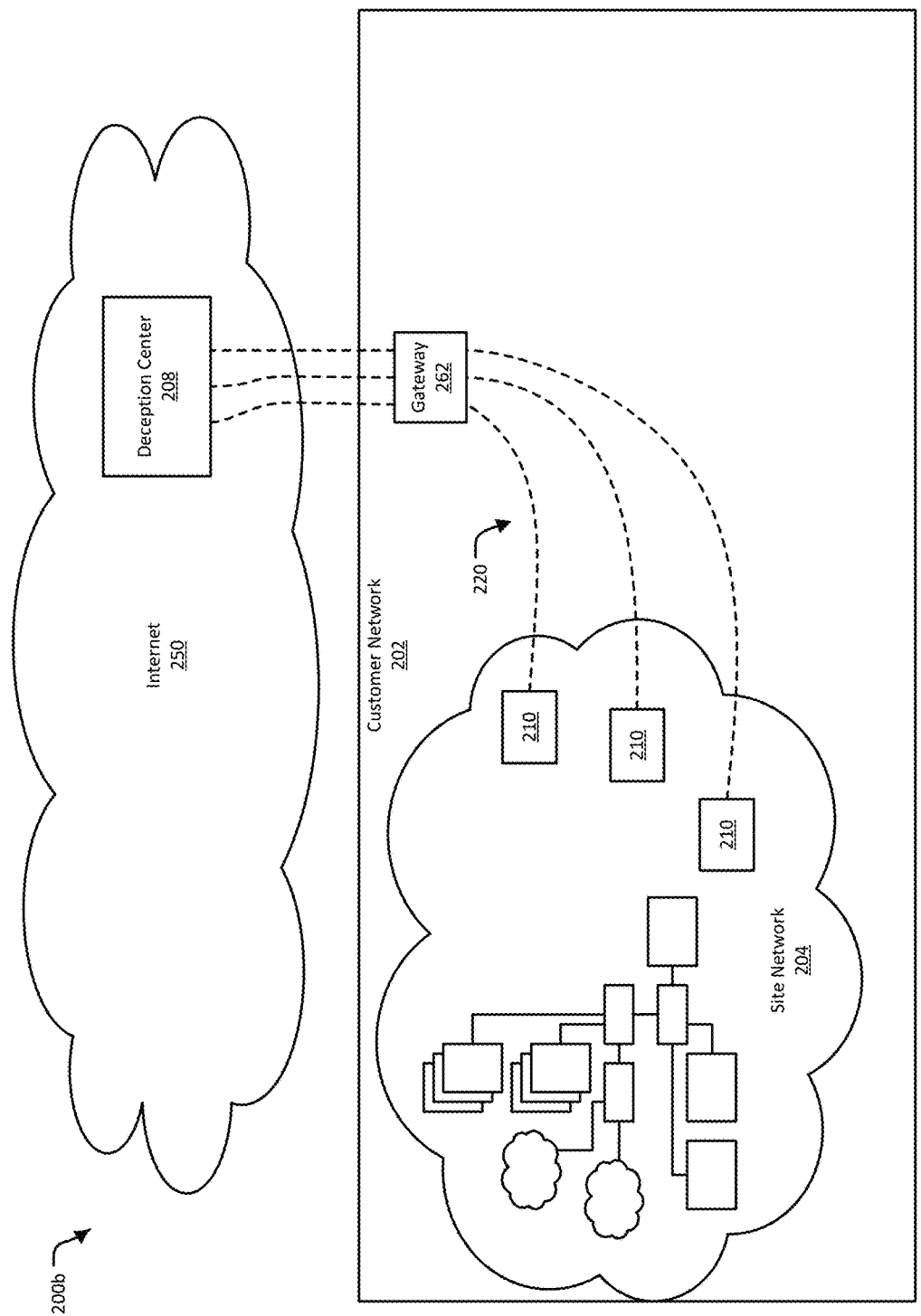

FIG. 2B illustrates another example of an installation configuration 200b, where the deception center 208 is located outside the customer network 202. In this example, the deception center 208 may connected to the customer network 202 over the Internet 250. In some implementations, the deception center 208 may be co-located with a security services provider, and/or may be provided by the security services provider.

In this example, the tunnels 220 connect the deception center 208 to the sensors 210 through a gateway 262. A gateway is a point in a network that connects the network to another network. For example, in this example, the gateway 262 connects the customer network 202 to outside networks, such as the Internet 250. The gateway 262 may provide a firewall, which may provide some security for the customer network 202. The tunnels 220 may be able to pass through the firewall using a secure protocol, such as Secure Socket Shell (SSH) and similar protocols. Secure protocols typically require credentials, which may be provided by the operator of the customer network 202.

Figure 2C:
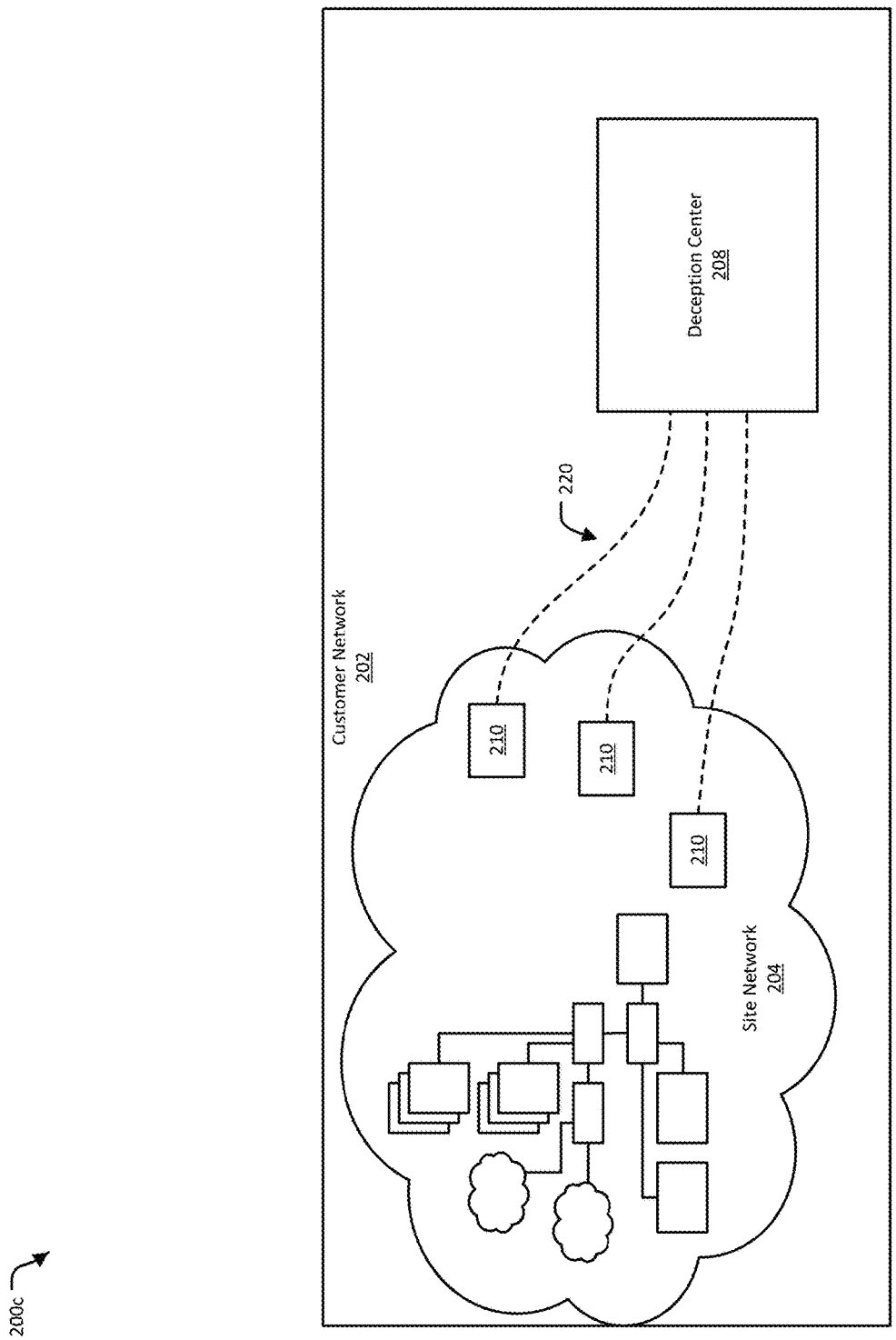

FIG. 2C illustrates another example of an installation configuration 200c, where the deception center 208 is located inside the customer network 202 but does not have access to outside networks. In some implementations, the customer network 202 may require a high level of network security. In these implementations, the customer network's 202 connections to the other networks may be very restricted. Thus, in this example, the deception center 208 is located within the customer network 202, and does not need to communicate with outside networks. The deception center 208 may use the customer networks 202 internal network to coordinate with and establish tunnels 220 to the sensors 210. Alternatively or additionally, a network administrator may configure the deception center 208 and sensors 210 to enable them to establish the tunnels 220.

Figure 2D:
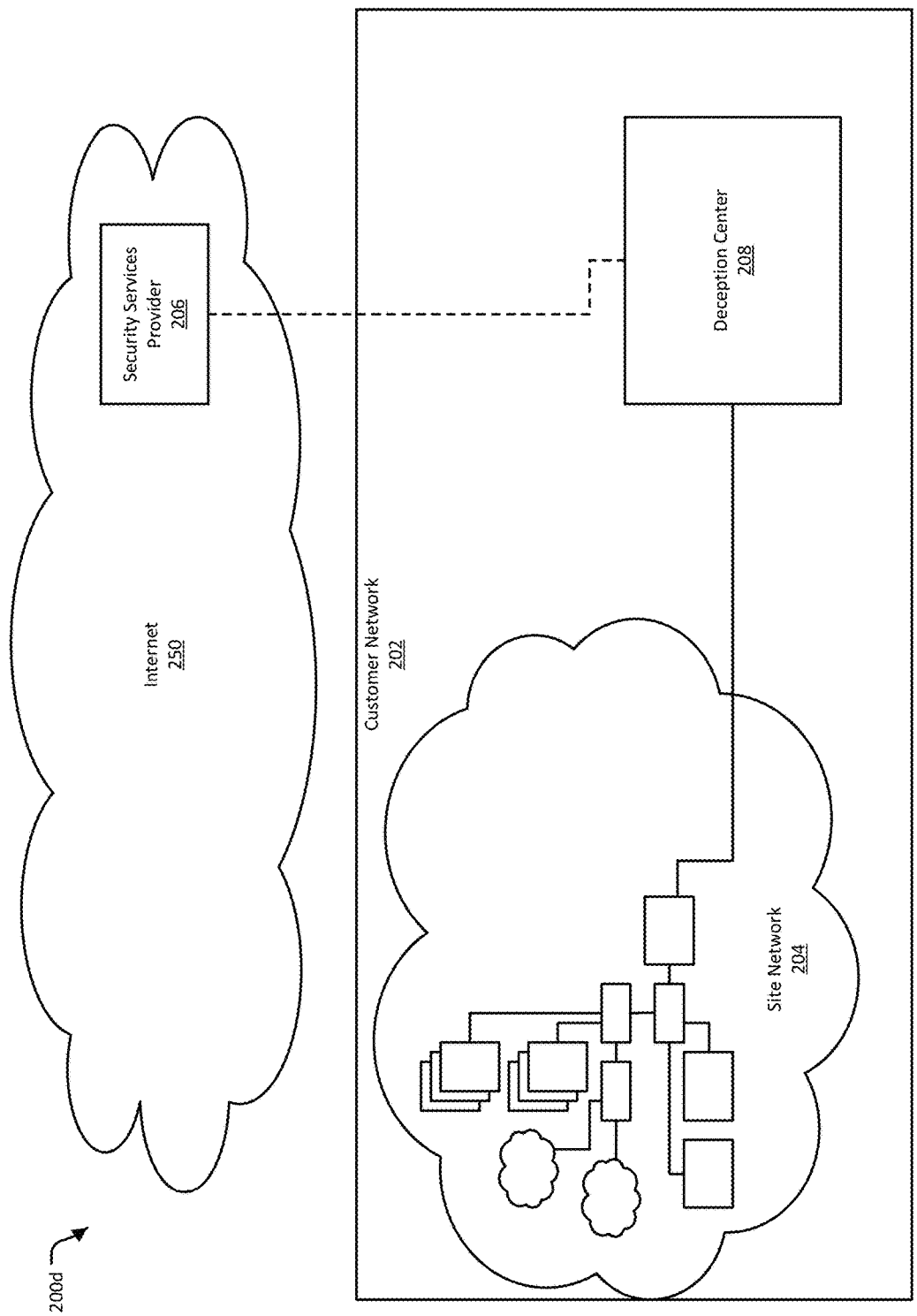

FIG. 2D illustrates another example of an installation configuration 200d. In this example, the deception center 208 is located inside the customer network 202, and further is directly connected to the site network 204. Directly connected, in this example, can mean that the deception center 208 is connected to a router, hub, switch, repeater, or other network infrastructure device that is part of the site network 204. Directly connected can alternatively or additionally mean that the deception center 208 is connected to the site network 204 using a Virtual Local Area Network (VLAN). For example, the deception center 208 can be connected to VLAN trunk port. In these examples, the deception center 208 can project deceptions into the site network 204 with or without the use of sensors, such as are illustrated in FIGS. 2A-2C.

In the example of FIG. 2D, the deception center 208 can also optionally be connected to an outside security services provider 206. The security services provider 206 can manage the deception center 208, including providing updated security data, sending firmware upgrades, and/or coordinating different deception centers 208 for different site networks 204 belonging to the same customer network 202. In some implementations, the deception center 208 can operate without the assistances of an outside security services provider 206.

III. Customer Networks

The network security system, such as the deception-based system discussed above, can be used for variety of customer networks. As noted above, customer networks can come in wide variety of configurations. For example, a customer network may have some of its network infrastructure "in the cloud." A customer network can also include a wide variety of devices, including what may be considered "traditional" network equipment, such as servers and routers, and non-traditional, "Internet-of-Things" devices, such as kitchen appliances. Other examples of customer networks include established industrial networks, or a mix of industrial networks and computer networks.

Figure 3A:
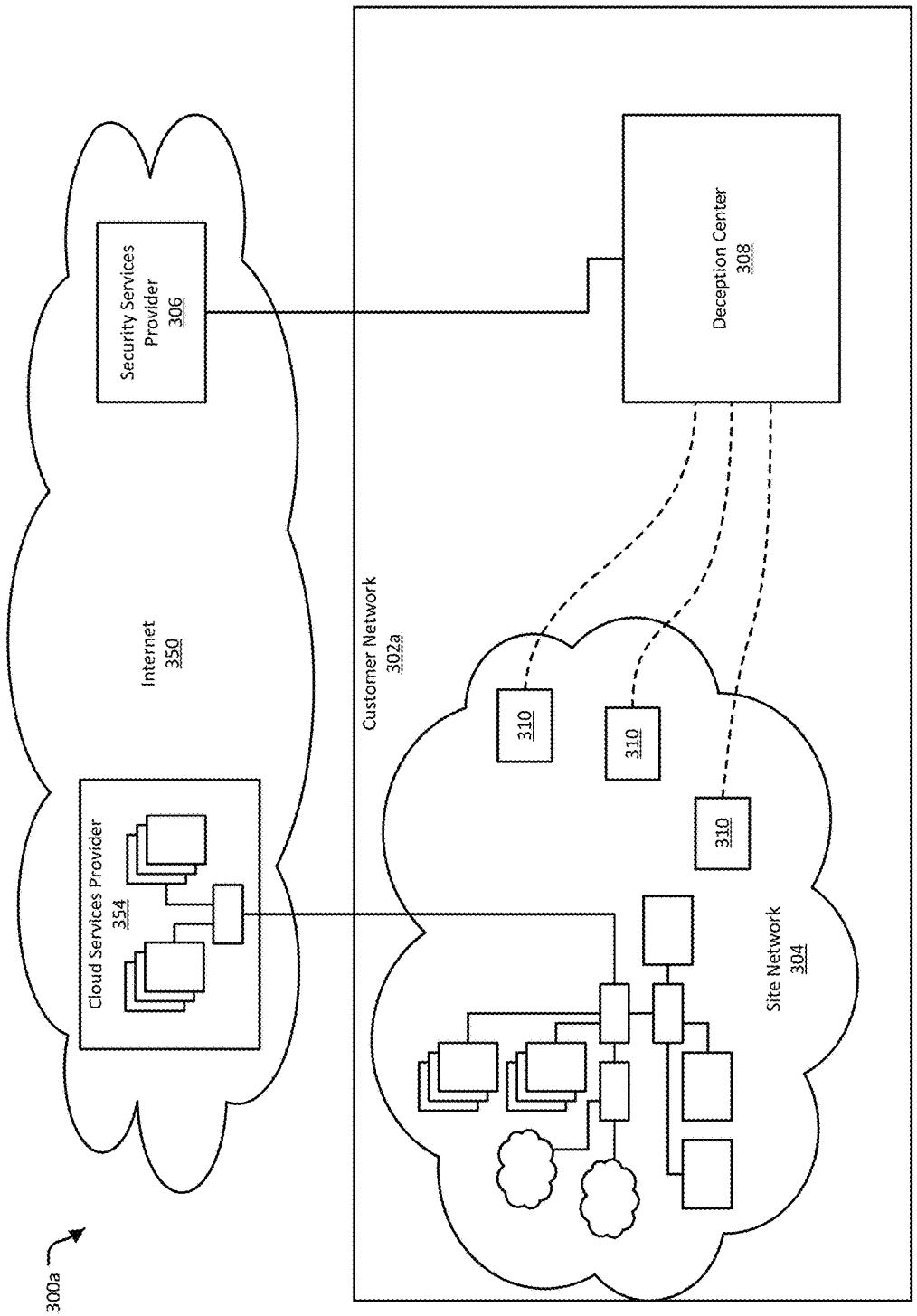
FIGS. 3A-3B illustrate examples of customer networks where some of the customer networks' network infrastructure is "in the cloud," that is, is provided by a cloud services provider.
Figure 3B:
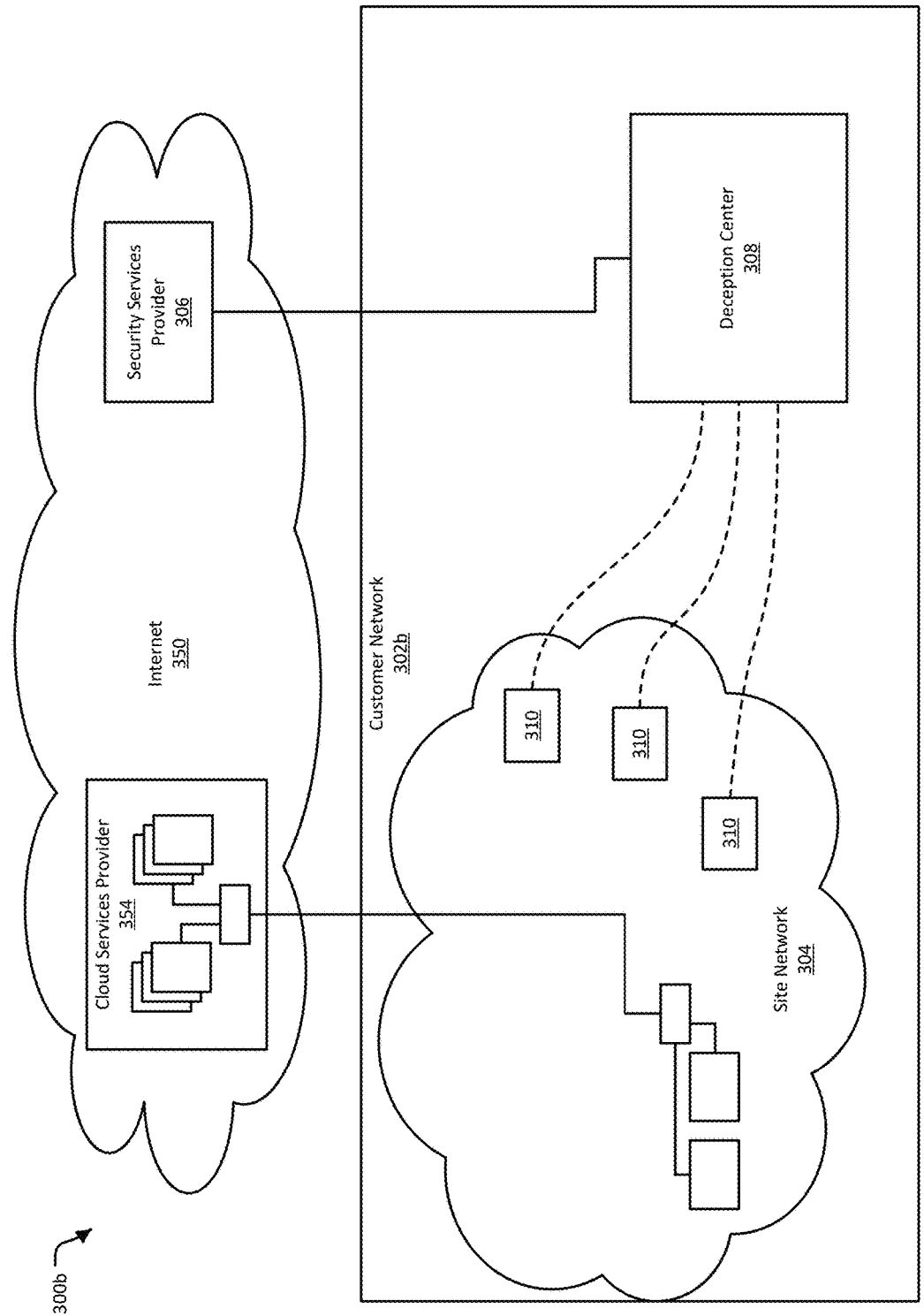

FIG. 3A-3B illustrate examples of customer networks 302a-302b where some of the customer networks' 302a-302b network infrastructure is "in the cloud," that is, is provided by a cloud services provider 354. These example customer networks 302a-302b may be defended by a network security system that includes a deception center 308 and sensors 310, which may also be referred to as deception sensors, and may also include an off-site security services provider 306.

A cloud services provider is a company that offers some component of cloud computer—such as Infrastructure as a Service (IaaS), Software as a Service (SaaS) or Platform as Service (PaaS)—to other businesses and individuals. A cloud services provider may have a configurable pool of computing resources, including, for example, networks, servers, storage, applications, and services. These computing resources can be available on demand, and can be rapidly provisioned. While a cloud services provider's resources may be shared between the cloud service provider's customers, from the perspective of each customer, the individual customer may appear to have a private network within the cloud, including for example having dedicated subnets and IP addresses.

In the examples illustrated in FIGS. 3A-3B, the customer networks' 302a-302b network is partially in a site network 304, and partially provided by the cloud services provider 354. In some cases, the site network 304 is the part of the customer networks 302a-302b that is located at a physical site owned or controlled by the customer network 302a-302b. For example, the site network 304 may be a network located in the customer network's 302a-302b office or campus. Alternatively or additionally, the site network 304 may include network equipment owned and/or operated by the customer network 302a-302b that may be located anywhere. For example, the customer networks' 302a-302b operations may consist of a few laptops owned by the customer networks 302a-302b, which are used from the private homes of the lap tops' users, from a co-working space, from a coffee shop, or from some other mobile location.

In various implementations, sensors 310 may be installed in the site network 304. The sensors 310 can be used by the network security system to project deceptions into the site network 304, monitor the site network 304 for attacks, and/or to divert suspect attacks into the deception center 308.

In some implementations, the sensors 310 may also be able to project deceptions into the part of the customer networks 302a-302b network that is provided by the cloud services provider 354. In most cases, it may not be possible to install sensors 310 inside the network of the cloud services provider 354, but in some implementations, this may not be necessary. For example, as discussed further below, the deception center 308 can acquire the subnet address of the network provided by the cloud services provider 354, and use that subnet address the create deceptions. Though these deceptions are projected from the sensors 310 installed in the site network 304, the deceptions may appear to be within the subnet provided by the cloud services provider 354.

In illustrated examples, the deception center 308 is installed inside the customer networks 302a-302b. Though not illustrated here, the deception center 308 can also be installed outside the customer networks 302a-302b, such as for example somewhere on the Internet 350. In some implementations, the deception center 308 may reside at the same location as the security service provider 306. When located outside the customer networks 302a-302b, the deception center 308 may connect to the sensors 310 in the site network 304 over various public and/or private networks.

FIG. 3A illustrates an example of a configuration 300a where the customer network's 302a network infrastructure is located in the cloud and the customer network 302a also has a substantial site network 304. In this example, the customer may have an office where the site network 304 is located, and where the customer's employees access and use the customer network 302a. For example, developers, sales and marketing personnel, human resources and finance employees, may access the customer network 302a from the site network 304. In the illustrated example, the customer may obtain applications and services from the cloud services provider 354. Alternatively or additionally, the cloud services provider 354 may provide data center services for the customer. For example, the cloud services provider 354 may host the customer's repository of data (e.g., music provided by a streaming music service, or video provided by a streaming video provider). In this example, the customer's own customers may be provided data directly from the cloud services provider 354, rather than from the customer network 302a.

FIG. 3B illustrates an example of a configuration 300b where the customer network's 302b network is primarily or sometimes entirely in the cloud. In this example, the customer network's 302b site network 304 may include a few laptops, or one or two desktop servers. These computing devices may be used by the customer's employees to conduct the customer's business, while the cloud services provider 354 provides the majority of the network infrastructure needed by the customer. For example, a very small company may have no office space and no dedicated location, and have as computing resources only the laptops used by its employees. This small company may use the cloud services provider 354 to provide its fixed network infrastructure. The small company may access this network infrastructure by connecting a laptop to any available network connection (e.g, in a co-working space, library, or coffee shop). When no laptops are connected to the cloud services provider 354, the customer network 302 may be existing entirely within the cloud.

In the example provided above, the site network 304 can be found wherever the customer's employees connect to a network and can access the cloud services provider 354. Similarly, the sensors 310 can be co-located with the employees' laptops. For example, whenever an employee connects to a network, she can enable a sensor 310, which can then project deceptions into the network around her. Alternatively or additionally, sensors 310 can be installed in a fixed location (such as the home of an employee of the customer) from which they can access the cloud services provider 354 and project deceptions into the network provided by the cloud services provider 354.

Figure 4:
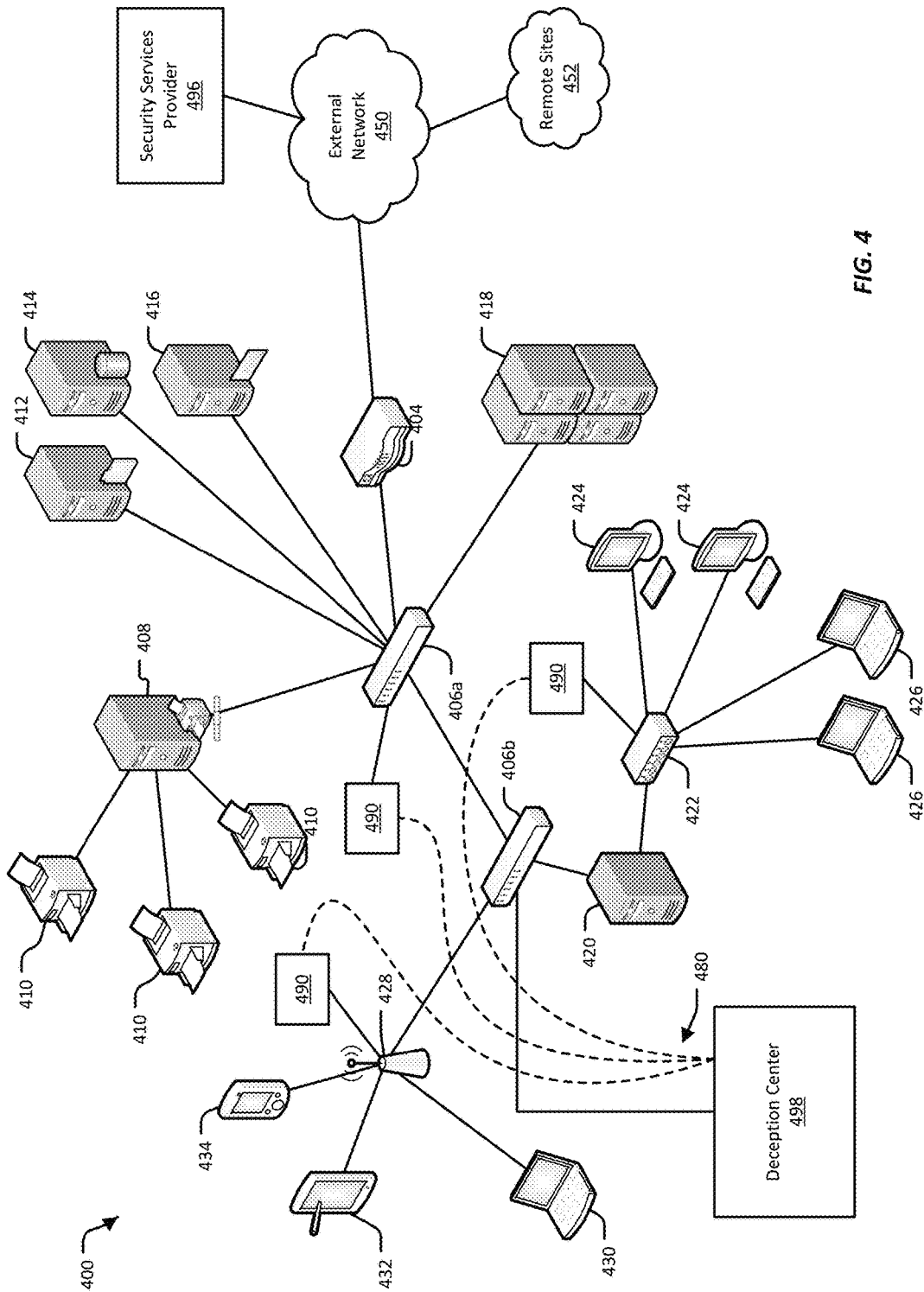
FIG. 4 illustrates an example of an enterprise network.

The network security system, such as the deception-based system discussed above, can provide network security for a variety of customer networks, which may include a diverse array of devices. FIG. 4 illustrates an example of an enterprise network 400, which is one such network that can be defended by a network security system. The example enterprise network 400 illustrates examples of various network devices and network clients that may be included in an enterprise network. The enterprise network 400 may include more or fewer network devices and/or network clients, and/or may include network devices, additional networks including remote sites 452, and/or systems not illustrated here. Enterprise networks may include networks installed at a large site, such as a corporate office, a university campus, a hospital, a government office, or a similar entity. An enterprise network may include multiple physical sites. Access to an enterprise networks is typically restricted, and may require authorized users to enter a password or otherwise authenticate before using the network. A network such as illustrated by the example enterprise network 400 may also be found at small sites, such as in a small business.

The enterprise network 400 may be connected to an external network 450. The external network 450 may be a public network, such as the Internet. A public network is a network that has been made accessible to any device that can connect to it. A public network may have unrestricted access, meaning that, for example, no password or other authentication is required to connect to it. The external network 450 may include third-party telecommunication lines, such as phone lines, broadcast coaxial cable, fiber optic cables, satellite communications, cellular communications, and the like. The external network 450 may include any number of intermediate network devices, such as switches, routers, gateways, servers, and/or controllers that are not directly part of the enterprise network 400 but that facilitate communication between the network 400 and other network-connected entities, such as a remote site 452.

Remote sites 452 are networks and/or individual computers that are generally located outside the enterprise network 400, and which may be connected to the enterprise network 400 through intermediate networks, but that function as if within the enterprise network 400 and connected directly to it. For example, an employee may connect to the enterprise network 400 while at home, using various secure protocols, and/or by connecting to a Virtual Private Network (VPN) provided by the enterprise network 400. While the employee's computer is connected, the employee's home is a remote site 452. Alternatively or additionally, the enterprise network's 400 owner may have a satellite office with a small internal network. This satellite office's network may have a fixed connection to the enterprise network 400 over various intermediate networks. This satellite office can also be considered a remote site.

The enterprise network 400 may be connected to the external network 450 using a gateway device 404. The gateway device 404 may include a firewall or similar system for preventing unauthorized access while allowing authorized access to the enterprise network 400. Examples of gateway devices include routers, modems (e.g. cable, fiber optic, dial-up, etc.), and the like.

The gateway device 404 may be connected to a switch 406a. The switch 406a provides connectivity between various devices in the enterprise network 400. In this example, the switch 406a connects together the gateway device 404, various servers 408, 412, 414, 416, 418, an another switch 406b. A switch typically has multiple ports, and functions to direct packets received on one port to another port. In some implementations, the gateway device 404 and the switch 406a may be combined into a single device.

Various servers may be connected to the switch 406a. For example, a print server 408 may be connected to the switch 406a. The print server 408 may provide network access to a number of printers 410. Client devices connected to the enterprise network 400 may be able to access one of the printers 410 through the printer server 408.

Other examples of servers connected to the switch 406a include a file server 412, database server 414, and email server 416. The file server 412 may provide storage for and access to data. This data may be accessible to client devices connected to the enterprise network 400. The database server 414 may store one or more databases, and provide services for accessing the databases. The email server 416 may host an email program or service, and may also store email for users on the enterprise network 400.

As yet another example, a server rack 418 may be connected to the switch 406a. The server rack 418 may house one or more rack-mounted servers. The server rack 418 may have one connection to the switch 406a, or may have multiple connections to the switch 406a. The servers in the server rack 418 may have various purposes, including providing computing resources, file storage, database storage and access, and email, among others.

An additional switch 406b may also be connected to the first switch 406a. The additional switch 406b may be provided to expand the capacity of the network. A switch typically has a limited number of ports (e.g., 8, 16, 32, 64 or more ports). In most cases, however, a switch can direct traffic to and from another switch, so that by connecting the additional switch 406b to the first switch 406a, the number of available ports can be expanded.

In this example, a server 420 is connected to the additional switch 406b. The server 420 may manage network access for a number of network devices or client devices. For example, the server 420 may provide network authentication, arbitration, prioritization, load balancing, and other management services as needed to manage multiple network devices accessing the enterprise network 400. The server 420 may be connected to a hub 422. The hub 422 may include multiple ports, each of which may provide a wired connection for a network or client device. A hub is typically a simpler device than a switch, and may be used when connecting a small number of network devices together. In some cases, a switch can be substituted for the hub 422. In this example, the hub 422 connects desktop computers 424 and laptop computers 426 to the enterprise network 400. In this example, each of the desktop computers 424 and laptop computers 426 are connected to the hub 422 using a physical cable.

In this example, the additional switch 406b is also connected to a wireless access point 428. The wireless access point 428 provides wireless access to the enterprise network 400 for wireless-enabled network or client devices. Examples of wireless-enabled network and client devices include laptops 430, tablet computers 432, and smart phones 434, among others. In some implementations, the wireless access point 428 may also provide switching and/or routing functionality.

The example enterprise network 400 of FIG. 4 is defended from network threats by a network threat detection and analysis system, which uses deception security mechanisms to attract and divert attacks on the network. The deceptive security mechanisms may be controlled by and inserted into the enterprise network 400 using a deception center 498 and sensors 490, which may also be referred to as deception sensors, installed in various places in the enterprise network 400. In some implementations, the deception center 498 and the sensors 490 interact with a security services provider 496 located outside of the enterprise network 400. The deception center 498 may also obtain or exchange data with sources located on external networks 450, such as the Internet.

In various implementations, the sensors 490 are a minimal combination of hardware and/or software, sufficient to form a network connection with the enterprise network 400 and a network tunnel 480 with the deception center 498. For example, a sensor 490 may be constructed using a low-power processor, a network interface, and a simple operating system. In some implementations, any of the devices in the enterprise network (e.g., the servers 408, 412, 416, 418 the printers 410, the computing devices 424, 426, 430, 432, 434, or the network infrastructure devices 404, 406a, 406b, 428) can be configured to act as a sensor.

In various implementations, one or more sensors 490 can be installed anywhere in the enterprise network 400, include being attached switches 406a, hubs 422, wireless access points 428, and so on. The sensors 490 can further be configured to be part of one or more VLANs. The sensors 490 provide the deception center 498 with visibility into the enterprise network 400, such as for example being able to operate as a node in the enterprise network 400, and/or being able to present or project deceptive security mechanisms into the enterprise network 400. Additionally, in various implementations, the sensors 490 may provide a portal through which a suspected attack on the enterprise network 400 can be redirected to the deception center 498.

The deception center 498 provides network security for the enterprise network 400 by deploying security mechanisms into the enterprise network 400, monitoring the enterprise network 400 through the security mechanisms, detecting and redirecting apparent threats, and analyzing network activity resulting from the apparent threat. To provide security for the enterprise network 400, in various implementations the deception center 498 may communicate with sensors 490 installed in the enterprise network 400, using, for example, network tunnels 480. The tunnels 480 may allow the deception center 498 to be located in a different sub-network ("subnet") than the enterprise network 400, on a different network, or remote from the enterprise network 400, with intermediate networks between the deception center 498 and the enterprise network 400. In some implementations, the enterprise network 400 can include more than one deception center 498. In some implementations, the deception center may be located off-site, such as in an external network 450.

In some implementations, the security services provider 496 may act as a central hub for providing security to multiple site networks, possibly including site networks controlled by different organizations. For example, the security services provider 496 may communicate with multiple deception centers 498 that each provide security for a different enterprise network 400 for the same organization. As another example, the security services provider 496 may coordinate the activities of the deception center 498 and the sensors 490, such as enabling the deception center 498 and the sensors 490 to connect to each other. In some implementations, the security services provider 496 is located outside the enterprise network 400. In some implementations, the security services provider 496 is controlled by a different entity than the entity that controls the site network. For example, the security services provider 496 may be an outside vendor. In some implementations, the security services provider 496 is controlled by the same entity as that controls the enterprise network 400. In some implementations, the network security system does not include a security services provider 496.

FIG. 4 illustrates one example of what can be considered a "traditional" network, that is, a network that is based on the interconnection of computers. In various implementations, a network security system, such as the deception-based system discussed above, can also be used to defend "non-traditional" networks that include devices other than traditional computers, such as for example mechanical, electrical, or electromechanical devices, sensors, actuators, and control systems. Such "non-traditional" networks may be referred to as the Internet of Things (IoT). The Internet of Things encompasses newly-developed, every-day devices designed to be networked (e.g., drones, self-driving automobiles, etc.) as well as common and long-established machinery that has augmented to be connected to a network (e.g., home appliances, traffic signals, etc.).

Figure 5:
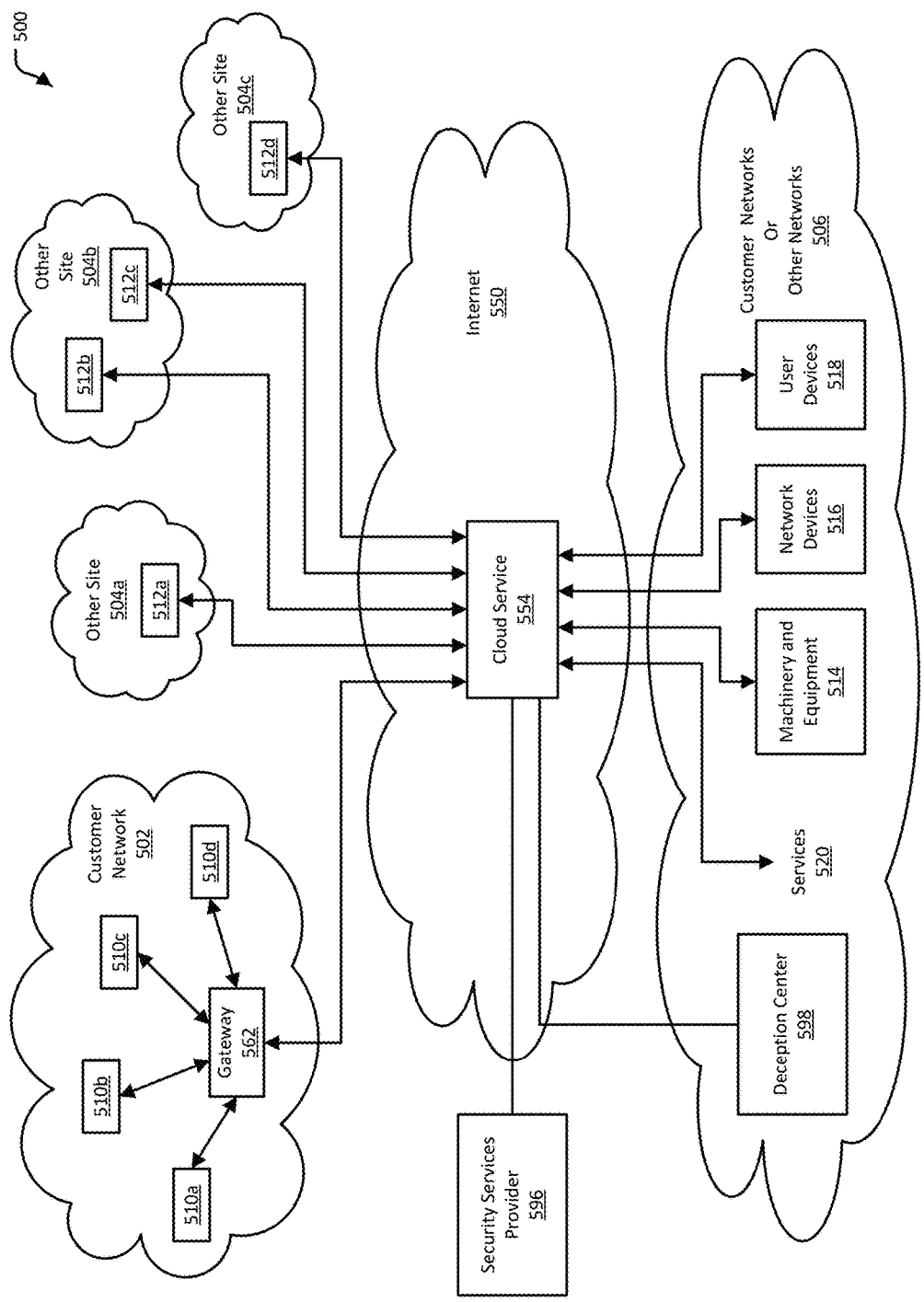
FIG. 5 illustrates a general example of an Internet-of-Things network.

FIG. 5 illustrates a general example of an IoT network 500. The example IoT network 500 can be implemented wherever sensors, actuators, and control systems can be found. For example, the example IoT network 500 can be implemented for buildings, roads and bridges, agriculture, transportation and logistics, utilities, air traffic control, factories, and private homes, among others. In various implementations, the IoT network 500 includes cloud service 554 that collects data from various sensors 510a-510d, 512a-512d, located in various locations. Using the collected data, the cloud service 554 can provide services 520, control of machinery and equipment 514, exchange of data with traditional network devices 516, and/or exchange of data with user devices 518. In some implementations, the cloud service 554 can work with a deception center 598 and/or a security service provider 596 to provide security for the network 500.

A cloud service, such as the illustrated cloud service 554, is a resource provided over the Internet 550. Sometimes synonymous with "cloud computing," the resource provided by the cloud services is in the "cloud" in that the resource is provided by hardware and/or software at some location remote from the place where the resource is used. Often, the hardware and software of the cloud service is distributed across multiple physical locations. Generally, the resource provided by the cloud service is not directly associated with specific hardware or software resources, such that use of the resource can continue when the hardware or software is changed. The resource provided by the cloud service can often also be shared between multiple users of the cloud service, without affecting each user's use. The resource can often also be provided as needed or on-demand. Often, the resource provided by the cloud service 554 is automated, or otherwise capable of operating with little or no assistance from human operators.

Examples of cloud services include software as a service (SaaS), infrastructure as a service (IaaS), platform as a service (PaaS), desktop as a service (DaaS), managed software as a service (MSaaS), mobile backend as a service (MBaaS), and information technology management as a service (ITMaas). Specific examples of cloud services include data centers, such as those operated by Amazon Web Services and Google Web Services, among others, that provide general networking and software services. Other examples of cloud services include those associated with smartphone applications, or "apps," such as for example apps that track fitness and health, apps that allow a user to remotely manage her home security system or thermostat, and networked gaming apps, among others. In each of these examples, the company that provides the app may also provide cloud-based storage of application data, cloud-based software and computing resources, and/or networking services. In some cases, the company manages the cloud services provided by the company, including managing physical hardware resources. In other cases, the company leases networking time from a data center provider.

In some cases, the cloud service 554 is part of one integrated system, run by one entity. For example, the cloud service 554 can be part of a traffic control system. In this example, sensors 510a-510d, 512a-512d can be used to monitor traffic and road conditions. In this example, the cloud service 554 can attempt to optimize the flow of traffic and also provide traffic safety. For example, the sensors 510a-510d, 512a-512d can include a sensor 512a on a bridge that monitors ice formation. When the sensor 512a detects that ice has formed on the bridge, the sensor 512a can alert the cloud service 554. The cloud service 554, can respond by interacting with machinery and equipment 514 that manages traffic in the area of the bridge. For example, the cloud service 554 can turn on warning signs, indicating to drivers that the bridge is icy. Generally, the interaction between the sensor 512a, the cloud service 554, and the machinery and equipment 514 is automated, requiring little or no management by human operators.

In various implementations, the cloud service 554 collects or receives data from sensors 510a-510d, 512a-512d, distributed across one or more networks. The sensors 510a-510d, 512a-512d include devices capable of "sensing" information, such as air or water temperature, air pressure, weight, motion, humidity, fluid levels, noise levels, and so on. The sensors 510a-510d, 512a-512d can alternatively or additionally include devices capable of receiving input, such as cameras, microphones, touch pads, keyboards, key pads, and so on. In some cases, a group of sensors 510a-510d may be common to one customer network 502. For example, the sensors 510a-510d may be motion sensors, traffic cameras, temperature sensors, and other sensors for monitoring traffic in a city's metro area. In this example, the sensors 510a-510d can be located in one area of the city, or be distribute across the city, and be connected to a common network. In these cases, the sensors 510a-510d can communicate with a gateway device 562, such as a network gateway. The gateway device 562 can further communicate with the cloud service 554.

In some cases, in addition to receiving data from sensors 510*a*-510*d* in one customer network 502, the cloud service 554 can also receive data from sensors 512*a*-512*d* in other sites 504*a*-504*c*. These other sites 504*a*-504*c* can be part of the same customer network 502 or can be unrelated to the customer network 502. For example, the other sites 504*a*-504*c* can each be the metro area of a different city, and the sensors 512*a*-512*d* can be monitoring traffic for each individual city.

Generally, communication between the cloud service 554 and the sensors 510*a*-510*d*, 512*a*-512*d* is bidirectional. For example, the sensors 510*a*-510*d*, 512*a*-512*d* can send information to the cloud service 554. The cloud service 554 can further provide configuration and control information to the sensors 510*a*-510*d*, 512*a*-512*d*. For example, the cloud service 554 can enable or disable a sensor 510*a*-510*d*, 512*a*-512*d* or modify the operation of a sensor 510*a*-510*d*, 512*a*-512*d*, such as changing the format of the data provided by a sensor 510*a*-510*d*, 512*a*-512*d* or upgrading the firmware of a sensor 510*a*-510*d*, 512*a*-512*d*.

In various implementations, the cloud service 554 can operate on the data received from the sensors 510*a*-510*d*, 512*a*-512*d*, and use this data to interact with services 520 provided by the cloud service 554, or to interact with machinery and equipment 514, network devices 516, and/or user devices 518 available to the cloud service 554. Services 520 can include software-based services, such as cloud-based applications, website services, or data management services. Services 520 can alternatively or additionally include media, such as streaming video or music or other entertainment services. Services 520 can also include delivery and/or coordination of physical assets, such as for example package delivery, direction of vehicles for passenger pick-up and drop-off, or automate re-ordering and re-stocking of supplies. In various implementations, services 520 may be delivered to and used by the machinery and equipment 514, the network devices 516, and/or the user devices 518.

In various implementations, the machinery and equipment 514 can include physical systems that can be controlled by the cloud service 554. Examples of machinery and equipment 514 include factory equipment, trains, electrical street cars, self-driving cars, traffic lights, gate and door locks, and so on. In various implementations, the cloud service 554 can provide configuration and control of the machinery and equipment 514 in an automated fashion.

The network devices 516 can include traditional networking equipment, such as server computers, data storage devices, routers, switches, gateways, and so on. In various implementations, the cloud service 554 can provide control and management of the network devices 516, such as for example automated upgrading of software, security monitoring, or asset tracking. Alternatively or additionally, in various implementations the cloud service 554 can exchange data with the network devices 516, such as for example providing websites, providing stock trading data, or providing online shopping resources, among others. Alternatively or additionally, the network devices 516 can include computing systems used by the cloud service provider to manage the cloud service 554.

The user devices 518 can include individual personal computers, smart phones, tablet devices, smart watches, fitness trackers, medical devices, and so on that can be associated with an individual user. The cloud service 554 can exchange data with the user devices 518, such as for example provide support for applications installed on the user devices 518, providing websites, providing streaming media, providing directional navigation services, and so on. Alternatively or additionally, the cloud service 554 may enable a user to use a user device 518 to access and/or view other devices, such as the sensors 510*a*-510*d*, 512*a*-512*d*, the machinery and equipment 514, or the network devices 516.

In various implementations, the services 520, machinery and equipment 514, network devices 516, and user devices 518 may be part of one customer network 506. In some cases, this customer network 506 is the same as the customer network 502 that includes the sensors 510*a*-510*d*. In some cases, the services 520, machinery and equipment 514, network devices 516, and user devices 518 are part of the same network, and may instead be part of various other networks 506.

In various implementations, customer networks can include a deception center 598. The deception center 598 provides network security for the IoT network 500 by deploying security mechanisms into the IoT network 500, monitoring the IoT network 500 through the security mechanisms, detecting and redirecting apparent threats, and analyzing network activity resulting from the apparent threat. To provide security for the IoT network 500, in various implementations the deception center 598 may communicate with the sensors 510*a*-5106*d*, 512*a*-5012 installed in the IoT network 500, for example through the cloud service 554. In some implementations, the IoT network 500 can include more than one deception center 598. For example, each of customer network 502 and customer networks or other networks 506 can include a deception center 598.

In some implementations, the deception center 598 and the sensors 510*a*-510*d*, 512*a*-512*d* interact with a security services provider 596. In some implementations, the security services provider 596 may act as a central hub for providing security to multiple site networks, possibly including site networks controlled by different organizations. For example, the security services provider 596 may communicate with multiple deception centers 598 that each provide security for a different IoT network 500 for the same organization. As another example, the security services provider 596 may coordinate the activities of the deception center 598 and the sensors 510*a*-510*d*, 512*a*-512*d*, such as enabling the deception center 598 and the sensors 510*a*-510*d*, 512*a*-512*d* to connect to each other. In some implementations, the security services provider 596 is integrated into the cloud service 554. In some implementations, the security services provider 596 is controlled by a different entity than the entity that controls the site network. For example, the security services provider 596 may be an outside vendor. In some implementations, the security services provider 596 is controlled by the same entity as that controls the IoT network 500. In some implementations, the network security system does not include a security services provider 596.

Figure 6:
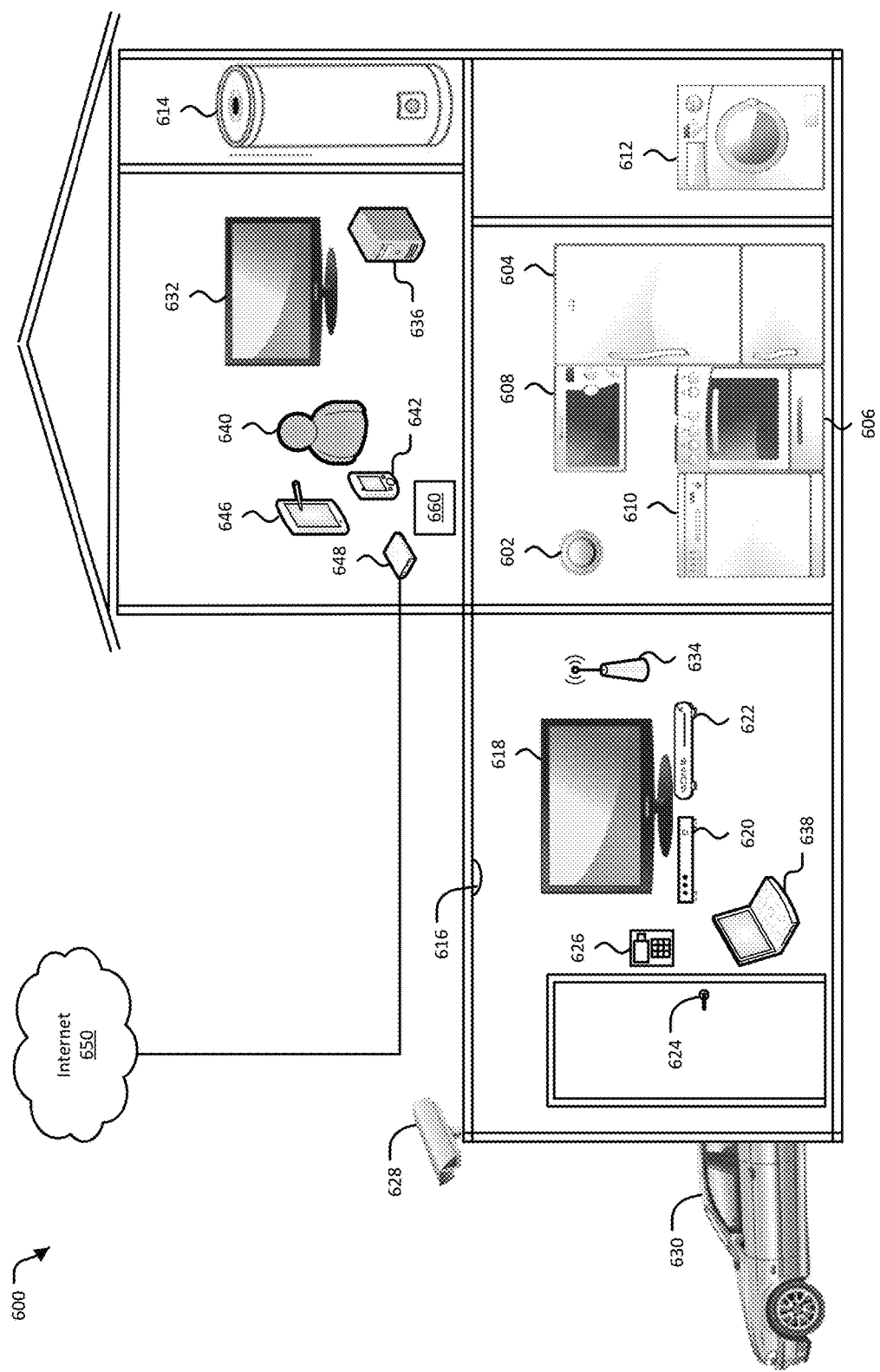
FIG. 6 illustrates an example of an Internet-of-Things network, here implemented in a private home.

IoT networks can also include small networks of non-traditional devices. FIG. 6 illustrates an example of a customer network that is a small network 600, here implemented in a private home. A network for a home is an example of small network that may have both traditional and non-traditional network devices connected to the network 600, in keeping with an Internet of Things approach. Home networks are also an example of networks that are often implemented with minimal security. The average homeowner is not likely to be a sophisticated network security expert, and may rely on his modem or router to provide at least some basic security. The homeowner, however, is likely able to at least set up a basic home network. A deception-based network security device may be as simple to set up as a home router or base station, yet provide sophisticated security for the network 600.

The example network 600 of FIG. 6 may be a single network, or may include multiple sub-networks. These sub-networks may or may not communicate with each other. For example, the network 600 may include a sub-network that uses the electrical wiring in the house as a communication channel. Devices configured to communicate in this way may connect to the network using electrical outlets, which also provide the devices with power. The sub-network may include a central controller device, which may coordinate the activities of devices connected to the electrical network, including turning devices on and off at particular times. One example of a protocol that uses the electrical wiring as a communication network is X10.

The network 600 may also include wireless and wired networks, built into the home or added to the home solely for providing a communication medium for devices in the house. Examples of wireless, radio-based networks include networks using protocols such as Z-Wave™, Zigbee™ (also known as Institute of Electrical and Electronics Engineers (IEEE) 802.15.4), Bluetooth™, and Wi-Fi (also known as IEEE 802.11), among others. Wireless networks can be set up by installing a wireless base station in the house. Alternatively or additionally, a wireless network can be established by having at least two devices in the house that are able to communicate with each other using the same protocol.

Examples of wired networks include Ethernet (also known as IEEE 802.3), token ring (also known as IEEE 802.5), Fiber Distributed Data Interface (FDDI), and Attached Resource Computer Network (ARCNET), among others. A wired network can be added to the house by running cabling through the walls, ceilings, and/or floors, and placing jacks in various rooms that devices can connect to with additional cables. The wired network can be extended using routers, switches, and/or hubs. In many cases, wired networks may be interconnected with wireless networks, with the interconnected networks operating as one seamless network. For example, an Ethernet network may include a wireless base station that provides a Wi-Fi signal for devices in the house.

As noted above, a small network 600 implemented in a home is one that may include both traditional network devices and non-traditional, everyday electronics and appliances that have also been connected to the network 600. Examples of rooms where one may find non-traditional devices connected to the network are the kitchen and laundry rooms. For example, in the kitchen a refrigerator 604, oven 606, microwave 608, and dishwasher 610 may be connected to the network 600, and in the laundry room a washing machine 612 may be connected to the network 600. By attaching these appliances to the network 600, the homeowner can monitor the activity of each device (e.g., whether the dishes are clean, the current state of a turkey in the oven, or the washing machine cycle) or change the operation of each device without needing to be in the same room or even be at home. The appliances can also be configured to resupply themselves. For example, the refrigerator 604 may detect that a certain product is running low, and may place an order with a grocery delivery service for the product to be restocked.

The network 600 may also include environmental appliances, such as a thermostat 602 and a water heater 614. By having these devices connected to the network 600, the homeowner can monitor the current environment of the house (e.g., the air temperature or the hot water temperature), and adjust the settings of these appliances while at home or away. Furthermore, software on the network 600 or on the Internet 650 may track energy usage for the heating and cooling units and the water heater 614. This software may also track energy usage for the other devices, such as the kitchen and laundry room appliances. The energy usage of each appliance may be available to the homeowner over the network 600.

In the living room, various home electronics may be on the network 600. These electronics may have once been fully analog or may have been standalone devices, but now include a network connection for exchanging data with other devices in the network 600 or with the Internet 650. The home electronics in this example include a television 618, a gaming system 620, and a media device 622 (e.g., a video and/or audio player). Each of these devices may play media hosted, for example, on network attached storage 636 located elsewhere in the network 600, or media hosted on the Internet 650.

The network 600 may also include home safety and security devices, such as a smoke detector 616, an electronic door lock 624, and a home security system 626. Having these devices on the network may allow the homeowner to track the information monitored and/or sensed by these devices, both when the homeowner is at home and away from the house. For example, the homeowner may be able to view a video feed from a security camera 628. When the safety and security devices detect a problem, they may also inform the homeowner. For example, the smoke detector 616 may send an alert to the homeowner's smartphone when it detects smoke, or the electronic door lock 624 may alert the homeowner when there has been a forced entry. Furthermore, the homeowner may be able to remotely control these devices. For example, the homeowner may be able to remotely open the electronic door lock 624 for a family member who has been locked out. The safety and security devices may also use their connection to the network to call the fire department or police if necessary.

Another non-traditional device that may be found in the network 600 is the family car 630. The car 630 is one of many devices, such as laptop computers 638, tablet computers 646, and smartphones 642, that connect to the network 600 when at home, and when not at home, may be able to connect to the network 600 over the Internet 650. Connecting to the network 600 over the Internet 650 may provide the homeowner with remote access to his network. The network 600 may be able to provide information to the car 630 and receive information from the car 630 while the car is away. For example, the network 600 may be able to track the location of the car 630 while the car 630 is away.

In the home office and elsewhere around the house, this example network 600 includes some traditional devices connected to the network 600. For example, the home office may include a desktop computer 632 and network attached storage 636. Elsewhere around the house, this example includes a laptop computer 638 and handheld devices such as a tablet computer 646 and a smartphone 642. In this example, a person 640 is also connected to the network 600. The person 640 may be connected to the network 600 wirelessly through personal devices worn by the person 640, such as a smart watch, fitness tracker, or heart rate monitor. The person 640 may alternatively or additionally be connected to the network 600 through a network-enabled medical device, such as a pacemaker, heart monitor, or drug delivery system, which may be worn or implanted.

The desktop computer 632, laptop computer 638, tablet computer 646, and/or smartphone 642 may provide an interface that allows the homeowner to monitor and control the various devices connected to the network. Some of these devices, such as the laptop computer 638, the tablet computer 646, and the smartphone 642 may also leave the house, and provide remote access to the network 600 over the Internet 650. In many cases, however, each device on the network may have its own software for monitoring and controlling only that one device. For example, the thermostat 602 may use one application while the media device 622 uses another, and the wireless network provides yet another. Furthermore, it may be the case that the various sub-networks in the house do not communicate with each other, and/or are viewed and controlled using software that is unique to each sub-network. In many cases, the homeowner may not have one unified and easily understood view of his entire home network 600.

The small network 600 in this example may also include network infrastructure devices, such as a router or switch (not shown) and a wireless base station 634. The wireless base station 634 may provide a wireless network for the house. The router or switch may provide a wired network for the house. The wireless base station 634 may be connected to the router or switch to provide a wireless network that is an extension of the wired network. The router or switch may be connected to a gateway device 648 that connects the network 600 to other networks, including the Internet 650. In some cases, a router or switch may be integrated into the gateway device 648. The gateway device 648 is a cable modem, digital subscriber line (DSL) modem, optical modem, analog modem, or some other device that connects the network 600 to an Internet Service Provider (ISP). The ISP may provide access to the Internet 650. Typically, a home network only has one gateway device 648. In some cases, the network 600 may not be connected to any networks outside of the house. In these cases, information about the network 600 and control of devices in the network 600 may not be available when the homeowner is not connected to the network 600; that is, the homeowner may not have access to his network 600 over the Internet 650.

Typically, the gateway device 648 includes a hardware and/or software firewall. A firewall monitors incoming and outgoing network traffic and, by applying security rules to the network traffic, attempts to keep harmful network traffic out of the network 600. In many cases, a firewall is the only security system protecting the network 600. While a firewall may work for some types of intrusion attempts originating outside the network 600, the firewall may not block all intrusion mechanisms, particularly intrusions mechanisms hidden in legitimate network traffic. Furthermore, while a firewall may block intrusions originating on the Internet 650, the firewall may not detect intrusions originating from within the network 600. For example, an infiltrator may get into the network 600 by connecting to signal from the Wi-Fi base station 634. Alternatively, the infiltrator may connect to the network 600 by physically connecting, for example, to the washing machine 612. The washing machine 612 may have a port that a service technician can connect to service the machine. Alternatively or additionally, the washing machine 612 may have a simple Universal Serial Bus (USB) port. Once an intruder has gained access to the washing machine 612, the intruder may have access to the rest of the network 600.

To provide more security for the network 600, a deception-based network security device 660 can be added to the network 600. In some implementations, the security device 660 is a standalone device that can be added to the network 600 by connecting it to a router or switch. In some implementations, the security device 660 can alternatively or additionally be connected to the network's 600 wireless sub-network by powering on the security device 660 and providing it with Wi-Fi credentials. The security device 660 may have a touchscreen, or a screen and a keypad, for inputting Wi-Fi credentials. Alternatively or additionally, the homeowner may be able to enter network information into the security device by logging into the security device 660 over a Bluetooth™ or Wi-Fi signal using software on a smartphone, tablet, or laptop, or using a web browser. In some implementations, the security device 660 can be connected to a sub-network running over the home's electrical wiring by connecting the security device 660 to a power outlet. In some implementations, the security device 660 may have ports, interfaces, and/or radio antennas for connecting to the various sub-networks that can be included in the network 600. This may be useful, for example, when the sub-networks do not communicate with each other, or do not communicate with each other seamlessly. Once powered on and connected, the security device 660 may self-configure and monitor the security of each sub-network in the network 600 that it is connected to.

In some implementations, the security device 660 may be configured to connect between the gateway device 648 and the network's 600 primary router, and/or between the gateway device 648 and the gateway device's 648 connection to the wall. Connected in one or both of these locations, the security device 660 may be able to control the network's 600 connection with outside networks. For example, the security device can disconnect the network 600 from the Internet 650.

In some implementations, the security device 660, instead of being implemented as a standalone device, may be integrated into one or more of the appliances, home electronics, or computing devices (in this example network 600), or in some other device not illustrated here. For example, the security device 660—or the functionality of the security device 660—may be incorporated into the gateway device 648 or a desktop computer 632 or a laptop computer 638. As another example, the security device 660 can be integrated into a kitchen appliance (e.g., the refrigerator 604 or microwave 608), a home media device (e.g., the television 618 or gaming system 620), or the home security system 626. In some implementations, the security device 660 may be a printed circuit board that can be added to another device without requiring significant changes to the other device. In some implementations, the security device 660 may be implemented using an Application Specific Integrated Circuit (ASIC) or Field Programmable Gate Array (FPGA) that can be added to the electronics of a device. In some implementations, the security device 660 may be implemented as a software module or modules that can run concurrently with the operating system or firmware of a networked device. In some implementations, the security device 660 may have a physical or virtual security barrier that prevents access to it by the device that it is integrated into. In some implementations, the security device's 660 presence in another device may be hidden from the device into which the security device 660 is integrated.

In various implementations, the security device 660 may scan the network 600 to determine which devices are present in the network 600. Alternatively or additionally, the security device 660 may communicate with a central controller in the network 600 (or multiple central controllers, when there are sub-networks, each with their own central controller) to learn which devices are connected to the network 600. In some implementations, the security device 660 may undergo a learning period, during which the security device 660 learns the normal activity of the network 600, such as what time of day appliances and electronics are used, what they are used for, and/or what data is transferred to and from these devices. During the learning period, the security device 660 may alert the homeowner to any unusual or suspicious activity. The homeowner may indicate that this activity is acceptable, or may indicate that the activity is an intrusion. As described below, the security device 660 may subsequently take preventive action against the intrusion.

Once the security device 660 has learned the topology and/or activity of the network 600, the security device 660 may be able to provide deception-based security for the network 600. In some implementations, the security device 660 may deploy security mechanisms that are configured to emulate devices that could be found in the network 600. In some implementations, the security device 660 may monitor activity on the network 600, including watching the data sent between the various devices on the network 600, and between the devices and the Internet 650. The security device 660 may be looking for activity that is unusual, unexpected, or readily identifiable as suspect. Upon detecting suspicious activity in the network 600, the security device 660 may deploy deceptive security mechanisms.

In some implementations, the deceptive security mechanisms are software processes running on the security device 660 that emulate devices that may be found in the network 600. In some implementations, the security device 660 may be assisted in emulating the security devices by another device on the network 600, such as the desktop computer 632. From the perspective of devices connected to the network 600, the security mechanisms appear just like any other device on the network, including, for example, having an Internet Protocol (IP) address, a Media Access Control (MAC) address, and/or some other identification information, having an identifiable device type, and responding to or transmitting data just as would the device being emulated. The security mechanisms may be emulated by the security device 660 itself; thus, while, from the point of view of the network 600, the network 600 appears to have additional devices, no physical equivalent (other than the security device 660) can be found in the house.

The devices and data emulated by a security mechanism are selected such that the security mechanism is an attractive target for intrusion attempts. Thus, the security mechanism may emulate valuable data, and/or devices that are easily hacked into, and/or devices that provide easy access to the reset of the network 600. Furthermore, the security mechanisms emulate devices that are likely to be found in the network 600, such as a second television, a second thermostat, or another laptop computer. In some implementations, the security device 660 may contact a service on the Internet 650 for assistance in selecting devices to emulate and/or for how to configure emulated devices. The security devices 660 may select and configure security mechanisms to be attractive to intrusions attempts, and to deflect attention away from more valuable or vulnerable network assets. Additionally, the security mechanisms can assist in confirming that an intrusion into the network 600 has actually taken place.

In some implementations, the security device 660 may deploy deceptive security mechanisms in advance of detecting any suspicious activity. For example, having scanned the network, the security device 660 may determine that the network 600 includes only one television 618 and one smoke detector 616. The security device 660 may therefore choose to deploy security mechanisms that emulate a second television and a second smoke detector. With security mechanisms preemptively added to the network, when there is an intrusion attempt, the intruder may target the security mechanisms instead of valuable or vulnerable network devices. The security mechanisms thus may serve as decoys and may deflect an intruder away from the network's 600 real devices.

In some implementations, the security mechanisms deployed by the security device 660 may take into account specific requirements of the network 600 and/or the type of devices that can be emulated. For example, in some cases, the network 600 (or a sub-network) may assign identifiers to each device connected to the network 600, and/or each device may be required to adopt a unique identifier. In these cases, the security device 660 may assign an identifier to deployed security mechanisms that do not interfere with identifiers used by actual devices in the network 600. As another example, in some cases, devices on the network 600 may register themselves with a central controller and/or with a central service on the Internet 650. For example, the thermostat 602 may register with a service on the Internet 650 that monitors energy use for the home. In these cases, the security mechanisms that emulate these types of devices may also register with the central controller or the central service. Doing so may improve the apparent authenticity of the security mechanism, and may avoid conflicts with the central controller or central service. Alternatively or additionally, the security device 660 may determine to deploy security mechanisms that emulate other devices, and avoid registering with the central controller or central service.

In some implementations, the security device 660 may dynamically adjust the security mechanisms that it has deployed. For example, when the homeowner adds devices to the network 600, the security device 660 may remove security mechanisms that conflict with the new devices, or change a security mechanism so that the security mechanism's configuration is not incongruous with the new devices (e.g., the security mechanisms should not have the same MAC address as a new device). As another example, when the network owner removes a device from the network 600, the security device 660 may add a security mechanism that mimics the device that was removed. As another example, the security device may change the activity of a security mechanism, for example, to reflect changes in the normal activity of the home, changes in the weather, the time of year, the occurrence of special events, and so on.

The security device 660 may also dynamically adjust the security mechanisms it has deployed in response to suspicious activity it has detected on the network 600. For example, upon detecting suspicious activity, the security device 660 may change the behavior of a security mechanism or may deploy additional security mechanisms. The changes to the security mechanisms may be directed by the suspicious activity, meaning that if, for example, the suspicious activity appears to be probing for a wireless base station 634, the security device 660 may deploy a decoy wireless base station.

Changes to the security mechanisms are meant not only to attract a possible intrusion, but also to confirm that an intrusion has, in fact, occurred. Since the security mechanisms are not part of the normal operation of the network 600, normal occupants of the home are not expected to access the security mechanisms. Thus, in most cases, any access of a security mechanism is suspect. Once the security device 660 has detected an access to a security mechanism, the security device 660 may next attempt to confirm that an intrusion into the network 600 has taken place. An intrusion can be confirmed, for example, by monitoring activity at the security mechanism. For example, login attempts, probing of data emulated by the security mechanism, copying of data from the security mechanism, and attempts to log into another part of the network 600 from the security mechanism indicate a high likelihood that an intrusion has occurred.

Once the security device 660 is able to confirm an intrusion into the network 600, the security device 660 may alert the homeowner. For example, the security device 660 may sound an audible alarm, send an email or text message to the homeowner or some other designated persons, and/or send an alert to an application running on a smartphone or tablet. As another example, the security device 660 may access other network devices and, for example, flash lights, trigger the security system's 626 alarm, and/or display messages on devices that include display screens, such as the television 618 or refrigerator 604. In some implementations, depending on the nature of the intrusion, the security device 660 may alert authorities such as the police or fire department.

In some implementations, the security device 660 may also take preventive actions. For example, when an intrusion appears to have originated outside the network 600, the security device 660 may block the network's 600 access to the Internet 650, thus possibly cutting off the intrusion. As another example, when the intrusion appears to have originated from within the network 600, the security device 660 may isolate any apparently compromised devices, for example by disconnecting them from the network 600. When only its own security mechanisms are compromised, the security device 660 may isolate itself from the rest of the network 600. As another example, when the security device 660 is able to determine that the intrusion very likely included physical intrusion into the house, the security device 660 may alert the authorities. The security device 660 may further lock down the house by, for example, locking any electronic door locks 624.

In some implementations, the security device 660 may be able to enable a homeowner to monitor the network 600 when a suspicious activity has been detected, or at any other time. For example, the homeowner may be provided with a software application that can be installed on a smartphone, tablet, desktop, and/or laptop computer. The software application may receive information from the security device 660 over a wired or wireless connection. Alternatively or additionally, the homeowner may be able to access information about his network through a web browser, where the security device 660 formats webpages for displaying the information. Alternatively or additionally, the security device 660 may itself have a touchscreen or a screen and key pad that provide information about the network 600 to the homeowner.

The information provided to the homeowner may include, for example, a list and/or graphic display of the devices connected to the network 600. The information may further provide a real-time status of each device, such as whether the device is on or off, the current activity of the device, data being transferred to or from the device, and/or the current user of the device, among other things. The list or graphic display may update as devices connect and disconnect from the network 600, such as for example laptops and smartphones connecting to or disconnecting from a wireless sub-network in the network 600. The security device 660 may further alert the homeowner when a device has unexpectedly been disconnected from the network 600. The security device 660 may further alert the homeowner when an unknown device connects to the network 600, such as for example when a device that is not known to the homeowner connects to the Wi-Fi signal.

The security device 660 may also maintain historic information. For example, the security device 660 may provide snapshots of the network 600 taken once a day, once a week, or once a month. The security device 660 may further provide a list of devices that have, for example, connected to the wireless signal in the last hour or day, at what times, and for how long. The security device 660 may also be able to provide identification information for these devices, such as MAC addresses or usernames. As another example, the security device 660 may also maintain usage statistics for each device in the network 600, such as for example the times at which each device was in use, what the device was used for, how much energy the device used, and so on.

The software application or web browser or display interface that provides the homeowner with information about his network 600 may also enable the homeowner to make changes to the network 600 or to devices in the network 600. For example, through the security device 660, the homeowner may be able to turn devices on or off, change the configuration of a device, change a password for a device or for the network, and so on.

In some implementations, the security device 660 may also display currently deployed security mechanisms and their configuration. In some implementations, the security device 660 may also display activity seen at the security mechanisms, such as for example a suspicious access to a security mechanism. In some implementations, the security device 660 may also allow the homeowner to customize the security mechanisms. For example, the homeowner may be able to add or remove security mechanisms, modify data emulated by the security mechanisms, modify the configuration of security mechanism, and/or modify the activity of a security mechanism.

A deception-based network security device 660 thus can provide sophisticated security for a small network. The security device 660 may be simple to add to a network, yet provide comprehensive protection against both external and internal intrusions. Moreover, the security device 660 may be able to monitor multiple sub-networks that are each using different protocols. The security device 660, using deceptive security mechanisms, may be able to detect and confirm intrusions into the network 600. The security device 660 may be able to take preventive actions when an intrusion occurs. The security device 660 may also be able to provide the homeowner with information about his network, and possibly also control over devices in the network.

Figure 7:
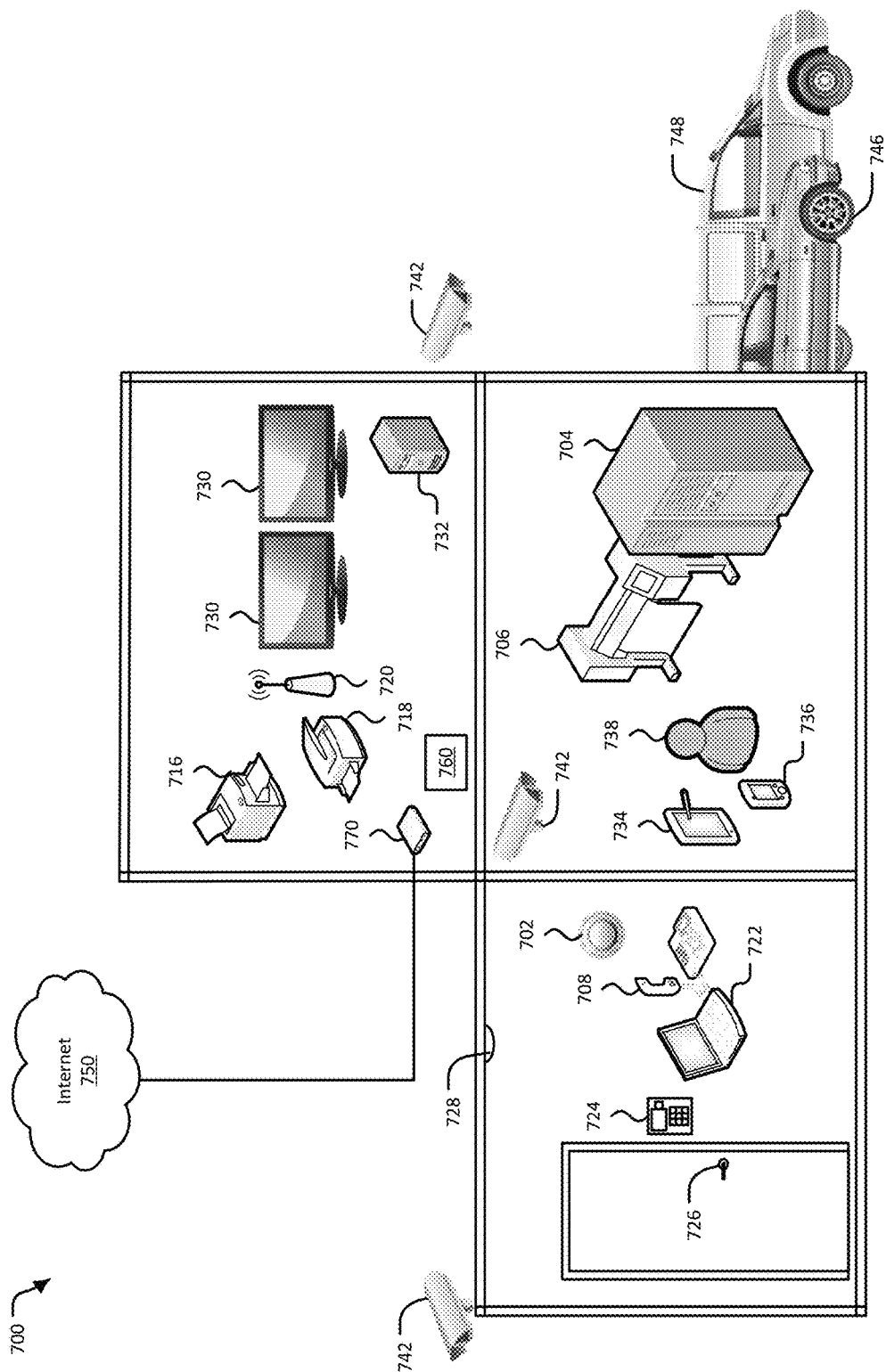
FIG. 7 illustrates an Internet-of-Things network, here implemented in a small business.

FIG. 7 illustrates another example of a small network 700, here implemented in a small business. A network in a small business may have both traditional and non-traditional devices connected to the network 700. Small business networks are also examples of networks that are often implemented with minimal security. A small business owner may not have the financial or technical resources, time, or expertise to configure a sophisticated security infrastructure for her network 700. The business owner, however, is likely able to at least set up a network 700 for the operation of the business. A deception-based network security device that is at least as simple to set up as the network 700 itself may provide inexpensive and simple yet sophisticated security for the network 700.

The example network 700 may be one, single network, or may include multiple sub-networks. For example, the network 700 may include a wired sub-network, such as an Ethernet network, and a wireless sub-network, such as an 802.11 Wi-Fi network. The wired sub-network may be implemented using cables that have been run through the walls and/or ceilings to the various rooms in the business. The cables may be connected to jacks in the walls that devices can connect to in order to connect to the network 700. The wireless network may be implemented using a wireless base station 720, or several wireless base stations, which provide a wireless signal throughout the business. The network 700 may include other wireless sub-networks, such as a short-distance Bluetooth™ network. In some cases, the sub-networks communicate with one another. For example, the Wi-Fi sub-network may be connected to the wired Ethernet sub-network. In some cases, the various sub-networks in the network 700 may not be configured to or able to communicate with each other.

As noted above, the small business network 700 may include both computers, network infrastructure devices, and other devices not traditionally found in a network. The network 700 may also include electronics, machinery, and systems that have been connected to the network 700 according to an Internet-of-Things approach. Workshop machinery that was once purely analog may now have computer controls. Digital workshop equipment may be network-enabled. By connecting shop equipment and machinery to the network 700, automation and efficiency of the business can be improved and orders, materials, and inventory can be tracked. Having more devices on the network 700, however, may increase the number of vulnerabilities in the network 700. Devices that have only recently become network-enabled may be particularly vulnerable because their security systems have not yet been hardened through use and attack. A deception-based network security device may provide simple-to-install and sophisticated security for a network that may otherwise have only minimal security.

The example small business of FIG. 7 includes a front office. In the front office, the network may include devices for administrative tasks. These devices may include, for example, a laptop computer 722 and a telephone 708. These devices may be attached to the network 700 in order to, for example, access records related to the business, which may be stored on a server 732 located elsewhere in the building. In the front office, security devices for the building may also be found, including, for example, security system controls 724 and an electronic door lock 726. Having the security devices on the network 700 may enable the business owner to remotely control access to the building. The business owner may also be able to remotely monitor the security of building, such as for example being able to view video streams from security cameras 742. The front office may also be where environmental controls, such as a thermostat 702, are located. Having the thermostat 702 on the network 700 may allow the business owner to remotely control the temperature settings. A network-enabled thermostat 702 may also track energy usage for the heating and cooling systems. The front office may also include safety devices, such as a network-connected smoke alarm 728. A network-connected smoke alarm may be able to inform the business owner that there is a problem in the building be connecting to the business owner's smartphone or computer.

Another workspace in this example small business is a workshop. In the workshop, the network 700 may include production equipment for producing the goods sold by the business. The production equipment may include, for example, manufacturing machines 704 (e.g. a milling machine, a Computer Numerical Control (CNC) machine, a 3D printer, or some other machine tool) and a plotter 706. The production equipment may be controlled by a computer on the network 700, and/or may receive product designs over the network 700 and independently execute the designs. In the workshop, one may also find other devices related to the manufacturing of products, such as radiofrequency identification (RFID) scanners, barcode or Quick Response (QR) code generators, and other devices for tracking inventory, as well as electronic tools, hand tools, and so on.

In the workshop and elsewhere in the building, mobile computing devices and people 738 may also be connected to the network 700. Mobile computing devices include, for example, tablet computers 734 and smartphones 736. These devices may be used to control production equipment, track supplies and inventory, receive and track orders, and/or for other operations of the business. People 738 may be connected to the network through network-connected devices worn or implanted in the people 738, such as for example smart watches, fitness trackers, heart rate monitors, drug delivery systems, pacemakers, and so on.

At a loading dock, the example small business may have a delivery van 748 and a company car 746. When these vehicles are away from the business, they may be connected to the network 700 remotely, for example over the Internet 750. By being able to communicate with the network 700, the vehicles may be able to receive information such as product delivery information (e.g., orders, addresses, and/or delivery times), supply pickup instructions, and so on. The business owner may also be able to track the location of these vehicles from the business location, or over the Internet 750 when away from the business, and/or track who is using the vehicles.

The business may also have a back office. In the back office, the network 700 may include traditional network devices, such as computers 730, a multi-function printer 716, a scanner 718, and a server 732. In this example, the computers 730 may be used to design products for manufacturing in the workshop, as well as for management of the business, including tracking orders, supplies, inventory, and/or human resources records. The multi-function printer 716 and scanner 718 may support the design work and the running of the business. The server 732 may store product designs, orders, supply records, and inventory records, as well as administrative data, such as accounting and human resources data.

The back office may also be where a gateway device 770 is located. The gateway device 770 connects the small business to other networks, including the Internet 750. Typically, the gateway device 770 connects to an ISP, and the ISP provides access to the Internet 750. In some cases, a router may be integrated into the gateway device 770. In some cases, gateway device 770 may be connected to an external router, switch, or hub, not illustrated here. In some cases, the network 700 is not connected to any networks outside of the business's own network 700. In these cases, the network 700 may not have a gateway device 770.

The back office is also where the network 700 may have a deception-based network security device 760. The security device 760 may be a standalone device that may be enabled as soon as it is connected to the network 700. Alternatively or additionally, the security device 760 may be integrated into another device connected to the network 700, such as the gateway device 770, a router, a desktop computer 730, a laptop computer 722, the multi-function printer 716, or the thermostat 702, among others. When integrated into another device, the security device 760 may use the network connection of the other device, or may have its own network connection for connecting to the network 700. The security device 760 may connect to the network 700 using a wired connection or a wireless connection.

Once connected to the network 700, the security device 760 may begin monitoring the network 700 for suspect activity. In some implementations, the security device 760 may scan the network 700 to learn which devices are connected to the network 700. In some cases, the security device 760 may learn the normal activity of the network 700, such as what time the various devices are used, for how long, by whom, for what purpose, and what data is transferred to and from each device, among other things.

In some implementations, having learned the configuration and/or activity of the network 700, the security device 760 may deploy deceptive security mechanisms. These security mechanisms may emulate devices that may be found on the network 700, including having an identifiable device type and/or network identifiers (such as a MAC address and/or IP address), and being able to send and receive network traffic that a device of a certain time would send and receive. For example, for the example small business, the security device 760 may configure a security mechanism to emulate a 3D printer, a wide-body scanner, or an additional security camera. The security device 760 may further avoid configuring a security mechanism to emulate a device that is not likely to be found in the small business, such as a washing machine. The security device 760 may use the deployed security mechanisms to monitor activity on the network 700.

In various implementations, when the security device 760 detects suspect activity, the security device 760 may deploy additional security mechanisms. These additional security mechanisms may be selected based on the nature of suspect activity. For example, when the suspect activity appears to be attempting to break into the shop equipment, the security device 760 may deploy a security mechanism that looks like shop equipment that is easy to hack. In some implementations, the security device 760 may deploy security mechanisms only after detecting suspect activity on the network 700.

The security device 760 selects devices to emulate that are particularly attractive for an infiltration, either because the emulated device appears to have valuable data or because the emulated device appears to be easy to infiltrate, or for some other reason. In some implementations, the security device 760 connects to a service on the Internet 750 for assistance in determining which devices to emulate and/or how to configure the emulated device. Once deployed, the security mechanisms serve as decoys to attract the attention of a possible infiltrator away from valuable network assets. In some implementations, the security device 760 emulates the security mechanisms using software processes. In some implementations, the security device 760 may be assisted in emulating security mechanisms by a computer 730 on the network.

In some implementations, the security device 760 may deploy security mechanisms prior to detecting suspicious activity on the network 700. In these implementations, the security mechanisms may present more attractive targets for a possible, future infiltration, so that if an infiltration occurs, the infiltrator will go after the security mechanisms instead of the actual devices on the network 700.

In various implementations, the security device 760 may also change the security mechanisms that it has deployed. For example, the security device 760 may add or remove security mechanisms as the operation of the business changes, as the activity on the network 700 changes, as devices are added or removed from the network 700, as the time of year changes, and so on.

Besides deflecting a possible network infiltration away from valuable or vulnerable network devices, the security device 760 may use the security mechanisms to confirm that the network 700 has been infiltrated. Because the security mechanisms are not part of actual devices in use by the business, any access to them over the network is suspect. Thus, once the security device 760 detects an access to one of its security mechanisms, the security device 760 may attempt to confirm that this access is, in fact, an unauthorized infiltration of the network 700.

To confirm that a security mechanism has been infiltrated, the security device 760 may monitor activity seen at the security mechanism. The security device 760 may further deploy additional security mechanisms, to see if, for example, it can present an even more attractive target to the possible infiltrator. The security device 760 may further look for certain activity, such as log in attempts to other devices in the network, attempts to examine data on the security mechanism, attempts to move data from the security mechanism to the Internet 750, scanning of the network 700, password breaking attempts, and so on.

Once the security device 760 has confirmed that the network 700 has been infiltrated, the security device 760 may alert the business owner. For example, the security device 760 may sound an audible alarm, email or send text messages to the computers 730 and/or handheld devices 734, 736, send a message to the business's cars 746, 748, flash lights, or trigger the security system's 724 alarm. In some implementations, the security device 760 may also take preventive measures. For example, the security device 760 may disconnect the network 700 from the Internet 750, may disconnect specific devices from the network 700 (e.g., the server 732 or the manufacturing machines 704), may turn some network-connected devices off, and/or may lock the building.

In various implementations, the security device 760 may allow the business owner to monitor her network 700, either when an infiltration is taking place or at any other time. For example, the security device 760 may provide a display of the devices currently connected to the network 700, including flagging any devices connected to the wireless network that do not appear to be part of the business. The security device 760 may further display what each device is currently doing, who is using them, how much energy each device is presently using, and/or how much network bandwidth each device is using. The security device 760 may also be able to store this information and provide historic configuration and/or usage of the network 700.

The security device 760 may have a display it can use to show information to the business owner. Alternatively or additionally, the security device 760 may provide this information to a software application that can run on a desktop or laptop computer, a tablet, or a smartphone. Alternatively or additionally, the security device 760 may format this information for display through a web browser. The business owner may further be able to control devices on the network 700 through an interface provided by the security device 760, including, for example, turning devices on or off, adjusting settings on devices, configuring user accounts, and so on. The business owner may also be able to view any security mechanisms presently deployed, and may be able to re-configure the security mechanisms, turn them off, or turn them on.

IoT networks can also include industrial control systems. Industrial control system is a general term that encompasses several types of control systems, including supervisory control and data acquisition (SCADA) systems, distributed control systems (DCS) and other control system configurations, such as Programmable Logic Controllers (PLCs), often found in the industrial sectors and infrastructures. Industrial control systems are often found in industries such as electrical, water and wastewater, oil and natural gas, chemical, transportation, pharmaceutical, pulp and paper, food and beverage, and discrete manufacturing (e.g., automotive, aerospace, and durable goods). While a large percentage of industrial control systems may be privately owned and operated, federal agencies also operate many industrial processes, such as air traffic control systems and materials handling (e.g., Postal Service mail handling).

Figure 8:
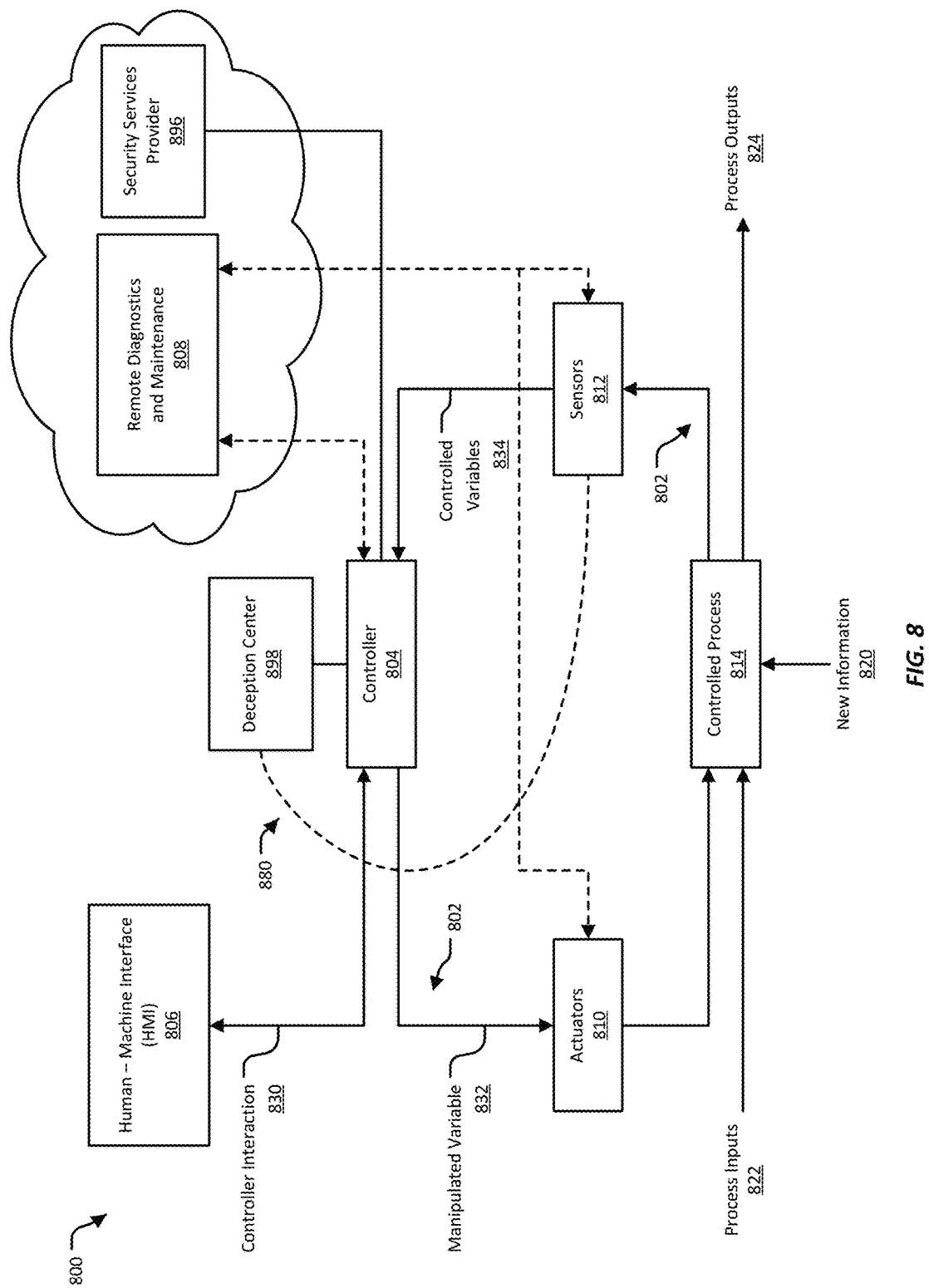
FIG. 8 illustrates an example of the basic operation of an industrial control system.

FIG. 8 illustrates an example of the basic operation of an industrial control system 800. Generally, an industrial control system 800 may include a control loop 802, a human-machine interface 806, and remote diagnostics and maintenance 808. In some implementations, the example industrial control system can be defended by a network threat detection and analysis system, which can include a deception center 898 and a security services provider 896.

A control loop 802 may consist of sensors 812, controller 804 hardware such as PLCs, actuators 810, and the communication of variables 832, 834. The sensors 812 may be used for measuring variables in the system, while the actuators 810 may include, for example, control valves breakers, switches, and motors. Some of the sensors 812 may be deceptions sensors. Controlled variables 834 may be transmitted to the controller 804 from the sensors 812. The controller 804 may interpret the controlled variables 834 and generates corresponding manipulated variables 832, based on set points provided by controller interaction 830. The controller 804 may then transmit the manipulated variables 832 to the actuators 810. The actuators 810 may drive a controlled process 814 (e.g., a machine on an assembly line). The controlled process 814 may accept process inputs 822 (e.g., raw materials) and produce process outputs 824 (e.g., finished products). New information 820 provided to the controlled process 814 may result in new sensor 812 signals, which identify the state of the controlled process 814 and which may also transmitted to the controller 804.

In some implementations, at least some of the sensors 812 can also provide the deception center 898 with visibility into the industrial control system 800, such as for example being able to present or project deceptive security mechanisms into the industrial control system. Additionally, in various implementations, the sensors 812 may provide a portal through which a suspected attack on the industrial control system can be redirected to the deception center 898. The deception center 898 and the sensors 812 may be able to communicate using network tunnels 880.

The deception center 898 provides network security for the industrial control system 800 by deploying security mechanisms into the industrial control system 800, monitoring the industrial control system through the security mechanisms, detecting and redirecting apparent threats, and analyzing network activity resulting from the apparent threat. In some implementations, the industrial control system 800 can include more than one deception center 898. In some implementations, the deception center may be located off-site, such as on the Internet.

In some implementations, the deception center 898 may interact with a security services provider 896 located outside the industrial control system 800. The security services provider 896 may act as a central hub for providing security to multiple sites that are part of the industrial control system 800, and/or for multiple separate, possibly unrelated, industrial control systems. For example, the security services provider 896 may communicate with multiple deception centers 898 that each provide security for a different industrial control system 800 for the same organization. As another example, the security services provider 896 may coordinate the activities of the deception center 898 and the sensors 812, such as enabling the deception center 898 and the sensors 812 to connect to each other. In some implementations, the security services provider 896 is located outside the industrial control system 800. In some implementations, the security services provider 896 is controlled by a different entity than the entity that controls the site network. For example, the security services provider 896 may be an outside vendor. In some implementations, the security services provider 896 is controlled by the same entity as that controls the industrial control system. In some implementations, the network security system does not include a security services provider 896.

The human-machine interface 806 provides operators and engineers with an interface for controller interaction 830. Controller interaction 830 may include monitoring and configuring set points and control algorithms, and adjusting and establishing parameters in the controller 804. The human-machine interface 806 typically also receives information from the controller 804 that allows the human-machine interface 806 to display process status information and historical information about the operation of the control loop 802.

The remote diagnostics and maintenance 808 utilities are typically used to prevent, identify, and recover from abnormal operation or failures. For diagnostics, the remote diagnostics and maintenance utilities 808 may monitor the operation of each of the controller 804, sensors 812, and actuators 810. To recover after a problem, the remote diagnostics and maintenance 808 utilities may provide recovery information and instructions to one or more of the controller 804, sensors 812, and/or actuators 810.

A typical industrial control system contains many control loops, human-machine interfaces, and remote diagnostics and maintenance tools, built using an array of network protocols on layered network architectures. In some cases, multiple control loops are nested and/or cascading, with the set point for one control loop being based on process variables determined by another control loop. Supervisory-level control loops and lower-level control loops typically operate continuously over the duration of a process, with cycle times ranging from milliseconds to minutes.

One type of industrial control system that may include many control loops, human-machine interfaces, and remote diagnostics and maintenance tools is a supervisory control and data acquisition (SCADA) system. SCADA systems are used to control dispersed assets, where centralized data acquisition is typically as important as control of the system. SCADA systems are used in distribution systems such as, for example, water distribution and wastewater collection systems, oil and natural gas pipelines, electrical utility transmission and distribution systems, and rail and other public transportation systems, among others. SCADA systems typically integrate data acquisition systems with data transmission systems and human-machine interface software to provide a centralized monitoring and control system for numerous process inputs and outputs. SCADA systems are typically designed to collect field information, transfer this information to a central computer facility, and to display the information to an operator in a graphic and/or textual manner. Using this displayed information, the operator may, in real time, monitor and control an entire system from a central location. In various implementations, control of any individual sub-system, operation, or task can be automatic, or can be performed by manual commands.

Figure 9:
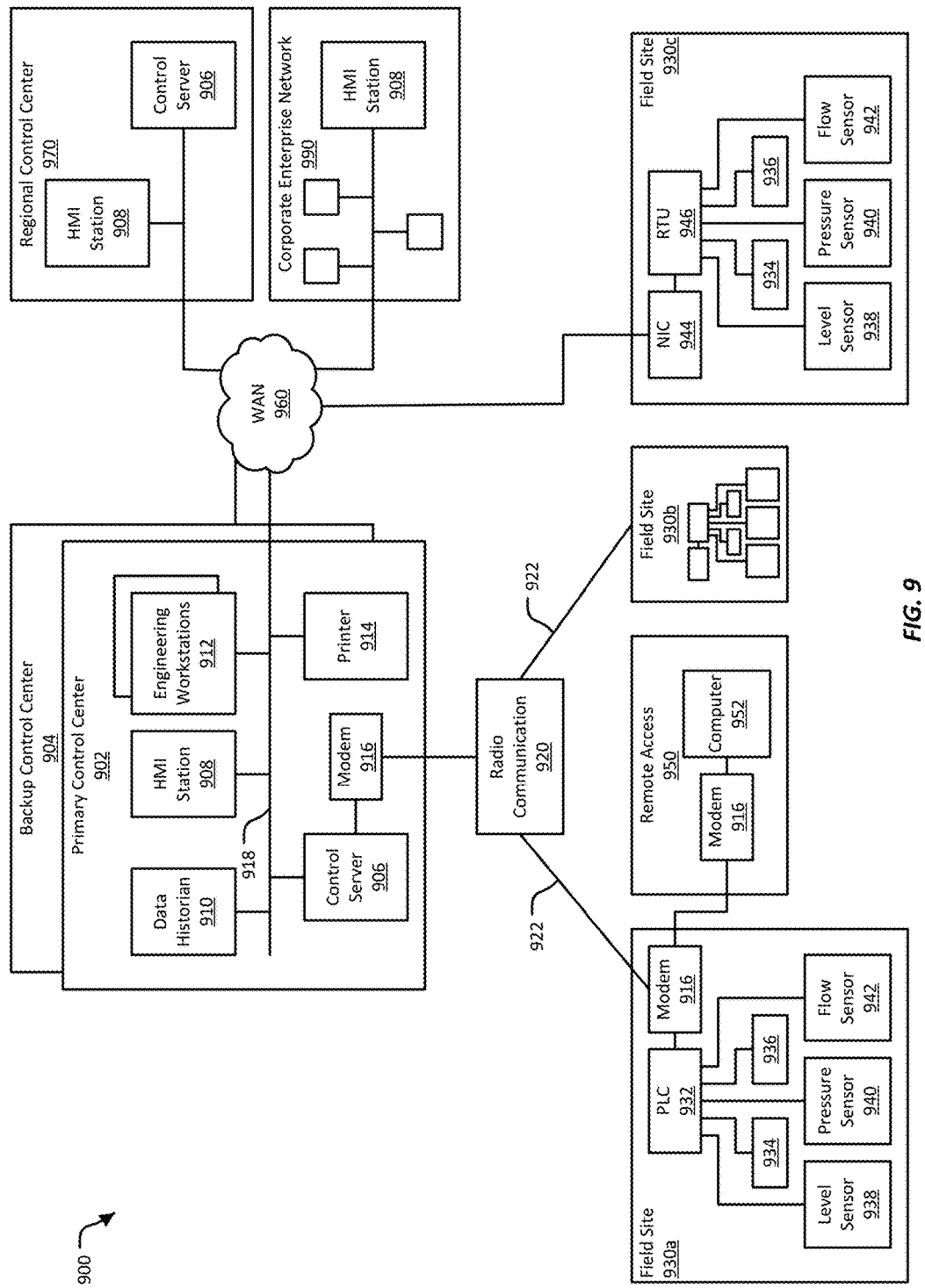
FIG. 9 illustrates an example of a SCADA system, here used for distributed monitoring and control.

FIG. 9 illustrates an example of a SCADA system 900, here used for distributed monitoring and control. This example SCADA system 900 includes a primary control center 902 and three field sites 930a-930c. A backup control center 904 provides redundancy in case of there is a malfunction at the primary control center 902. The primary control center 902 in this example includes a control server 906—which may also be called a SCADA server or a Master Terminal Unit (MTU)—and a local area network (LAN) 918. The primary control center 902 may also include a human-machine interface station 908, a data historian 910, engineering workstations 912, and various network equipment such as printers 914, each connected to the LAN 918.

The control server 906 typically acts as the master of the SCADA system 900. The control server 906 typically includes supervisory control software that controls lower-level control devices, such as Remote Terminal Units (RTUs) and PLCs, located at the field sites 930a-930c. The software may tell the system 900 what and when to monitor, what parameter ranges are acceptable, and/or what response to initiate when parameters are outside of acceptable values.

The control server 906 of this example may access Remote Terminal Units and/or PLCs at the field sites 930a-930c using a communications infrastructure, which may include radio-based communication devices, telephone lines, cables, and/or satellites. In the illustrated example, the control server 906 is connected to a modem 916, which provides communication with serial-based radio communication 920, such as a radio antenna. Using the radio communication 920, the control server 906 can communicate with field sites 930a-930b using radiofrequency signals 922. Some field sites 930a-930b may have radio transceivers for communicating back to the control server 906.

A human-machine interface station 908 is typically a combination of hardware and software that allows human operators to monitor the state of processes in the SCADA system 900. The human-machine interface station 908 may further allow operators to modify control settings to change a control objective, and/or manually override automatic control operations, such as in the event of an emergency. The human-machine interface station 908 may also allow a control engineer or operator to configure set points or control algorithms and parameters in a controller, such as a Remote Terminal Unit or a PLC. The human-machine interface station 908 may also display process status information, historical information, reports, and other information to operators, administrators, mangers, business partners, and other authorized users. The location, platform, and interface of a human-machine interface station 908 may vary. For example, the human-machine interface station 908 may be a custom, dedicated platform in the primary control center 902, a laptop on a wireless LAN, or a browser on a system connected to the Internet.

The data historian 910 in this example is a database for logging all process information within the SCADA system 900. Information stored in this database can be accessed to support analysis of the system 900, for example for statistical process control or enterprise level planning.

The backup control center 904 may include all or most of the same components that are found in the primary control center 902. In some cases, the backup control center 904 may temporarily take over for components at the primary control center 902 that have failed or have been taken offline for maintenance. In some cases, the backup control center 904 is configured to take over all operations of the primary control center 902, such as when the primary control center 902 experiences a complete failure (e.g., is destroyed in a natural disaster).

The primary control center 902 may collect and log information gathered by the field sites 930a-930c and display this information using the human-machine interface station 908. The primary control center 902 may also generate actions based on detected events. The primary control center 902 may, for example, poll field devices at the field sites 930a-930c for data at defined intervals (e.g., 5 or 60 seconds), and can send new set points to a field device as required. In addition to polling and issuing high-level commands, the primary control center 902 may also watch for priority interrupts coming from the alarm systems at the field sites 930a-930c.

In this example, the primary control center 902 uses point-to-point connections to communication with three field sites 930a-930c, using radio telemetry for two communications with two of the field sites 930a-930b. In this example, the primary control center 902 uses a wide area network (WAN) 960 to communicate with the third field site 930c. In other implementations, the primary control center 902 may use other communication topologies to communicate with field sites. Other communication topologies include rings, stars, meshes, trees, lines or series, and busses or multi-drops, among others. Standard and proprietary communication protocols may be used to transport information between the primary control center 902 and field sites 930a-930c. These protocols may use telemetry techniques such as provided by telephone lines, cables, fiber optics, and/or radiofrequency transmissions such as broadcast, microwave, and/or satellite communications.

The field sites 930a-930c in this example perform local control of actuators and monitor local sensors. For example, a first field site 930a may include a PLC 932. A PLC is a small industrial computer originally designed to perform the logic functions formerly executed by electrical hardware (such as relays, switches, and/or mechanical timers and counters). PLCs have evolved into controllers capable of controlling complex processes, and are used extensively in both SCADA systems and distributed control systems. Other controllers used at the field level include process controllers and Remote Terminal Units, which may provide the same level of control as a PLC but may be designed for specific control applications. In SCADA environments, PLCs are often used as field devices because they are more economical, versatile, flexible, and configurable than special-purpose controllers.

The PLC 932 at a field site, such as the first field site 930a, may control local actuators 934, 936 and monitor local sensors 938, 940, 942. Examples of actuators include valves 934 and pumps 936, among others. Examples of sensors include level sensors 938, pressure sensors 940, and flow sensors 942, among others. Any of the actuators 934, 936 or sensors 938, 940, 942 may be "smart" actuators or sensors, more commonly called intelligent electronic devices (LEDs). Intelligent electronic devices may include intelligence for acquiring data, communicating with other devices, and performing local processing and control. An intelligent electronic device could combine an analog input sensor, analog output, low-level control capabilities, a communication system, and/or program memory in one device. The use of intelligent electronic devices in SCADA systems and distributed control systems may allow for automatic control at the local level. Intelligent electronic devices, such as protective relays, may communicate directly with the control server 906. Alternatively or additionally, a local Remote Terminal Unit may poll intelligent electronic devices to collect data, which it may then pass to the control server 906.

Field sites 930a-930c are often equipped with remote access capability that allows field operators to perform remote diagnostics and repairs. For example, the first remote 930a may include a modem 916 connected to the PLC 932. A remote access 950 site may be able to, using a dial up connection, connect to the modem 916. The remote access 950 site may include its own modem 916 for dialing into to the field site 930a over a telephone line. At the remote access 950 site, an operator may use a computer 952 connected to the modem 916 to perform diagnostics and repairs on the first field site 930a.

The example SCADA system 900 includes a second field site 930b, which may be provisioned in substantially the same way as the first field site 930a, having at least a modem and a PLC or Remote Terminal that controls and monitors some number of actuators and sensors.

The example SCADA system 900 also includes a third field site 930c that includes a network interface card (MC) 944 for communicating with the system's 900 WAN 960. In this example, the third field site 930c includes a Remote Terminal Unit 946 that is responsible for controlling local actuators 934, 936 and monitoring local sensors 938, 940, 942. A Remote Terminal Unit, also called a remote telemetry unit, is a special-purpose data acquisition and control unit typically designed to support SCADA remote stations. Remote Terminal Units may be field devices equipped with wireless radio interfaces to support remote situations where wire-based communications are unavailable. In some cases, PLCs are implemented as Remote Terminal Units.

The SCADA system 900 of this example also includes a regional control center 970 and a corporate enterprise network 990. The regional control center 970 may provide a higher level of supervisory control. The regional control center 970 may include at least a human-machine interface station 908 and a control server 906 that may have supervisory control over the control server 906 at the primary control center 902. The corporate enterprise network 990 typically has access, through the system's 900 WAN 960, to all the control centers 902, 904 and to the field sites 930a-930c. The corporate enterprise network 990 may include a human-machine interface station 908 so that operators can remotely maintain and troubleshoot operations.

Another type of industrial control system is the distributed control system (DCS). Distributed control systems are typically used to control production systems within the same geographic location for industries such as oil refineries, water and wastewater management, electric power generation plants, chemical manufacturing plants, and pharmaceutical processing facilities, among others. These systems are usually process control or discrete part control systems. Process control systems may be processes that run continuously, such as manufacturing processes for fuel or steam flow in a power plant, for petroleum production in a refinery, or for distillation in a chemical plant. Discrete part control systems have processes that have distinct processing steps, typically with a distinct start and end to each step, such as found in food manufacturing, electrical and mechanical parts assembly, and parts machining. Discrete-based manufacturing industries typically conduct a series of steps on a single item to create an end product.

A distributed control system typically uses a centralized supervisory control loop to mediate a group of localized controllers that share the overall tasks of carrying out an entire production process. By modularizing the production system, a distributed control system may reduce the impact of a single fault on the overall system. A distributed control system is typically interfaced with a corporate network to give business operations a view of the production process.

Figure 10:
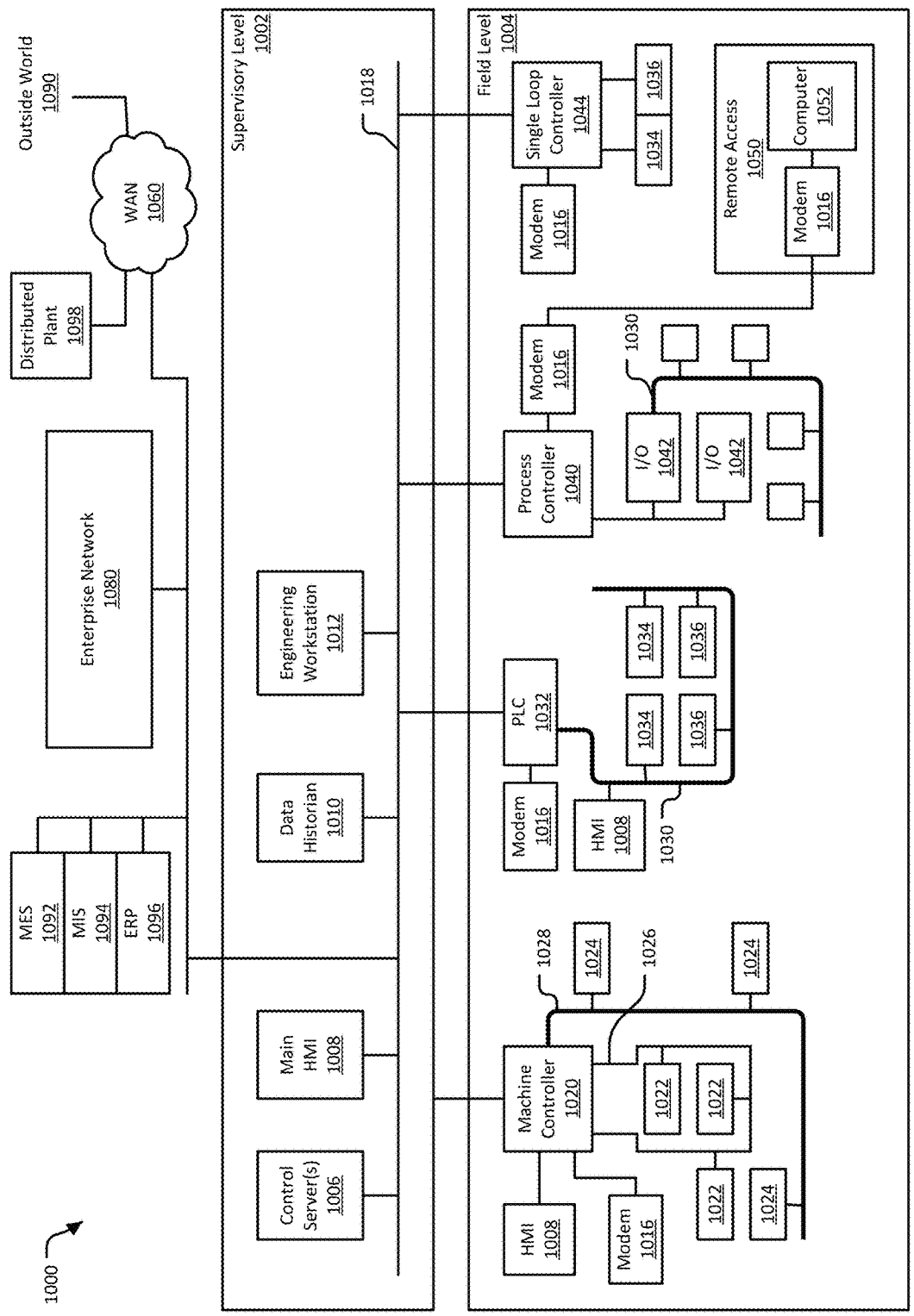
FIG. 10 illustrates an example of a distributed control.

FIG. 10 illustrates an example of a distributed control system 1000. This example distributed control system 1000 encompasses a production facility, including bottom-level production processes at a field level 1004, supervisory control systems at a supervisory level 1002, and a corporate or enterprise layer.

At the supervisory level 1002, a control server 1006, operating as a supervisory controller, may communicate with subordinate systems via a control network 1018. The control server 1006 may send set points to distributed field controllers, and may request data from the distributed field controllers. The supervisory level 1002 may include multiple control servers 1006, with one acting as the primary control server and the rest acting as redundant, back-up control servers. The supervisory level 1002 may also include a main human-machine interface 1008 for use by operators and engineers, a data historian 1010 for logging process information from the system 1000, and engineering workstations 1012.

At the field level 1004, the system 1000 may include various distributed field controllers. In the illustrated example, the distributed control system 1000 includes a machine controller 1020, a PLC 1032, a process controller 1040, and a single loop controller 1044. The distributed field controllers may each control local process actuators, based on control server 1006 commands and sensor feedback from local process sensors.

In this example, the machine controller 1020 drives a motion control network 1026. Using the motion control network 1026, the machine controller 1020 may control a number of servo drives 1022, which may each drive a motor. The machine controller 1020 may also drive a logic control bus 1028 to communicate with various devices 1024. For example, the machine controller 1020 may use the logic control bus 1028 to communicate with pressure sensors, pressure regulators, and/or solenoid valves, among other devices. One or more of the devices 1024 may be an intelligent electronic device. A human-machine interface 1008 may be attached to the machine controller 1020 to provide an operator with local status information about the processes under control of the machine controller 1020, and/or local control of the machine controller 1020. A modem 1016 may also be attached to the machine controller 1020 to provide remote access to the machine controller 1020.

The PLC 1032 in this example system 1000 uses a fieldbus 1030 to communicate with actuators 1034 and sensors 1036 under its control. These actuators 1034 and sensors 1036 may include, for example, direct current (DC) servo drives, alternating current (AC) servo drives, light towers, photo eyes, and/or proximity sensors, among others. A human-machine interface 1008 may also be attached to the fieldbus 1030 to provide operators with local status and control for the PLC 1032. A modem 1016 may also be attached to the PLC 1032 to provide remote access to the PLC 1032.

The process controller 1040 in this example system 1000 also uses a fieldbus 1030 to communicate with actuators and sensors under its control, one or more of which may be intelligent electronic devices. The process controller 1040 may communicate with its fieldbus 1030 through an input/output (I/O) server 1042. An I/O server is a control component typically responsible for collecting, buffering, and/or providing access to process information from control subcomponents. An I/O server may be used for interfacing with third-party control components. Actuators and sensors under control of the process controller 1040 may include, for example, pressure regulators, pressure sensors, temperature sensors, servo valves, and/or solenoid valves, among others. The process controller 1040 may be connected to a modem 1016 so that a remote access 1050 site may access the process controller 1040. The remote access 1050 site may include a computer 1052 for use by an operator to monitor and control the process controller 1040. The computer 1052 may be connected to a local modem 1016 for dialing in to the modem 1016 connected to the process controller 1040.

The illustrated example system 1000 also includes a single loop controller 1044. In this example, the single loop controller 1044 interfaces with actuators 1034 and sensors 1036 with point-to-point connections, instead of a fieldbus. Point-to-point connections require a dedicated connection for each actuator 1034 and each sensor 1036. Fieldbus networks, in contrast, do not need point-to-point connections between a controller and individual field sensors and actuators. In some implementations, a fieldbus allows greater functionality beyond control, including field device diagnostics. A fieldbus can accomplish control algorithms within the fieldbus, thereby avoiding signal routing back to a PLC for every control operation. Standard industrial communication protocols are often used on control networks and fieldbus networks.

The single loop controller 1044 in this example is also connected to a modem 1016, for remote access to the single loop controller.

In addition to the supervisory level 1002 and field level 1004 control loops, the distributed control system 1000 may also include intermediate levels of control. For example, in the case of a distributed control system controlling a discrete part manufacturing facility, there could be an intermediate level supervisor for each cell within the plant. This intermediate level supervisor could encompass a manufacturing cell containing a machine controller that processes a part, and a robot controller that handles raw stock and final products. Additionally, the distributed control system could include several of these cells that manage field-level controllers under the main distributed control system supervisory control loop.

In various implementations, the distributed control system may include a corporate or enterprise layer, where an enterprise network 1080 may connect to the example production facility. The enterprise network 1080 may be, for example, located at a corporate office co-located with the facility, and connected to the control network 1018 in the supervisory level 1002. The enterprise network 1080 may provide engineers and managers with control and visibility into the facility. The enterprise network 1080 may further include Manufacturing Execution Systems (MES) 1092, control systems for managing and monitoring work-in-process on a factory floor. An IVIES can track manufacturing information in real time, receiving up-to-the-minute data from robots, machine monitors and employees. The enterprise network 1080 may also include Management Information Systems (MIS) 1094, software and hardware applications that implement, for example, decision support systems, resource and people management applications, project management, and database retrieval applications, as well as basic business functions such as order entry and accounting. The enterprise network 1080 may further include Enterprise Resource Planning (ERP) systems 1096, business process management software that allows an organization to use a system of integrated applications to manage the business and automate many back office functions related to technology, services, and human resources.

The enterprise network 1080 may further be connected to a WAN 1060. Through the WAN 1060, the enterprise network 1080 may connect to a distributed plant 1098, which may include control loops and supervisory functions similar to the illustrated facility, but which may be at a different geographic location. The WAN 1060 may also connect the enterprise network to the outside world 1090, that is, to the Internet and/or various private and public networks. In some cases, the WAN 1060 may itself include the Internet, so that the enterprise network 1080 accesses the distributed plant 1098 over the Internet.

As described above, SCADA systems and distributed control systems use Programmable Logic Controllers (PLCs) as the control components of an overall hierarchical system. PLCs can provide local management of processes through feedback control, as described above. In a SCADA implementation, a PLC can provide the same functionality as a Remote Terminal Unit. When used in a distributed control system, PLCs can be implemented as local controllers within a supervisory scheme. PLCs can have user-programmable memory for storing instructions, where the instructions implement specific functions such as I/O control, logic, timing, counting, proportional-integral-derivative (PID) control, communication, arithmetic, and data and file processing.

Figure 11:
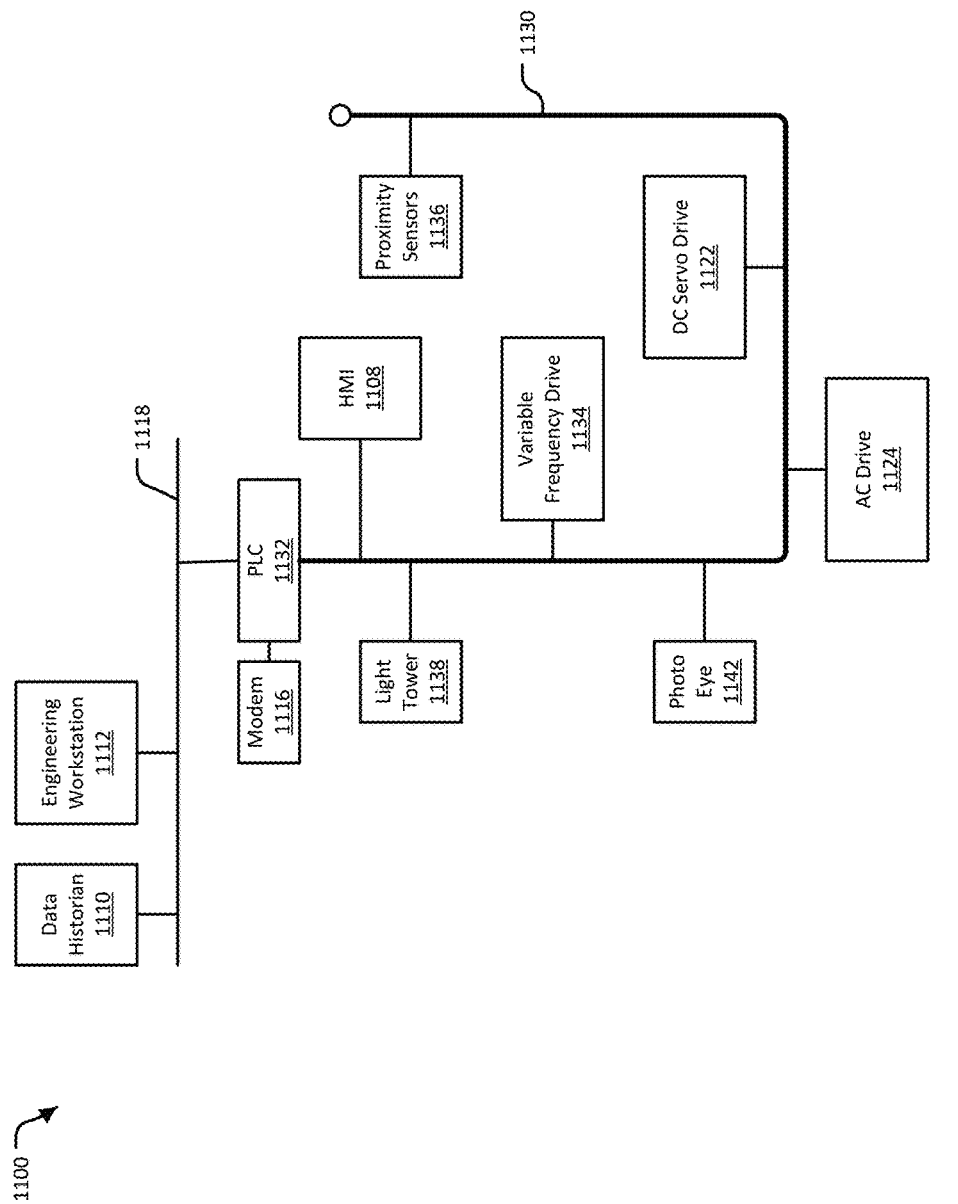
FIG. 11 illustrates an example of a PLC implemented in a manufacturing control process.

FIG. 11 illustrates an example of a PLC 1132 implemented in a manufacturing control process 1100. The PLC 1132 in this example monitors and controls various devices over fieldbus network 1130. The PLC 1132 may be connected to a LAN 1118. The PLC 1132 may also be connected to a Modem 1116. An engineering workstation 1112 may also be connected to the LAN 1118, and may include a programming interface that provides access to the PLC 1132. A data historian 1110 on the LAN 1118 may store data produced by the PLC 1132.

The PLC 1132 in this example may control a number of devices attached to its fieldbus network 1130. These devices may include actuators, such as a DC servo drive 1122, an AC drive 1124, a variable frequency drive 1134, and/or a light tower 1138. The PLC 1132 may also monitor sensors connected to the fieldbus network 1130, such as proximity sensors 1136, and/or a photo eye 1142. A human-machine interface 1108 may also be connected to the fieldbus network 1130, and may provide local monitoring and control of the PLC 1132.

Most industrial control systems were developed years ago, long before public and private networks, desktop computing, or the Internet were a common part of business operations. These well-established industrial control systems were designed to meet performance, reliability, safety, and flexibility requirements. In most cases, they were physically isolated from outside networks and based on proprietary hardware, software, and communication protocols that included basic error detection and correction capabilities, but lacked secure communication capabilities. While there was concern for reliability, maintainability, and availability when addressing statistical performance and failure, the need for cyber security measures within these systems was not anticipated. At the time, security for industrial control systems mean physically securing access to the network and the consoles that controlled the systems.

Internet-based technologies have since become part of modern industrial control systems. Widely available, low-cost IP devices have replaced proprietary solutions, which increases the possibility of cyber security vulnerabilities and incidents. Industrial control systems have adopted Internet-based solutions to promote corporate connectivity and remote access capabilities, and are being designed and implemented using industry standard computers, operating systems (OS) and network protocols. As a result, these systems may to resemble computer networks. This integration supports new networking capabilities, but provides less isolation for industrial control systems from the outside world than predecessor systems. Networked industrial control systems may be exposed to similar threats as are seen in computer networks, and an increased likelihood that an industrial control system can be compromised.

Industrial control system vendors have begun to open up their proprietary protocols and publish their protocol specifications to enable third-party manufacturers to build compatible accessories. Organizations are also transitioning from proprietary systems to less expensive, standardized technologies such as Microsoft Windows and Unix-like operating systems as well as common networking protocols such as Transmission Control Protocol/Internet Protocol (TCP/IP) to reduce costs and improve performance. Another standard contributing to this evolution of open systems is Open Platform Communications (OPC), a protocol that enables interaction between control systems and PC-based application programs. The transition to using these open protocol standards provides economic and technical benefits, but also increases the susceptibility of industrial control systems to cyber incidents. These standardized protocols and technologies have commonly known vulnerabilities, which are susceptible to sophisticated and effective exploitation tools that are widely available and relatively easy to use.

Industrial control systems and corporate networking systems are often interconnected as a result of several changes in information management practices, operational, and business needs. The demand for remote access has encouraged many organizations to establish connections to the industrial control system that enable of industrial control systems engineers and support personnel to monitor and control the system from points outside the control network. Many organizations have also added connections between corporate networks and industrial control systems networks to allow the organization's decision makers to obtain access to critical data about the status of their operational systems and to send instructions for the manufacture or distribution of product.

In early implementations this might have been done with custom applications software or via an OPC server/gateway, but, in the past ten years this has been accomplished with TCP/IP networking and standardized IP applications like File Transfer Protocol (FTP) or Extensible Markup Language (XML) data exchanges. Often, these connections were implemented without a full understanding of the corresponding security risks. In addition, corporate networks are often connected to strategic partner networks and to the Internet. Control systems also make more use of WANs and the Internet to transmit data to their remote or local stations and individual devices. This integration of control system networks with public and corporate networks increases the accessibility of control system vulnerabilities. These vulnerabilities can expose all levels of the industrial control system network architecture to complexity-induced error, adversaries and a variety of cyber threats, including worms and other malware.

Many industrial control system vendors have delivered systems with dial-up modems that provide remote access to ease the burdens of maintenance for the technical field support personnel. Remote access can be accomplished, for example, using a telephone number, and sometimes an access control credential (e.g., valid ID, and/or a password). Remote access may provide support staff with administrative-level access to a system. Adversaries with war dialers—simple personal computer programs that dial consecutive phone numbers looking for modems—and password cracking software could gain access to systems through these remote access capabilities. Passwords used for remote access are often common to all implementations of a particular vendor's systems and may have not been changed by the end user. These types of connections can leave a system highly vulnerable because people entering systems through vendor-installed modems are may be granted high levels of system access.

Organizations often inadvertently leave access links such as dial-up modems open for remote diagnostics, maintenance, and monitoring. Also, control systems increasingly utilize wireless communications systems, which can be vulnerable. Access links not protected with authentication and/or encryption have the increased risk of adversaries using these unsecured connections to access remotely controlled systems. This could lead to an adversary compromising the integrity of the data in transit as well as the availability of the system, both of which can result in an impact to public and plant safety. Data encryption may be a solution, but may not be the appropriate solution in all cases.

Many of the interconnections between corporate networks and industrial control systems require the integration of systems with different communications standards. The result is often an infrastructure that is engineered to move data successfully between two unique systems. Because of the complexity of integrating disparate systems, control engineers often fail to address the added burden of accounting for security risks. Control engineers may have little training in security and often network security personnel are not involved in security design. As a result, access controls designed to protect control systems from unauthorized access through corporate networks may be minimal. Protocols, such as TCP/IP and others have characteristics that often go unchecked, and this may counter any security that can be done at the network or the application levels.

Public information regarding industrial control system design, maintenance, interconnection, and communication may be readily available over the Internet to support competition in product choices as well as to enable the use of open standards. Industrial control system vendors also sell toolkits to help develop software that implements the various standards used in industrial control system environments. There are also many former employees, vendors, contractors, and other end users of the same industrial control system equipment worldwide who have inside knowledge about the operation of control systems and processes.

Information and resources are available to potential adversaries and intruders of all calibers around the world. With the available information, it is quite possible for an individual with very little knowledge of control systems to gain unauthorized access to a control system with the use of automated attack and data mining tools and a factory-set default password. Many times, these default passwords are never changed.

IV. Deception-Based Network Scan Detection

In various implementations, the systems and methods discussed above can be used to implement a deception that can detect network scans. Specifically, a network device, configured as a deception sensor, can monitor activity on a network, and determine, from the monitored activity, whether a scan of the network has taken place. The deception sensor can monitor activity on the network, but does not otherwise participate in the network activity. Because the deception sensor does not participate in activity on the network, any packets received by the deception sensor are automatically suspect. In various implementations, the deception sensor can determine whether a received packet is associated with a scan of the network. For example, the deception sensor can examine monitored network activity, and determine whether the received packet falls within a pattern of packet seen across the network. In this example, when the deception sensor determines that a scan is occurring or has occurred, the deception sensor can inform other systems in the network, and/or the deception sensor can act upon the information itself.

Figure 12A:
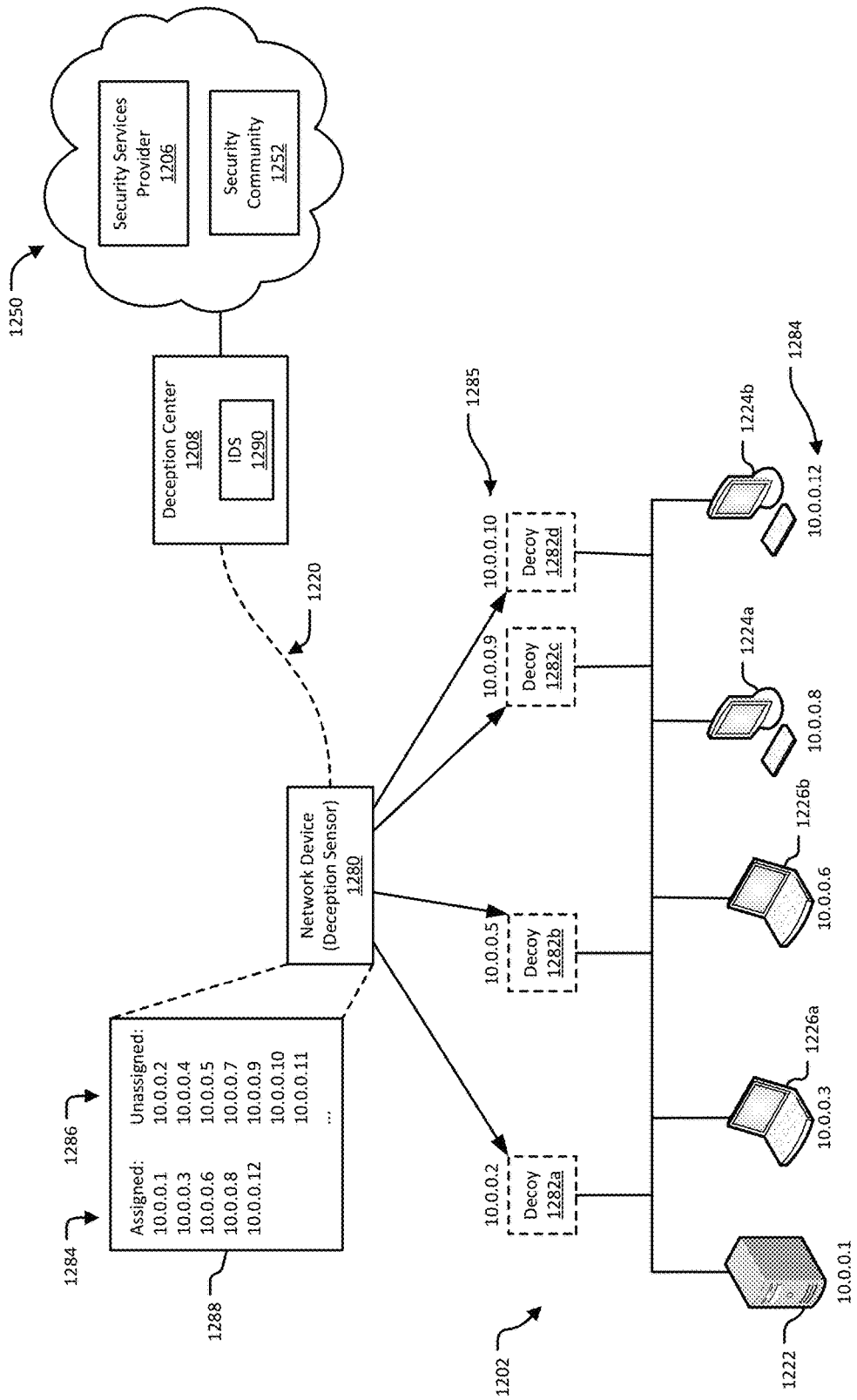
FIGS. 12A-12B illustrate an example of a network that includes a network device configured as a deception sensor.
Figure 12B:
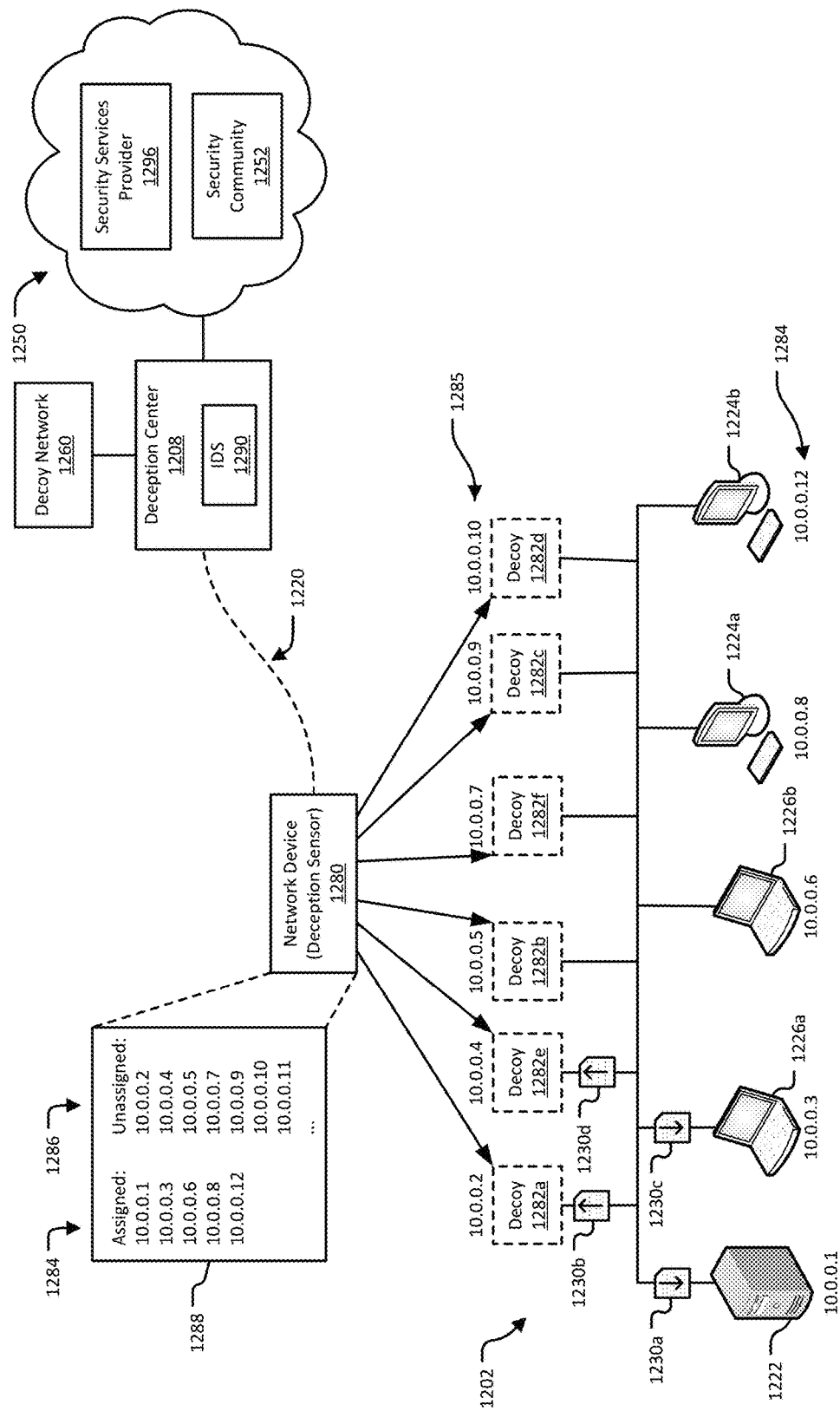

FIGS. 12A-12B illustrate an example of a network 1202 that includes a network device configured as a deception sensor 1280. The example network 1202 includes various network devices, including a server 1222, two laptop computers 1226a-1226b, and two desktop computers 1224a-1224b. In other examples, the network 1202 can include other devices not illustrated here, such as, for example, network infrastructure devices (e.g., hubs, switches, routers, gateways, etc.), peripheral devices (e.g., printers, scanners, fax machines, etc.), industrial control systems, and/or home appliances, among other things. In some implementations, the deception sensor 1280 can be communicating with a deception center 1208, using a secure network tunnel 1220. The deception center 1208 can be connected to the example network 1202, or can be located outside the network 1202 and communicate with the network 1202 using intermediate networks. In either case, the deception center 1208 can be in communication with external networks 1250 in order to communicate with a network security services provider 1296 and/or the greater network security community 1252.

In this example, the devices in the network 1202 have a logical and/or physical relationship. For example, the devices may be connected to the same switch, may be in the same sub-network (also referred to as a "subnet"), may be in the same local area network (LAN), may be in the same virtual local area network (VLAN), may have some other relationship, and/or may have a combination of the preceding relationships. Stated differently, the devices in the example network 1202 are administered by a common entity and have a common security perimeter (e.g., the devices are behind a common firewall). Stated yet another way, the devices in the example network 1202 can be within the same broadcast domain.

The deception sensor 1280 can be connected to the network 1202 as another node in the network 1202. For example, the deception sensor 1280 can be connected to a port of a switch in the network 1202 and/or, when a VLAN is configured for the network 1202, an access port of the VLAN. Alternatively, the deception sensor 1280 can be connected to a different network that can communicate with the example network 1202. For example, the example network 1202 can be provided by a network services provider; that is, the network 1202 can be "in the cloud." In this example, a customer of the network services provided can access the network 1202 over intermediate public and/or private networks, from the customer's own computer. In this example, the deception sensor 1280 can be in the same network to which the customer's computer is connected, and can project decoy network devices 1282a-1282d into the network 1202 over secure tunnels.

In various implementations, the deception sensor 1280 can be configured to project deceptions, referred to here as decoy network devices 1282a-1282d, into the example network 1202. In the example of FIGS. 12A-12B, a decoy network device is an emulation, and not a physical network device. As discussed further below, the deception sensor 1280 can assume multiple network addresses, and for each network address can present a decoy network device 1282a-1282d to the network 1202. The deception sensor 1280 can use the decoy network devices 1282a-1282d to monitor network activity, such as packets sent into and out of the network 1202, and/or packets sent between devices in the network 1202.

In various implementations, the deception sensor 1280, through the decoy network devices 1282a-1282d, can occasionally send network traffic into the network. Having the decoy network devices 1282a-1282d output network traffic can improve the realistic appearance of the decoy network devices 1282a-1282d: network addresses that do not send any packets can give themselves away as associated with decoys. The network traffic can be sent between the decoy network devices 1282a-1282d, to avoid the real network devices being made busy by the network traffic from the decoy network devices 1282a-1282d. Alternatively or additionally, in some implementations, the generated network traffic can be sent to the real network devices, for example to populate caches with the network addresses being used by the decoy network devices 1282a-1282d. Examples of network traffic that can be generated for the decoy network devices 1282a-1282d include ARP exchanges and Network Basic Input/Output System (NetBIOS) exchanges.

In various implementations, the decoy network devices 1282a-1282d (that is, the deception sensor 1280 acting through the decoy network devices 1282a-1282d) do not otherwise participate in network activity, meaning that the decoy network devices 1282a-1282d should not receive packets either from outside of the network 1202 or from devices within the network 1202. Stated another way, as far as the devices in the network 1202 are concerned, the decoy network devices 1282a-1282d are not active destinations for network traffic. Because the decoy network devices 1282a-1282d do not participate in network activity, any packets received by the decoy network devices 1282a-1282d are automatically tested to determine whether the packets are part of a network scan.

The deception sensor 1280 can be a computing device that includes at least one or more processors (e.g., integrated circuit devices configured to process instructions), memory, and a network interface for connecting to the network 1202. For example, the deception sensor 1280 can be implemented on a server computer, a desktop computer, a laptop computer, a handheld computer, or a circuit board with a processor, memory, and a network interface. In various implementations, the deception sensor 1280 can connected wirelessly to the network 1202, and/or can connect using a wired connection.

In various implementations, the deception sensor 1280 can maintain lists 1288 of network addresses that can be used in the network 1202. Network addresses that can be used include the range of possible addresses for a network.

For example, a network address, such as a network address formatted according to Internet Protocol version 4 (IPv4) includes two parts: a part that identifies a network, and a part that identifies a particular host in the network. The network part is the same for all devices in the same network (that are in the same broadcast domain). In the simplified example of FIGS. 12A-12B, the network part is "10.0.0." For the server 1222, the host part of the server's network address is "1;" thus, the server's network address is "10.0.0.1." The two laptop computers 1226a-1226b have host addresses "3" and "6," and thus have network addresses "10.0.0.3" and "10.0.0.6," respectively. The desktop computers 1224a-1224b have host addresses "8" and "12," and thus have network addresses "10.0.0.8" and "10.0.0.12," respectively. In this example, the range of possible addresses in the network 1202 the host addresses between 0 and 255 (under IPv4, a network address is expressed in four 8-bit numbers; hence, the maximum number of host addresses in a subnet, in some cases, is 256). Though illustrated in the example of FIGS. 12A-12B as an IPv4 style IP address, network addresses can alternatively or additionally be Internet Protocol version 6 (IPv6), MAC addresses, or some other address that uniquely identifies a network devices within the same network.

The subdivision of a network address into a network identifier and a host identifier enables subnetting, or the division of networks into subnets. Network devices within a subnet know the network addresses of other devices in the same subnet, but may not know of any network addresses outside of the subnet. Instead, the network devices in the subnet can address any packets intended for an external network to a gateway device. Similarly, any packets coming from outside the subnet can be received at the gateway device, which can then address the packets to the appropriate network address within the subnet. Frequently, the gateway device includes some network security, such as a firewall for filtering inbound and outbound packets.

In various implementations, the deception sensor 1280 can segregate the lists 1288 of network addresses available in the network 1202 into assigned 1284 and unassigned 1286 network addresses. "Assigned" means that a network device is currently using the network address to send and receive traffic to and from the network 1202. "Unassigned" means that no network device is using the network address for any purpose. For example, unassigned network addresses do not participate in current network activity, meaning that no packets that use an unassigned network address (either as a source or a destination) should appear in the network. Thus, in the illustrated example, network addresses "10.0.0.1," "10.0.0.3", "10.0.0.6," "10.0.0.8," and "10.0.0.12," are currently assigned, and "10.0.0.2," "10.0.0.4," "10.0.0.5," "10.0.0.7," "10.0.0.9," "10.0.0.10," "10.0.0.11," and so on are unassigned and not currently being used in the network 1202.

The assigned 1284 and unassigned 1286 network addresses can change. For example, one of the laptop computers 1226a may disconnect from and leave the network 1202, in which case the network address assigned to the laptop computer 1226a (e.g., "10.0.0.3") will become unassigned. As another example, a new device, such as a smart phone, can join the network 1202 and acquire the network address "10.0.0.4," in which case the network address "10.0.0.4" becomes assigned 1284 instead of unassigned 1286.

Network addresses that can be assigned to different network devices at different times can be referred to as dynamic addresses. In contrast, static addresses are network addresses that are assigned to a network device and that are not meant to change, even when the network device goes offline. For example, the server 1222 in the example network 1202 may have a static network address. In this example, the server 1222 may be expected to be online most of the time, or may be expected to be at the same network address when online, or may have a static address for some other reason.

In various implementations, the deception sensor 1280 can obtain the assigned 1284 and unassigned 1286 network addresses in various ways. For example, the assigned 1284 and unassigned 1286 network addresses can be configured by a network administrator, the deception center 1208, and/or a remote security services provider 1206 (which may configured the deception sensor 1280 directly, and/or may configured the deception sensor 1280 through the deception center 1208). In some implementations, the unassigned 1286 network addresses can be statically assigned to the deception sensor 1280. In these implementations, the unassigned 1286 network addresses can be consecutive and/or can be randomly selected from among available, unassigned network addresses.

As another example, the deception sensor 1280 can dynamically determine the assigned 1284 and unassigned 1286 network addresses. In this example, the deception sensor 1280 can, for example, communicate with a server running the Dynamic Host Configuration Protocol (DHCP), which automatically assigns network addresses in a network. In some cases, the DHCP server may be able to provide the deception sensor 1280 with currently assigned 1284 and currently unassigned 1286 network addresses. Alternatively or additionally, the deception sensor 1280 can use administrative scan tools to obtain currently assigned 1284 and unassigned 1286 network addresses. For example, the deception sensor 1280 can scan the network 1202 (using, for example, ARP). In some implementations, the deception sensor 1280 can further dynamically update the lists of assigned 1284 and unassigned 1286 network addresses, for example by monitoring DHCP traffic or ARP traffic. Alternatively or additionally, the deception sensor 1280 can periodically update the lists 1288 of network addresses, for example by querying a DHCP server and/or scanning the network 1202.

In various implementations, the deception sensor 1280 can select one or more unassigned 1286 network addresses to use for decoy network devices 1282a-1282d. For example, as illustrated the example of FIG. 12A, the deception sensor 1280 has selected network addresses "10.0.0.2," "10.0.0.5," "10.0.0.9," and "10.0.0.10" in order to project four decoy network devices 1282a-1282d into the network 1202. In various implementations, the deception sensor 1280 can randomly select from the unassigned network addresses 1286, and/or can select addresses in a predetermined pattern (e.g., every odd-numbered address, every even-numbered address, every other address, every third address, every fifth address, all addresses within a particular range, etc.) The number of addresses selected can be configured by a network administrator, the deception center 1280, and/or the security services provider 1206.

To present the decoy network devices 1282a-1282d to the network, the deception sensor 1280 can adopt or assume the selected 1285 network addresses. Adopting or assuming the network addresses means, in this context, that the deception sensor 1280 can configure itself to use the selected 1285 network addresses. For example, the deception sensor 1280 can configure a physical or virtual network interface to use the selected 1285 network addresses. Once the deception sensor 1280 is configured to use the selected 1285 network addresses, the deception sensor 1280 can present each selected 1285 network address as a node on the network 1202. "Presenting" a network address to the network 1202 can mean, for example, announcing the network address to the devices in the network 1202, responding to address resolution queries from other devices in the network, responding, as appropriate, to any broadcast or multicast traffic in the network 1202, and/or responding to any unicast traffic addresses to the selected 1285 network addresses.

In various implementations, once the deception sensor 1280 has assumed the selected 1285 network addresses, the deception sensor 1280 can monitor the network 1202 for network scans. As noted above, a threat to the network can use network scans to obtain intelligence about the network 1202, in advance of launching at attack on the network 1202. An initial network scan can involve discovering the devices in the network 1202, for example, by identifying the network addresses that are in use (e.g., are assigned) and those that are not (e.g., are unassigned). Knowing which network addresses are in use can inform a network threat where to find the devices in the network 1202 (e.g., a network address that is in use will be associated with a network device).

One method for identifying network addresses that are in use is to use ARP. ARP can be used to ask all devices in a broadcast domain whether any network device is using a particular network address. For example, when an ARP packet appears on the network 1202 that requests whether any device is using network address "10.0.0.3," the first laptop computer 1226*a* should respond. In addition to announcing that a device is using the network address, in this example, the laptop computer 1226*a* may also respond with its MAC address. A MAC address is a unique identifier assigned to a network interface. A MAC address is most often assigned by the manufacturer of the network interface, and can identify the manufacturer. The MAC address can also be referred to as a hardware address or an Ethernet address.

Because ARP requests and replies are broadcast to all devices in a broadcast domain, other devices in the network 1202 can also use the ARP request and replies to update tables that each device can use to track other devices in the network 1202. Network devices can maintain such tables, for example, to map an IP address to a MAC address. Thus, for example, some network devices may use ARP replies—which can include the MAC address that is associated with an IP address—to update a mapping table maintained by these network devices.

In some cases, the network device that sends an ARP request (the sender device) can include the sender device's network address in the ARP request. In these cases, when the ARP request is part of a network scan, the request can be used to determine the source of the scan. In some cases, however, the sender device may send an ARP request with the source network address left unspecified (e.g., set to all zero or set to all one or set to some other invalid value). This may occur, for example, when the sender device joins the network 1202 using an arbitrary network address (e.g., network address "10.0.0.3"). In this case, should the sender device send an ARP request that includes the sender's own network address, a network device that uses the ARP packets to update a mapping table may update the table incorrectly. Thus, the sender device can send an ARP request with the source address unspecified, which informs other devices in the network that the ARP request should not be used to update mapping tables. Should an ARP reply be broadcast onto the network 1202 (e.g., from the first laptop computer 1226*a*), the sender device is then informed that the network address that the sender device is using is already in use. The sender device can then select and/or request another network address.

ARP packets with unspecified source addresses, as well as similar, anonymously sent broadcast packets, can also be used by network threats to hide the network threat's network location. A network threat can be located outside (e.g., outside of the security perimeter) or inside (e.g. inside the security perimeter) of the network 1202. Knowing at least this information can help a threat response system to secure the network 1202 from the threat. To avoid being noticed, a network threat can use techniques such as ARP scans to discover the devices in the network 1202.

In addition to scans that use broadcast traffic, in various implementations, the deception sensor 1280 can alternatively or additionally use the decoy network devices 1282*a*-1282*d* to detect port scans and operating system fingerprinting. Nmap is one example of a tool that can be used for port scanning, determining application names and version numbers, and determining operating system and hardware characteristics of network devices, among other things.

In a port scan, a network threat may send a packet to a specific port of a specific network device, to determine whether the port is "open" and is supported by a corresponding service. Open ports can provide a route for infiltrating a network device. A response or lack of response to a packet sent to a particular port can indicate that a network device has the port open. A format or contents of a response can also indicate information about the service that supports a port, such as a version number and/or a patch level.

In operating system fingerprinting, a network threat may send packets to a particular network device, and can use the responses to attempt to determine the operating system and operating system version. A network threat may have particular expertise exploiting vulnerabilities of particular operating systems, and thus determining operating systems being used in a network is information that can be misused.

Unlike in network discovery scanning, port scanning and operating system fingerprinting may target one specific network device at a time, and thus packets related to port scanning and operating system finger printing may be unicast to the particular network device. A network threat may systematically probe one network device or multiple network devices in a network. In various implementations, the deception sensor 1280 can attempt to identify network scans by treating any packet received by a decoy network device 1282*a*-1282*d* as suspect, and determining whether the received packet is related to a scan. In some implementations, the deception sensor 1280 can also obtain information from other devices in the network 1202, and determine whether scan-related packets are being seen by other devices in the network.

Herein, broadcast, multicast, and unicast packets that can be used for network scans, but that can also be used for other purposes (e.g., ARP request used by new devices in the network 1202 to determine whether a network address is available; TCP packet exchanges for establishing a persistent connection; legitimate UDP traffic, etc.) will be referred to as scan-related packets. In various implementations, the deception sensor 1280, deception center 1208, and/or the security services provider 1206 can determine whether scan-related packets are, in fact, part of a network scan.

As noted above, because the decoy network devices 1282*a*-1282*d* do not participate in network activity, any packet received by a decoy network device 1282*a*-1282*d* is automatically suspect. For example, in some implementations, though the deception sensor 1280 has assumed selected 1285 network addresses, other devices in the network 1202 may continue to treat the selected 1285 network addresses as unassigned. Thus, for example, should a smartphone join the network 1202, the smart phone can assigned network address "10.0.0.9." In this example, the deception sensor would relinquish the network address "10.0.0.9."

Should the deception sensor 1280 (through a decoy network device 1282a-1282d) receive a scan-related packet, the deception sensor 1280 can attempt to determine whether the packet is part of a pattern of packets in the network 1202. For example, in monitoring network activity, the deception sensor 1280 can track scan-related packets broadcast to the network 1202 and targeting the legitimate network devices (e.g., the server 1222, laptop computers 1226a-1226b, or the desktop computers 1224a-1224b, in the illustrated example). The deception sensor 1280 can attempt to determine whether the scan-related packets in the monitored network activity fall within a pattern. The deception sensor 1280 can additionally or alternatively determine whether the a scan-related packet received by the deception sensor 1280 is also part of the pattern.

FIG. 12B illustrates an example of a series of scan-related packets 1230a-1230d being received in the example network 1202. Scan-related packets can be identified, for example, by examining the header, and sometimes also the payload, of a packet. The header can provide information such as a type of protocol being used by the packet, options or flags related to the protocol, some information about the payload, a destination address, and/or a source address. The payload may contain patterns of data that are known to be associated with network scans, or may contain unidentifiable data, which may make the packet suspect.

In the illustrated example, the deception sensor 1280 can identify scan-related packets 1230a-1230c arriving at both legitimate, non-decoy devices in the network 1202 and the decoy network devices 1282a-1282f. The scan-related packets 1230a, 1230c arriving at the legitimate network devices may be broadcast packets, and thus be visible to the deception sensor 1280. In this example, a scan-related packet 1230a is first received by the server 1222, which is assigned network address "10.0.0.1." A second scan related packet 1230b is then received at the decoy network device 1282a for network address "10.0.0.2." A third scan-related packet 1230c is then received at the first laptop computer 1226a, which has the network address "10.0.0.3."

In the example of FIG. 12B, the deception sensor 1280 may recognize that the scan-related packets 1230a-1230d are arriving in a series that includes sequential network addresses. That the scan-related packets 1230a-1230d are in a series indicates that the scan-related packets 1230a-1230d may not be ordinary, legitimate network traffic, but may instead be part of a scan of the network. In the illustrated example, the scan-related packets 1230a-1230d are illustrated as arriving at sequential network addresses. In other cases, the network addresses may have a different series, such as increasing or decreasing in intervals of two, three, five, exponentially, logarithmically, according to the Fibonacci sequence, or in some other fashion, being all even, being all odd, being all within the same range, and/or exhibiting a combination of these or other qualities. Alternatively, the network addresses may be somewhat random, but arrive consistently, in a way that indicates that, given enough time, all possible network addresses will be probed.

Once the deception sensor 1280 has determined that a scan of the network 1202 may be occurring, the deception sensor 1280 can respond in several different ways. For example, to further confirm that a scan is occurring, the deception sensor 1280 can adopt additional unassigned 1286 network addresses. In various implementations, the deception sensor 1280 can select unassigned 1286 network addresses that complete an apparent series associated with the scan-related packets 1230a-1230d. For example, in the illustrated example, the scan-related packets 1230a-1230d appear to be using sequential network addresses (as noted above, the scan-related packets can alternatively or additionally be arriving in some other series). Hence, in this example, the deception sensor 1280 adds decoy network devices 1282e-1282f for network addresses "10.0.0.4" and "10.0.0.7," respectively. Should a fourth scan-related packet 1230d arrive for network address "10.0.0.4," the deception sensor 1280 can use this fourth scan-related packet 1230d as further evidence that a network scan is occurring. Scan-related packets arriving for network addresses "10.0.0.5," "10.0.0.6," and "10.0.0.7" would provide additional confirmation.

In most cases, the deception sensor 1280 can assume additional unassigned 1286 network addresses as soon as the deception sensor 1280 detects a possible scan, so that a new decoy network device 1282e-1282f is ready before the scan reaches the network addresses used by the new decoy network device 1282e-1282f. In this way, the new decoy network device 1282e-1282f can assist the deception sensor 1280 in confirming that the scan-related packets 1230a-1230d are being sent according to a pattern. Quickly bringing up new decoy network devices has the added benefit of hiding the real network devices among the decoys.

In some implementations, instead of or in addition to anticipating network addresses that may be probed by the scan, the deception sensor 1280 can monitor the network for scan-related packets directed to unassigned network addresses, and reply when such packets are seen. In some cases, scan requests are retried. For example, an ARP request may be retried two, three, or more times, on the assumption that the packets may be dropped in the network, the recipient may be too busy to respond, or for some other reason. In such cases, instead of setting up decoy network devices in advance and/or as a scan progresses, the deception sensor 1280 can reply on the second or third retry of a scan request, using the network address to which the scan request is directed. The deception sensor 1280 can also use retried scan requests to determine whether to respond when the deception sensor 1280 does not have a list of unassigned 1286 network addresses, or the list is out of date. Retried scan requests can indicate that a network device that is being probed by the scan packets is not present in the network 1202, in which case the deception sensor 1280 can step in and respond. Replying retried ARP requests is also referred to as ARP spoofing.

In some implementations, the deception sensor 1280 can be configured to respond to a scan-related packet. Network discovery-type scans, such as an ARP scan, can require a simple response. In some implementations, the deception sensor 1280 can use another network device to formulate a response to a scan-related packet, particularly when the scan request requires a more complicated response. In these implementations, the deception sensor 1280 can send a packet containing a scan request to another network device in the network 1202. To do so, the deception sensor 1280 can, for example, encapsulate the scan request packet so that the deception sensor 1280 becomes the source of the scan request packet, without modifying the original packet. When the deception sensor 1280 receives a response, the deception sensor 1280 can use the contents of the response to generate a response to the original scan request packet.

In some implementations, instead of or in addition to using a device in the network 1202 to generate a response, the deception sensor 1280 can send the scan request packet over the network tunnel 1220 to the deception center 1208. The deception center 1208 may have access to a decoy network 1260. The decoy network 1260 can include emulated and/or physical network devices. In some implementations, the decoy network devices 1282a-1282f can correspond to emulated or physical devices in the decoy network 1260. In various implementations, the deception center 1208 can send a scan-related packet to an appropriate device in the decoy network 1260, which can generate a response. The deception sensor 1280 can then send the response over the network tunnel 1220 back to the deception sensor 1280. The deception sensor 1280 can then transmit the response onto the network 1202.

The deception sensor 1280 can also or alternatively respond to detecting a possible network scan by notifying the deception center 1308, network security infrastructure devices in the network's security perimeter, and/or sending alerts to system administrators. The deception center 1308 can conduct further analysis to attempt identify a source of the scan, determine whether a threat to the network is imminent, and or attempt to determine whether the scan is originating from a compromised device in the network 1202. Network security devices can modify security settings, for example to block the scan and/or block a threat that may follow the scan. Network administrators can also reconfigure security settings to secure the network from a possible threat.

In various implementations, once the deception sensor 1280 is able to establish that the scan-related packets 1230a-1230d are following a pattern, or determines that the network scan is probably done, the deception sensor 1280 can stop using some or all of the selected 1285 network addresses. For example, once the scan has probed network address "10.0.0.7," the deception sensor 1280 can configure itself to stop using one or more of network addresses "10.0.0.2," "10.0.0.4," or "10.0.0.5." Ceasing using a network address can include, for example, configuring a virtual and/or physical network interface of the deception sensor 1280 to de-assign or clear the network address from the network interface. Doing so can reduce the computational load on the deception sensor 1280 and/or free these network addresses for other uses.

In various implementations, monitoring of network activity and determining whether scan-related packets received at the decoy network devices 1282a-1282d are part of a pattern can alternatively or additionally be conducted by, or with assistance from, the deception center 1208. For example, the deception center 1208 can include packet scanning tools, such as an Intrusion Detection System (IDS) 1290, which can filter and/or analyze scan-related packets received by the deception sensor 1280. IDS 1290 can determine information about network traffic, such as identifying events and/or questionable content within the network traffic. In some implementations, as discussed further below, IDS 1290 can assist in identifying scan-related connections made to non-decoy devices and/or decoy network devices 1282a-1282d in the network. In some implementations, IDS 1290 can assist in identify a source or sources behind a scan. Some examples of IDS 1290 implementations include Bro IDS, Snort, and those produced by Splunk.

In various implementations, scan-related activity can also be stored for further analysis. The stored data can be periodically be re-assed to determine whether network scans have occurred. For example a scan may not be evident until a certain number of scan-related packets have been seen, and a pattern can be derived from the packets. As another example, some scan occur over a long periods of time, necessitating some time to pass before the scan can be evident.

As noted above, in some implementations, a deception sensor can monitor scan-related packets to non-decoy network devices, when the scan-related packets are broadcast. In some implementations, the deception sensor may have access to non-emulated network devices, and can receive information about scan-related packet from such non-emulated network devices.

Figure 13:
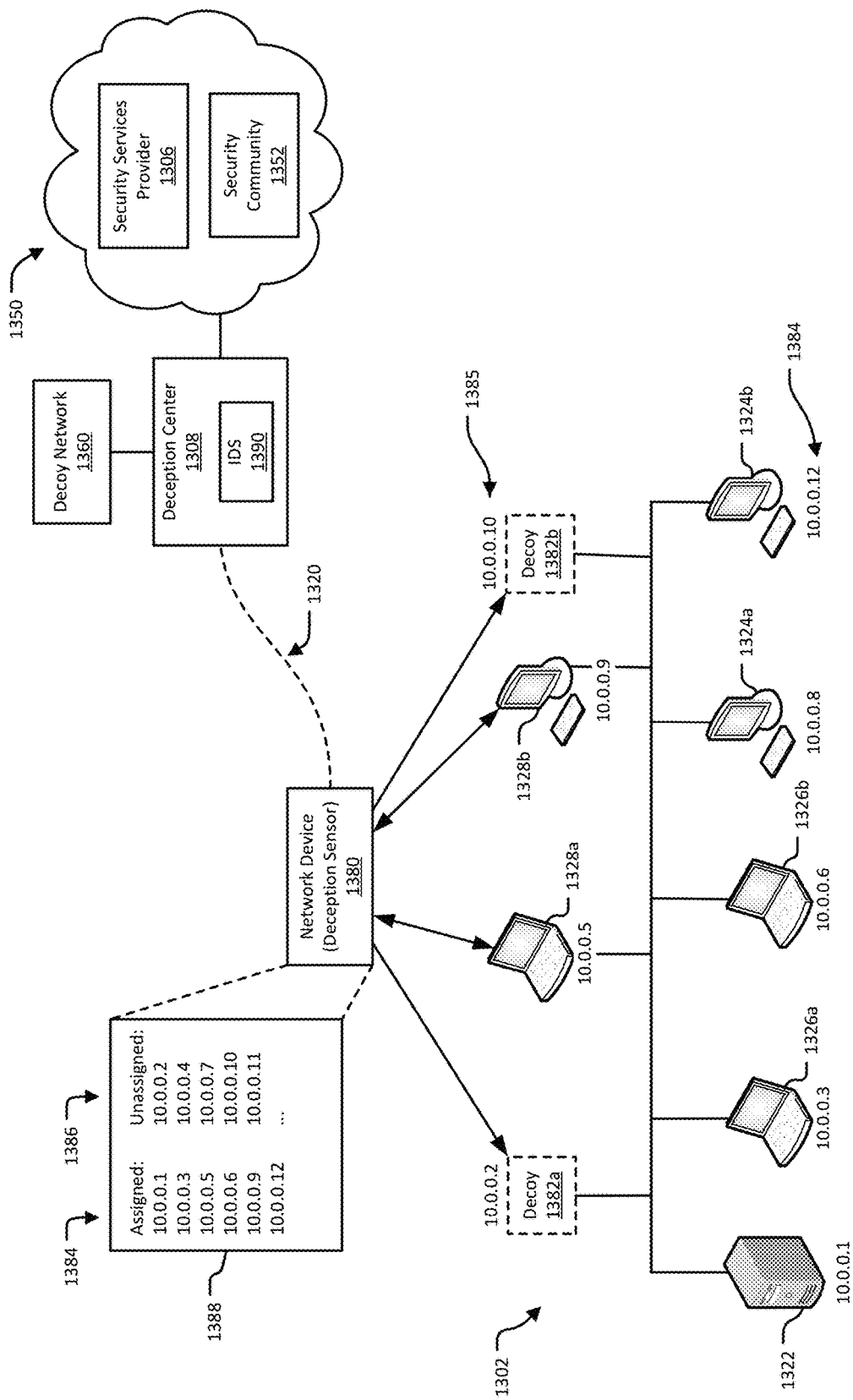
FIG. 13 illustrates another example of a network that includes a network device configured as a deception sensor.

FIG. 13 illustrates another example of a network 1302 that includes a network device configured as a deception sensor 1380. The example network 1302 includes various network devices, including a server 1322, two laptop computers 1326a-1326b, and two desktop computers 1324a-1324b. In other examples, the network 1302 can include other devices not illustrated here. In some implementations, the deception sensor 1380 can be communicating with a deception center 1308, using a secure network tunnel 1320. In some implementations, the deception center 1208 can include packet scanning tools, such as an Intrusion Detection System (IDS) 1390, which can filter and/or analyze scan-related packets received by the deception sensor 1380. The deception center 1308 can be connected to the example network 1302, or can be located outside the network 1302 and communicate with the network 1302 using intermediate networks. In either case, the deception center 1308 can be in communication with external networks 1350 in order to communicate with a network security services provider 1306 and/or the greater security community 1352.

The deception sensor 1380 can be connected to the network 1302 as another node in the network 1302. For example, the deception sensor 1380 can be connected to a port of a switch in the network 1302 and/or an access port of a VLAN configured for the network 1202. Alternatively, the deception sensor 1380 can be connected to a different network that can communicate with the example network 1302. For example, the example network 1302 can be provided by a network services provider, such that the network 1302 is "in the cloud."

In various implementations, the deception sensor 1380 can be configured to project deceptions, referred to here as decoy network devices 1382a-1382b, into the example network 1302. In the example of FIG. 13, a decoy network device is an emulation, and not a physical network device. The deception sensor 1380 can assume one or more network addresses, and for each network address can present a decoy network device 1382a-1382b to the network 1302. The deception sensor 1380 can use the decoy network devices 1382a-1382b to monitor network activity, including, for example, packets sent into and out of the network 1302, and/or packets sent between devices in the network 1302. Other than possibly transmitting packets in order to appear to be active devices, the decoy network devices 1382a-1382b do not themselves participate in network activity.

In various implementations, the deception sensor 1380 can connect to and/or communicate with physical network devices, referred to herein as representative network devices. A representative network device is a physical computing system that is representative of a type of network device that can be found in the example network 1302. In the illustrated example, the representative network devices include a representative laptop computer 1328a and a representative desktop computer 1328b. In this example, the representative laptop computer 1328a and the representative desktop computer 1328b can be configured with a similar operating system and network services as are executing on other laptop computers 1326a-1326b and desktop computers 1324a-1324b in the network. The representative network devices may then resemble the other network devices in the network 1302. Alternatively or additionally, the representative network devices can be configured or selected based on alerts generated by the network's security perimeter and/or information obtain from the security community 1352.

In some implementations, the representative network devices have been specifically configured for monitoring the network 1302 for network scans. In these implementations, the representative network devices may not participate in the network activity, and may act as full-time decoys. In some implementations, the representative network devices are ordinary network devices in the network 1302 that have been configured to communicate with the deception sensor 1380. In these implementations, the representative network devices may participate in ordinary network activity.

In various implementations, the deception sensor 1380 can maintain lists 1388 of network addresses that can be used in the network 1302. In various implementations, the deception sensor 1380 can segregate the lists 1388 of network addresses available in the network 1302 into assigned 1384 and unassigned 1386 network addresses. In the illustrated example, network addresses "10.0.0.1," "10.0.0.3", "10.0.0.6," "10.0.0.8," and "10.0.0.12," are currently assigned the non-decoy server 1322, laptop computers 1326a-1326b, and desktop computers 1324a, 1324b, respectively, and network addresses "10.0.0.5" and "10.0.0.9" are currently assigned to the representative laptop computer 1328a and representative desktop computer 1328b, respectively. The remaining possible network addresses are unassigned (e.g., network address 1385), though in the illustrated example the deception sensor 1380 is using "10.0.0.2" and "10.0.0.10" to project two decoy network devices 1382a-1382b into the network 1302. At various times, the assigned 1384 and unassigned 1386 network addresses can change as devices leave and join the network 1302, and/or the deception sensor 1380 adds or removes decoy network devices.

In various implementations, the deception sensor 1380 can use packets received at the decoy network devices 1382a-1382d and/or the representative network devices 1328a-1382b to determine whether the network 1302 is being scanned. For example, a port scan can involve a packet being sent to a particular port on a particular network device. For example, when a particular TCP is open on a particular network device open, the network device can respond to a received synchronize message (commonly abbreviated as "SYN"), with an acknowledge ("SYN-ACK") message. The SYN-ACK message can inform the sender of the SYN message that the port is open and available. As another example, when a UDP port is open, the network device may not send a response. A non-response may be indistinguishable from the packet having been dropped somewhere in the network 1302, so a network threat probing UDP ports may instead look for closed ports. When the port is closed the network device can respond with a reset ("RST") message.

In various implementations, the deception sensor 1380 can be configured to respond to TCP, UDP, and other packets that are scanning for open ports. For example, when decoy network device 1382a-1382d receives a scan-related packet, in various implementations, the deception sensor 1380 can generate an appropriate response. In this example, a scan-related packet that is probing whether a particular port is open will receive a reply that the port is open, and when the probe is to determine whether the port is closed, will receive a reply that the port is closed.

In some implementations, instead of generating the response, the deception sensor 1380 may send the response to another device for the other device to form the response. For example, the deception sensor 1380 can send a scan-related packet to a representative network device and/or to the deception center 1308. In some implementations, deception center 1308 may have access to a decoy network 1360, which can include emulated and/or physical network devices. In these implementations, the deception center 1308 can send a scan-related packet to an appropriate device in the decoy network 1360. The deception center 1308 can then send the response generated by the device in the decoy network 1360 over the network tunnel 1320 back to the deception sensor 1380. When the deception sensor 1380 uses another device to generate a response to a scan-related packet, the deception sensor 1380 may take steps such as encapsulating the original scan packet so that the original source and destination addresses are preserved, or modifying the source and destination addresses so that the response can be transmitted back to the deception sensor 1380.

In various implementations, the representative network devices can also respond to scan-related packets that are probing for open ports. In some cases, the representative network devices can have commonly probed ports open. In some cases, deception sensor 1380, upon determining that scanning of a particular port may be in progress, can inform a representative network device to open the particular port. Because the representative network devices are in direct communication with the deception sensor 1380, a representative network device can transmit data to the deception sensor 1380 that informs the deception sensor 1380 that a the representative network device is possibly experience a scan.

Packets that can be used to probe for open ports frequently resemble connection attempts. For example, the SYN and SYN-ACK sequence discussed above can be the first steps in establishing a TCP connection (an ACK packet from the sender of the SYN packet would complete the connection). In a scan, the device requesting the connection may terminate the connection (e.g., send a message that indicates the connection should not complete) before the connection completes, since the scan need not complete the connection to determine whether a port is open or closed. Because scan packets can resemble ordinary connection attempts, SYN and ACK packets, and other packets that may be used for making connections, by themselves, do not necessarily indicate that the network is being scanned.

In various implementations, the deception sensor 1380 can examine network interactions with the decoy network devices 1382a-1382d and/or the representative network devices 1328a-1328b to determine whether a scan of the network has occurred. For example, the deception sensor 1380 can attempt to determine whether scan-related packets that have been sent in the network 1302 relate to one another according to a pattern. A pattern of scan-related packets can indicate a systematic attempt to determine information about the network 1302. The scan-related packets may follow a pattern when the scan-related packets follow an identifiable series of network addresses and/or a series of port numbers. A series can include, for example, decreasing or increasing sequential numbers, numbers that increase or decrease by intervals of two, three, or more, numbers that are with a range, numbers that are all odd or all even, numbers that have some other relationship, and/or numbers that have a combination of relationships.

In some implementations, to confirm that a scan may be occurring, the deception sensor 1380 can initiate additional decoy network devices, as discussed above. In some implementations, the deception sensor 1380 can additionally or alternatively snoop traffic on the network 1302 for scan-related packets being sent to the non-decoy or representative network devices (e.g., the server 1322, the laptop computers 1326a-1362b, and the desktop computers 1324a-1324b). For example, by being connected to a port of a switch in the network 1302, and/or being connected to an access port or trunk port of a VLAN, the deception sensor 1380 may be able to see traffic flowing across the network, including unicast traffic. In this example, the deception sensor 1380 can monitor this network traffic for packets that appear to be related to scanning. In some implementations, this monitoring can be activated when a decoy network device 1384a-1384b and/or a representative network device receives scan-related packets.

In some cases, the deception sensor 1380 may not be able to snoop unicast traffic in the network 1302. For example, the network 1302 may be in a data center (e.g., "in the cloud"), and the deception sensor 1380 may connected to the network 1302 from outside of the data center. In this example, the deception sensor 1380 is likely unable to snoop unicast traffic sent between the devices in network 1302. As another example, security for the network 1302 may be configured such that unicast traffic is hidden or encrypted. In these and other examples, the deception sensor 1380 may still be able to receive broadcast packets, due to being in a broadcast domain of the network 1302. As discussed above, the deception sensor 1380 may be able to identify early stage scans from broadcast traffic. Upon identifying such a scan, the deception sensor 1380 can inform the deception center 1308, the network's security infrastructure, and/or network administrators that deeper scans may soon follow.

Figure 14:
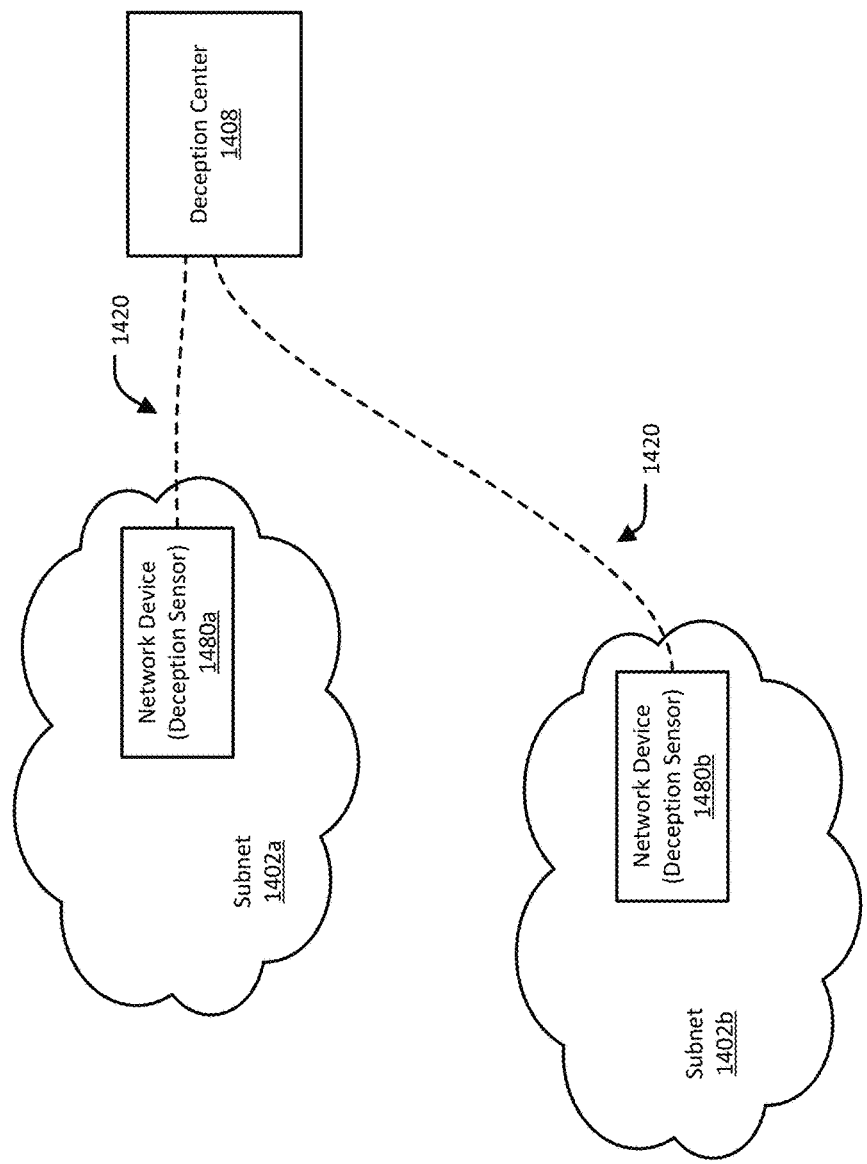
FIG. 14 illustrates an example where deception sensors have been configured to monitor different subnets for network scans.

In some implementations, data from multiple deception sensors can be used to determine whether a scan of the network is occurring, and/or whether the scan is across larger parts of the network. FIG. 14 illustrates an example where deception sensors 1480a-1480b have been configured to monitor different subnets 1402a-1402b for network scans. In this example, a first deception sensor 1480a is connected to and/or is projecting deceptions into a first subnet 1402a. The first deception sensor 1480a can, for example, assume network addresses that are unassigned (e.g., not currently being used) in the first subnet 1402a to present decoy network devices to the first subnet 1402a, as discussed above. Similarly, the second deception sensor 1480b can be connected to and/or project deceptions into the second subnet 1402b, using network addresses that are not assigned in the second subnet 1402b. In some implementations, the deception sensors 1480a-1480b can be connected to a deception center 1408 over secure network tunnels 1420. While only two deception sensors 1480a-1480b are illustrated here, in other examples, additional deception sensors can be connected to each subnet 1402a-1402b, and/or additional deceptions sensors can communicate with the illustrated deception sensors 1480a-1480b.

In the example of FIG. 14, the two example subnets 1402a-1402b are part of the same customer network. In some cases, the two subnets 1402a-1402b can be in the same geographical location, or can be in different geographical locations. In either case, there can be secure communication channels between the subnets 1402a-1402b (e.g., one or more VLANs, a Virtual Private Network (VPN), or some other secure communication channel) so that devices within each subnet 1402a-1402b can communicate as if within the same subnet.

In the illustrated example, the deception sensors 1480a-1480b can exchange information to determine whether a network scan is occurring. For example, the second deception sensor 1480b, having detected suspect broadcast scan traffic or suspect connection attempts, can send data to the first deception sensor 1480a. The data can include, for example, network addresses that were probed by the scan, a type of scan that may have been conducted, a possible source of the scan, and/or a pattern determined from packets seen in the second subnet 1402b, where the pattern indicates that a scan may be occurring or has occurred.

In various implementations, the first deception sensor 1480a can use the data from the second deception sensor 1480b to analyze network traffic in the first subnet 1402a. For example, when the first deception sensor 1480a has not detected any scan activity in the first subnet 1402a, the first deception sensor 1480a can start examining the subnet 1402a for scan activity. As another example, when the first deception sensor 1480a has detected scan activity in the first subnet 1402a, the first deception sensor 1480a can check whether the scan activity in the first subnet 1402a is related to the scan activity in the second subnet 1402b. In this example, the first deception sensor 1480a can compare a pattern of packets seen in network activity in the first subnet 1402a with a pattern of packets seen in the network activity in the second subnet 1402b. When the activity in the subnets 1402a-1402b appears similar (e.g., follow a similar or related series in the manner in which network addresses were accessed), it may be that both subnets 1402a-1402b have been scanned by the same entity.

Alternatively or additionally, in some implementations, the deception sensors 1480a-1480b can share scan-related information with the deception center 1408. In these implementations, the deception center 1408 can examine network activity seen by the deception sensors 1480a-1480b in each subnet 1402a-1402b, and attempt to determine whether related scan activity occurred in both subnets 1402a-1402b. Alternatively or additionally, the deception center can provide, for example, the first deception sensor 1480a with data from the second deception sensor 1480b that the first deception sensor 1480a can use to look for scan activity in the first subnet 1402a. In various implementations, the deception center 1408 can conduct other coordination activities between the deception sensors 1480a-1480b.

In some implementations, the first deception sensor 1480a may be able to exchange information directly with the second subnet 1402b. For example, the deception sensors 1480a-1480b may be able to use secure communication channels between the subnets 1402a-1402b. Alternatively or additionally, in some implementations, the deception sensors 1480a-1480b can send information over the secure network tunnels 1420 to the deception center 1408. The deception center 1408 may then process the information, and/or may send the information to another deception sensor 1480a-1480b.

Figure 15:
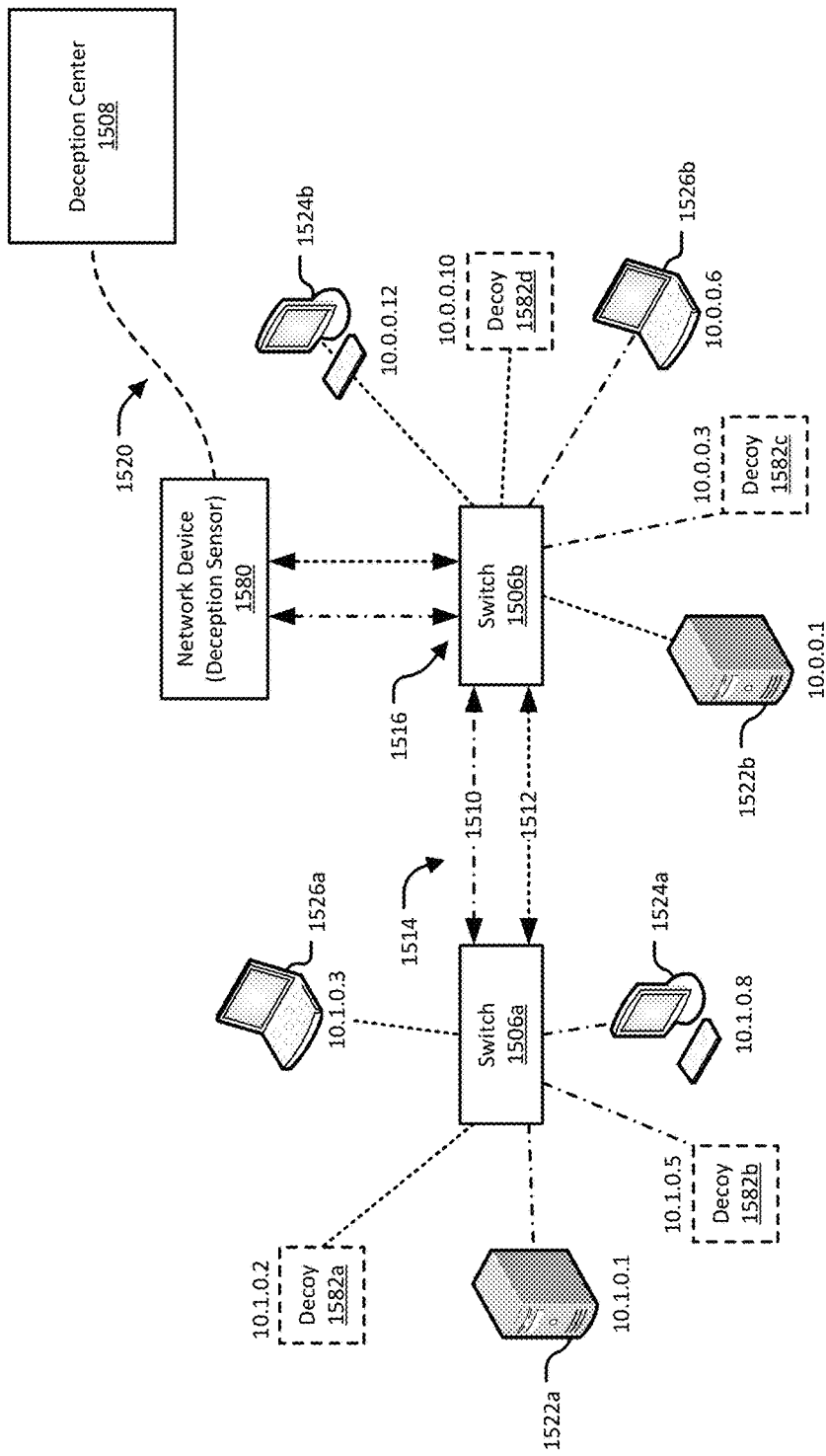
FIG. 15 illustrates an example where a network device configured as a deception sensor has been connected to a VLAN trunk port.

In some implementations, one deception sensor can be used to monitor multiple subnets in a network. FIG. 15 illustrates an example where a network device configured as a deception sensor 1580 has been connected to a VLAN trunk port 1516. A VLAN is a broadcast domain that groups together network devices that may not be connected to the same network switch. In some cases, the network devices in a VLAN may not be geographically proximate, and may connect to other devices in the VLAN over intermediate public and/or private networks.

In the example illustrated in FIG. 15, network devices connected to two different switches 1506a-1506b are grouped into two VLANs 1510, 1512. Connections in the first VLAN 1510 are illustrated using dash-dot lines, and connections in the second VLAN 1512 are illustrated using dotted lines. The first switch 1506a forms a first subnet, which has network address "10.1.0" The second switch 1506b forms a second subnet, which as has network address "10.0.0." At the first switch 1506a, a server 1522a and a desktop computer 1524a are configured to connect to the first VLAN 1510. A laptop computer 1526a is configured to connect to the second VLAN. At the second switch 1506b, a laptop computer 1526b is configured connected to the first VLAN 1510, and server 1522b and a desktop computer 1524b are configured to connect to the second VLAN 1512. Though only two VLANs 1510, 1512 are illustrated here, in other examples more VLANS can be configured for the two illustrated switches 1506a-1506b, and/or additional switches can be included in the two VLANs 1510, 1512.

As illustrated by this example, though the illustrated network devices are in different subnets and have different subnet addressees, the network devices can be in the same VLAN. VLANS thus provide a method for avoiding creating physical connections between network devices when it is desired that the network devices be in the same network domain.

In this example, a VLAN trunk 1514 has been configured between the switches 1506a-1506b. A trunk is a network link that can carry network traffic for more than one VLAN. Each switch 1506a-1506b can have a port configured a trunk port, which can be used to connected to the VLAN trunk 1514. Ports on a switch that are not used as trunk ports may be referred to as access ports. In some cases, the VLAN trunk 1514 can span multiple public and/or private networks that lie between the illustrated switches 1506a-1506b. In other examples, VLAN trunks can alternatively or additionally be configured between switches and routers.

In the example of FIG. 15, a deception sensor 1580 can monitor network activity on both VLANS 1510, 1512 by connecting to a trunk port 1516 configured for one of the switches 1506b. By connecting to the trunk port 1516, the deception sensor 1580 can receive network packets that are broadcast in either VLAN 1510, 1512, and/or may be able to snoop multicast and unicast network traffic between devices in each VLAN 1510, 1512. The deception sensor 1580 can distinguish network traffic in each VLAN 1510, 1512 by a VLAN tag that can be included in each packet that traverses the VLAN trunk 1514. The VLAN tag can indicate which VLAN 1510, 1512 a particular packet belongs to.

In various implementations, the deception sensor 1580 can also use the trunk port 1516 to project deceptions into both VLANs 1510, 1512. In these implementations, the deception sensor 1580 can be configured with unassigned network addresses in each VLAN 1510, 1512, and/or can scan the VLANS 1510, 1512 to determine unassigned network addresses. The deception sensor 1580 can then assume unassigned network addresses, and use the unassigned network addresses to present decoy network devices 1582a-1582c to the VLANs 1510, 1512. In the illustrated example, the deception sensor 1580 has projected two decoy network devices 1582b, 1582c in the first VLAN 1510, a first decoy network device 1582b in the subnet formed by the first switch 1506a, and a second decoy network device 1582c in the subnet formed by the second switch 1506b. The deception sensor 1580 has also projected two decoy network devices 1582a, 1582d into the second VLAN 1512, one decoy network device 1582a in the subnet formed by the first switch 1506a, and a second decoy network device 1582d in the subnet formed by the second switch 1506b.

In some implementations, the deception sensor 1580 can project the decoy network devices 1582a-1582d in response to an active scan (e.g., to confirm that scan-related packets are forming a pattern, which may indicate that a scan is occurring), and/or to monitor network activity in each VLAN 1510, 1512.

In some implementations, the deception sensor 1580 can be in communication with a deception center 1508 over a secure network tunnel 1520. The deception center 1508 can configure the deception sensor 1580 and/or process scan-related packets observed and/or received by the deception sensor 1580. In some implementations, the deception center 1508 can also coordinate between the deception sensor 1580 and other deception sensors, to determine whether wider scale network scans are occurring.

In various implementations, scan-related network activity can be categorized into one or more categories, to assist in determining whether a network scan is occurring or has occurred. For example, scan-related network activity can be categorized by an apparent type of scan being conducted, a direction in which a scan appears to be progressing or has progressed, and/or a speed of the scan, among other possible categorizations. In various implementations, scan-related network activity can fall into multiple categories and/or a combination of categories. In various implementations, categories for scan-related network activity can be determined by a deception sensor, a deception center, and/or intrusion detection systems installed for a network.

Figure 16A:
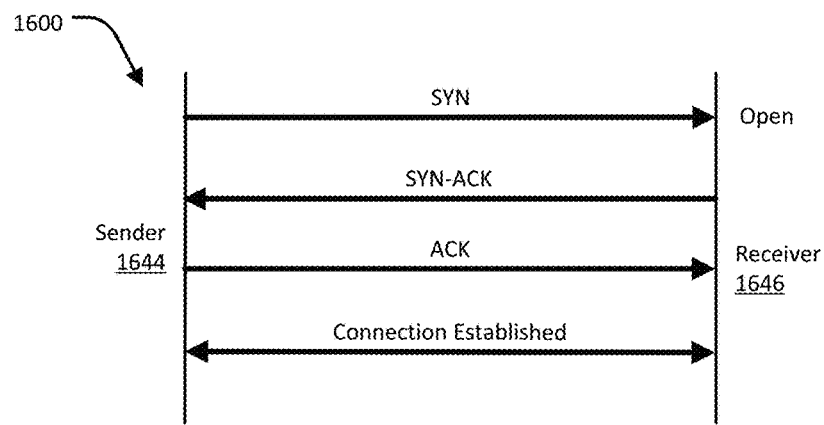
FIGS. 16A-16C illustrate examples of TCP packet exchanges between a sender and a receiver when the receiver has a particular port open or closed.
Figure 16B:
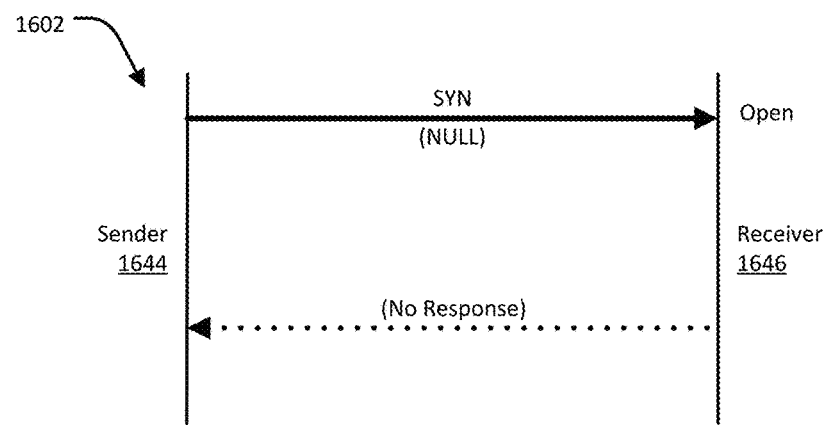
Figure 16C:
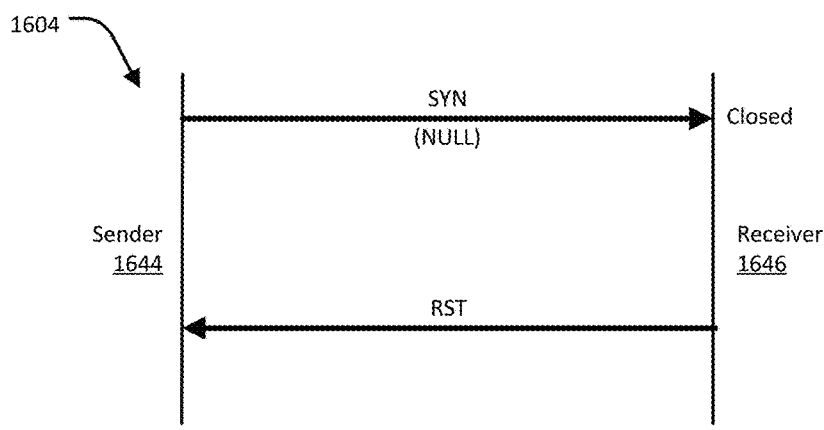

A scan type category can be determined from a network protocol used by scan-related packets and/or a pattern of the packets exchanged. FIGS. 16A-16C illustrate examples of TCP packet exchanges between a sender 1644 and a receiver 1646 when the receiver 1646 has a particular port open or closed. In these examples, the receiver 1646 can be a decoy network device or a legitimate, non-decoy network device. The sender 1644 can be a legitimate network device, but can also be a network device under the control of a network threat. The sender 1644 can be within the same network as the receiver 1646 (e.g., within the same security perimeter) or can be in an external network (e.g., outside of the security perimeter that includes the receiver 1646).

FIG. 16A illustrates an example of a TCP packet exchange 1600 for establishing a connection between the sender 1644 and the receiver 1646. In this example, the packet exchange 1600 results in a connection being established. In this packet exchange 1600, the sender 1644 first transmit a synchronize ("SYN") packet with a particular port number. In this example, the receiver 1644 has the port open. The receiver 1646 thus responds to the SYN packet with an synchronize-acknowledged packet ("SYN-ACK"). The SYN-ACK packet informs the sender 1644 that the particular port is open. The sender 1644 can subsequently send an acknowledgement ("ACK") packet, which acknowledges receipt of the SYN-ACK packet and indicates that the sender 1644 wants to complete a connection. Once the receiver 1646 receives the ACK packet, a connection between the sender 1644 and the receiver 1646 is established.

The example packet exchange 1600 of FIG. 16A can occur when the sender 1644 is going engage in a data exchange with the receiver 1646, and thus needs a persistent connection. For example, the connection may be for data transfer using file transfer protocol (FTP), telnet, Secure Shell (SSH), remote desktop protocol (RDP), or some other protocol or network data transfer method.

When used to connect to consecutive ports and/or network devices, the illustrated packet exchange 1600 may be referred to as a connect( ) scan. A network threat that uses the packet exchange 1600 may be attempting to determine whether the port is open. Alternatively or additionally, the network threat may be attempting to tie up processing resources, which would be used to respond to the connection request. Monitoring systems, such as IDS applications, can, however, isolate the network address of the sender 1644, and possibly determine whether the network address has been forged or spoofed. This information can be used to determine whether a connect( ) scan actually occurred or whether a legitimate connection was made. Alternatively or additionally, this information can be used to determine whether a connect( ) scan was conducted by a legitimate sender or by a network threat.

FIGS. 16B-16C illustrates examples of packet exchanges 1602, 1604 for a NULL scan. A NULL scan can be used by legitimate and malicious entities to identify open and closed ports on a network device. In a NULL scan, the packet exchange 1602 begins with a SYN packet from the sender 1644, where some fields in the packet header are left unspecified and/or set to zero (e.g., the sequence number can be set to zero and all flags can be left unset). Unlike the example of FIG. 16A, the purpose of the packet exchanges 1602, 1604 is not to establish a connection, but rather to obtain some kind of response that is indicative of whether a port is open or closed.

In the example of FIG. 16B, the receiver 1646 has the port open, but because the SYN packet has certain fields unspecified, the receiver 1646, in most cases, may not know how to handle the request. The receiver 1646 may thus discard the packet and send no response. The lack of a response can inform the sender 1644 that the port might be open.

In the example of FIG. 16C, the receiver 1644 has the port closed. In this example, the receiver 1646 responds to the SYN packet with a reset ("RST") packet, which resets the connection. Resetting the connection has the affect of informing the sender 1644 to try the connection again. The RST packet can inform the sender 1644 that the port may be closed.

The examples of FIG. 16A-16C illustrate just a few types of scans. In various implementations, other types of scans can be identified by the systems discussed herein, including, for example, FIN, XMAS, SYN, and ACK scans, among others.

FIN and XMAS scans rely on a requirement in the TCP specification, which states that, when a packet that is neither a SYN or an RST has an ACK indicator set, the reply must be an RST message when the packet is received for a port that is open. When the port is closed, the packet should be dropped without any response. In a FIN scan, a finish ("FIN") indicator in the inbound packet is set. In an XMAS scan, the FIN, push ("PSH") and urgent ("URG") indicators may be set.

A SYN scan uses SYN packets to elicit an ACK when the port is open. A non-response can indicate that the port is closed.

An ACK scan may be used for determining whether a port is filtered or unfiltered, in addition to or instead of determining whether a port is open or closed. When a port receives an ACK packet that is not acknowledging a prior message, a receiver can, when the port is unfiltered, respond with an RST packet. When the port is closed, the receiver may send no response.

Other types of scans can use other network protocols, such as UDP, Internet Control Message Protocol (ICMP), and ARP, among others. In each case, packets can be formulated that can elicit a different response when a port is open as opposed to when the port is closed.

In various implementations, scan-related network traffic can be categorized into multiple scan types. For example, in the examples of FIGS. 16A-16C, scan-related packets in the illustrated packet exchanges 1600, 1602, 1604 can be assigned to a "TCP" category, for using the TCP protocol. The packets can the example of FIG. 16A can further be categorized in the "connect( ) scan" category, while the packets in the examples of FIGS. 16A-16B can be further categorized in the "NULL scan" category.

Figure 17A:
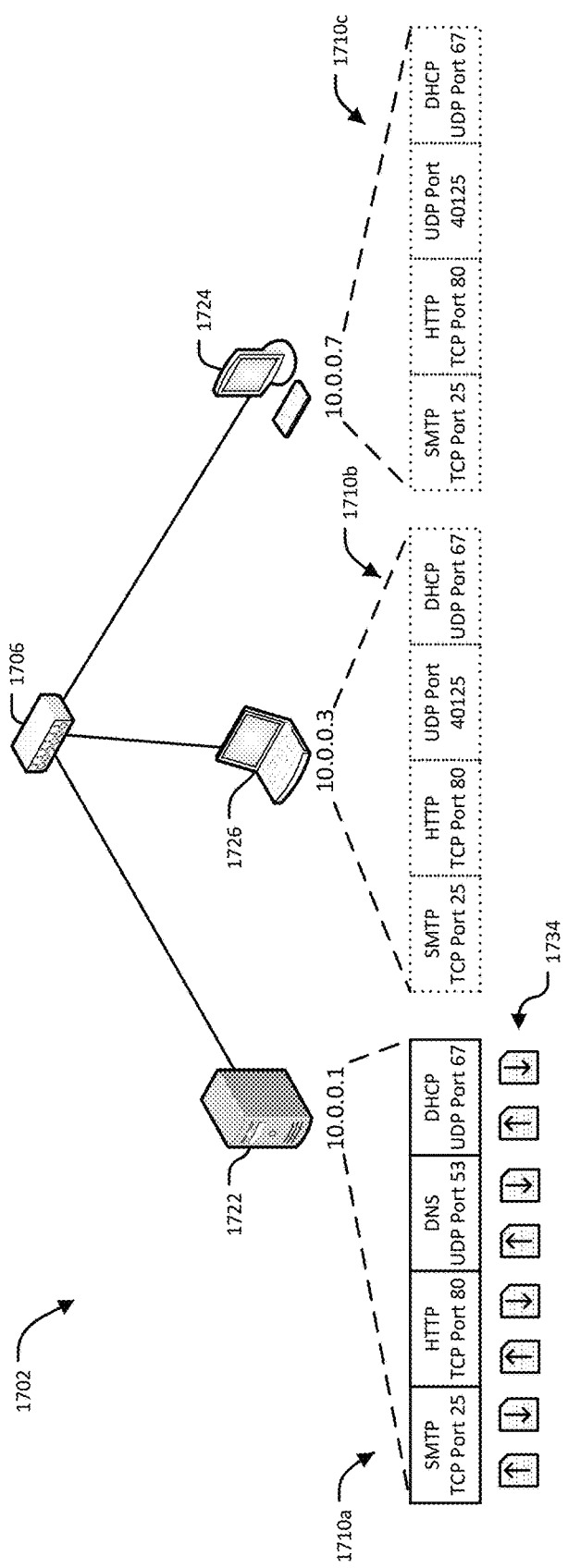
FIGS. 17A-17C illustrate examples of different scan directions, using a set of network devices that are in the same network.
Figure 17B:
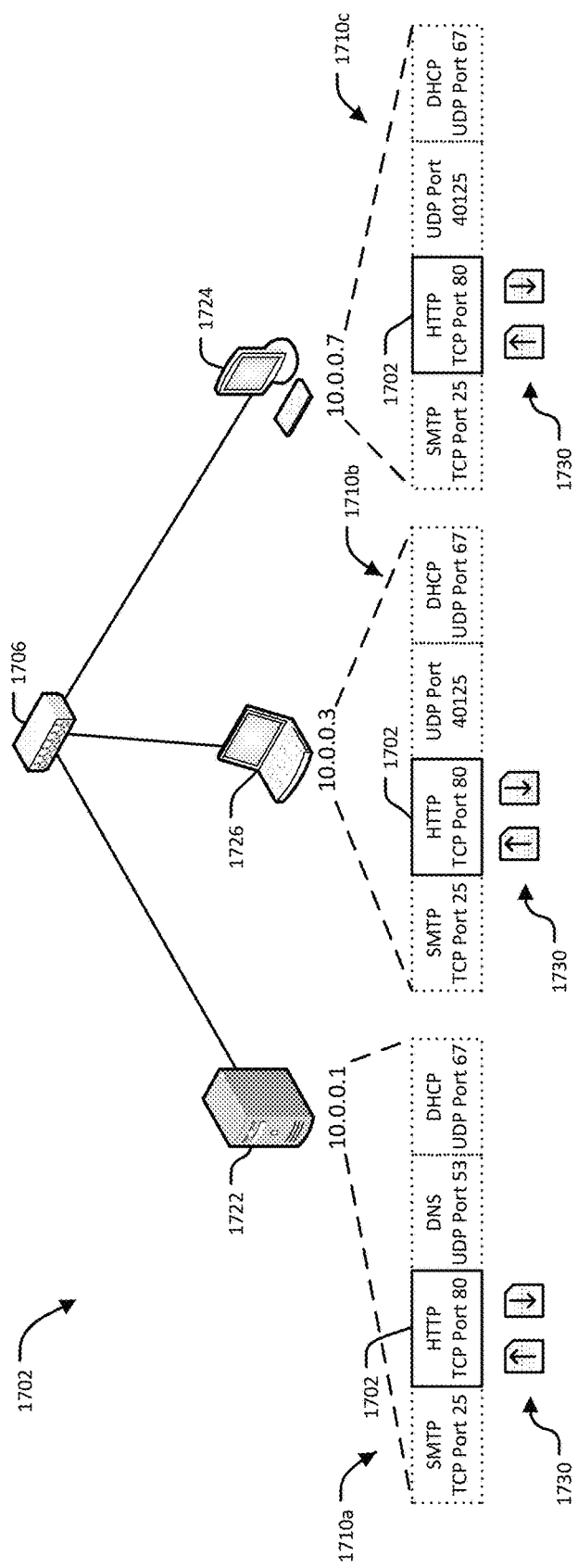
Figure 17C:
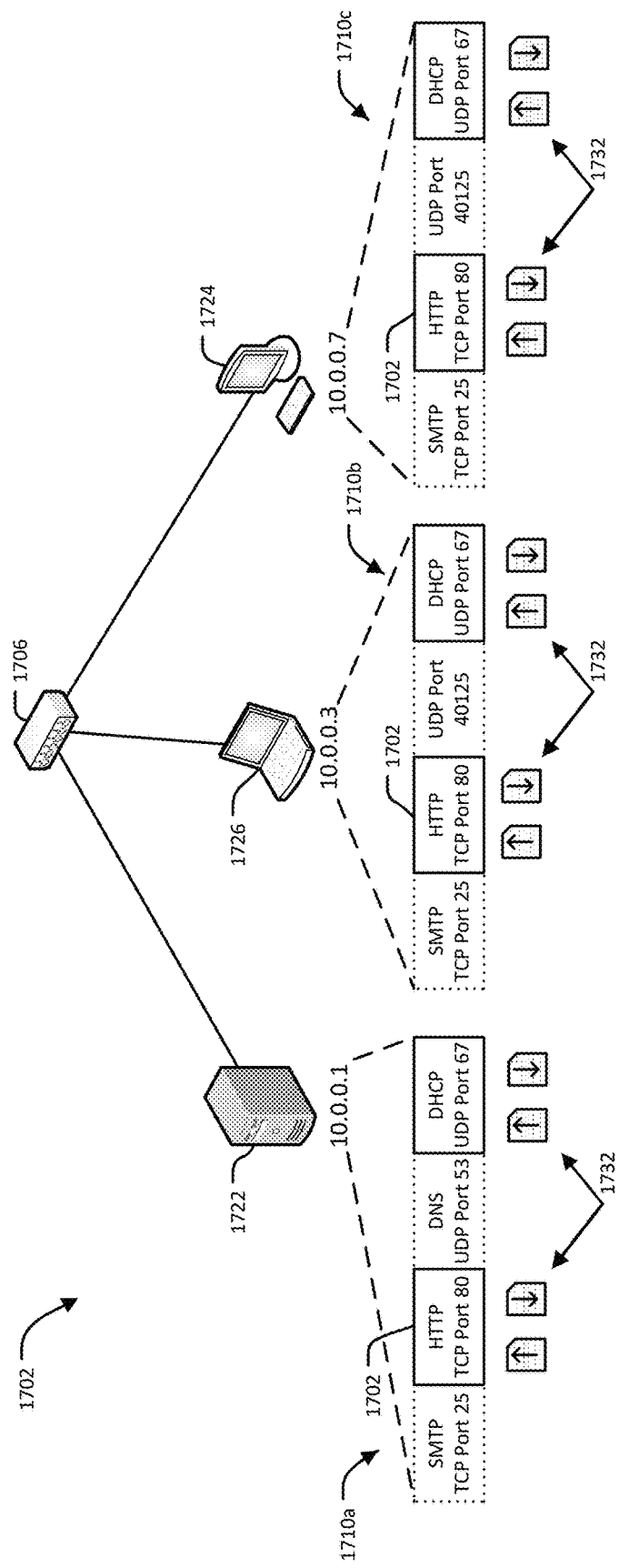

Scan-related packets can additionally or alternatively be categorized according a direction taken by the scan. FIGS. 17A-17C illustrate examples of different scan directions, using a set of network devices that are in the same network 1702. The illustrated network 1702 includes a server 1722, a laptop computer 1726, and a desktop computer 1724, each connected to a common switch 1706. Each network device has a set of open ports 1710a, 1710b, 1710c. Ports not illustrated in these examples can be assumed to be closed.

FIG. 17A illustrates an example of a scan category that can be referred to as a vertical scan 1734. In a vertical scan, some or all of the ports on a single host (in this example, the server 1722) are probed. For example, in some cases a set of TCP ports or a set of UDP ports may be probed. A scan that is focused on one network device may be conducted in advance of an attack on the one network device. Alternatively the scan may be attempting to occupy resources on the one network device.

FIG. 17B illustrates an example of a scan category that can be referred to as a horizontal scan 1730. In a horizontal scan 1730, a particular port (TCP port 80, in the illustrated example), is probed on multiple network devices. In this case, the network threat may, for example, have particular expertise in infiltrating a system by way of the particular port.

FIG. 17C illustrates an example of a scan category that can be referred to as a block scan 1732. In a block scan 1732, multiple ports (TCP port 80 and UDP port 67, in this example) on multiple network devices may be probed. A block scan can also be considered a combination of a vertical scan and a horizontal scan when multiple ports are scanned on one network device and then same ports are scanned on a different network device. A block scan can alternatively be considered a horizontal scan and a vertical scan when one port is scanned on each network device, and then another port is scanned on the same network devices.

Figure 18A:
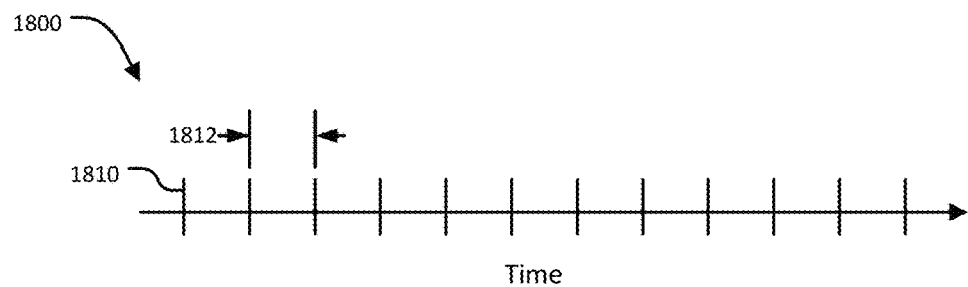
FIGS. 18A-18C illustrate examples of timelines for different scans.
Figure 18B:
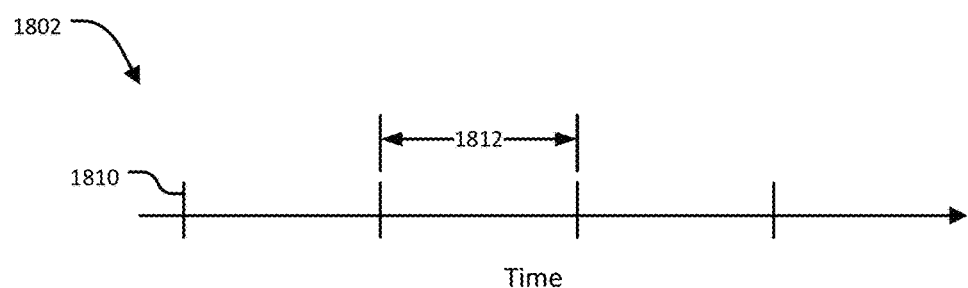
Figure 18C:
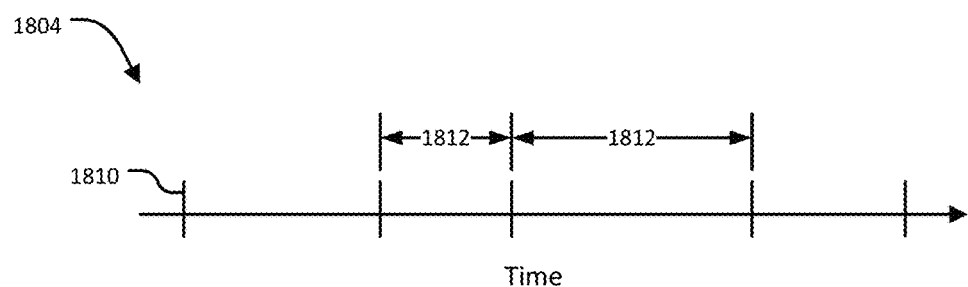

Scan-related packets can alternatively or additionally be categorized according a time interval between scan-related packets. FIGS. 18A-18C illustrate examples of timelines 1800, 1802, 1804 for different scans. Each timeline 1800, 1802, 1804 illustrates receipt of scan-related packets 1810 using a vertical tick mark. The scan-related packets 1810 can be received by one or multiple network devices.

In the example of FIG. 18A, the scan-related packets 1810 arrive quickly and with relatively consistent interval 1812 (e.g., the time interval 1812 varies by no more than an predictable network delay). This example can be categorized as a fast scan. The regularity and speed of a fast scan can indicate that the scan is being driven by an automated source, which may be able to transmit and receive packets at a faster rate than a human can type, and may be limited in speed only by network delays.

In the example of FIG. 18B, the scan-related packets 1810 arrive slowly and with a relatively consistent interval 1812. This example can be categorized as a slow scan. A slow scan can be difficult to detect: the time interval 1812 between the scan-related packets 1810 can be hours or days. Determining associations between packets that arrive so far apart can require collecting data over a very long period of time, and possibly sorting through a large amount of data to find packets that may be related to the same scan. In various implementations, the system discussed herein thus may monitor and/or capture network activity over long periods of time, and/or may analyze data over long time spans.

The example of FIG. 18C can be categorized as a variant of a slow scan. In this example, scan-related packets 1810 arrive slowly and with an inconsistent interval 1812 between the packets. Slow arrival of the scan-related packet 1810, along with the inconsistent interval 1812 can indicate that the scan is being driven by a human manually entering commands. This information can be useful in identifying a source of a scan.

In various implementations, type, direction, and/or speed categories, as well as other information about scan-related packets, can be used to determine whether a scan is in progress and/or has occurred. In various implementations, scan detection can use methods such as k-means clustering. In k-means clustering, the aim is to group n observations into k clusters. In the context of scan detection, the observations are connection attempts, and a cluster is a group of connection attempts that appear to be related (e.g., the connection attempts may have been conducted by a single source, and thus appear to be one or related scans).

In various implementations, the systems discussed herein (including the deception sensor, the deception center, security services provider, and/or other network security infrastructure) can cluster connection attempts by matching information about a connection attempt with similar information for previously seen connection attempts. Unmatched connection attempts can be stored for later matching against new connection attempts. A cluster of connection attempts can continue to be maintained until it is determined that the cluster represents a scan that is related to another scan, or it is determined that the scan has terminated.

In various implementations, a cluster of connection attempts can be defined by a type, direction, and/or speed category. In various implementations, a cluster can further be defined by a source network address (e.g., the network address of a sender of a connection attempt), an approximate start time of the scan, an approximate end time of a scan, a number of connection attempts made through the course of the scan, and/or an average duration (e.g., a time interval) between connection attempts in the cluster.

In various implementations, when a new connection attempt is observed, the new connection attempt can be matched against existing clusters of scan connections. Matching a new connection attempt can include determining whether the new connection attempt has a similar source network address, scan type, and/or scan direction, among other factors, as an existing cluster. In various implementations, not all of these factors need to match. In some implementations, a threshold and/or range can be configured some of these factors. For example, the source network address of a new connection attempt may be considered matching when the source network address falls within a certain range of the source network address for the cluster.

In some cases, a new connection attempt may match more than one cluster. In these cases, the new connection attempt may be added to multiple clusters. For example, the new connection attempt may be added to each cluster for which the new connection attempt is within a time period defined for a cluster, where the time period is an apparent time over which the scan occurred (or is expected to occur). A time period for a cluster can be defined as between scan_start_time−N×scan_duration and scan_end-time+N×scan_duration, where N is a constant that can be modified for specific implementations. N can be related to, for example, an average network latency, an average bandwidth in the network, a number of devices in a network, a time of day, a day of the week, and/or some other factor related to the network.

When a connection attempt is within the time period of more than one cluster, the multiple clusters may be part of one network scan. For example, it may not be clear, initially, that connection attempts received over a long period of time are from the same scan. Thus, when a connection attempt matches more than one cluster, this may be evidence that the clusters are part of one scan. In some implementations, these clusters may be merged into a single cluster.

When a connection attempt does not match any existing cluster, the connection attempt can be stored as an unmatched connection attempt. In various implementations, the system can then attempt to form a new cluster from unmatched connection attempts. In various implementations, for a set of unmatched connection attempts to qualify as a cluster, the unmatched connection attempts may have a same or similar source network address and/or compatible scan types. Alternatively or additionally, the set of unmatched connection attempts may form a coherent scan direction (e.g., same destination address but different ports, same port but different destination addresses, etc.). Alternatively or additionally, the set of unmatched connection attempts may have occurred within a pre-determined interval of each other. For example, assuming that the set of unmatched connection attempts being tested includes three connection attempts, having timestamps T1, T2, and T3, where T1<=T2<=T3, the pre-determined time interface can be defined as:

$$(T2-T1) \leq N^*(T3-T2)$$

$$(T3-T2) \leq N^*(T2-T1)$$

where N is a constant that can be modified, depending on the implementation.

In addition to the criteria described above, other criteria can be used to determine whether a set of unmatched connection attempts form a cluster.

In various implementations, the minimum number of unmatched connection that need to be seen before the set of unmatched connection attempts is considered a cluster can be configurable. For example, the minimum can be two or three, or some other number.

In various implementations, the definition of a cluster can be periodically updated. For example, the start time can be adjusted to the minimum time stamp of the connection attempts in the cluster. As another example, the end time can be adjusted to a maximum time stamp of the connection attempts in the cluster. As another example, the duration between connection attempts can be adjusted to an updated scan end time minus an updated scan start time divided by one less than the number of connection attempts in the cluster. In various implementations, a cluster's definition can be updated whenever a new connection attempt is added to the cluster, or at some other time.

In various implementations, a clusters can be removed, on the assumption that a scan represented by the cluster has terminated. In various implementations, a cluster can be removed when connection attempts no longer fit the definition of the cluster. For example, when a current time stamp has exceeded a time at which another connection attempt could have occurred, any future connection attempts may be part of a new scan (and, thus, a new cluster). The time at which further connection attempts may be for another scan can be defined as current_time_stamp>scan_end_time+N×scan_duration, where N is a modifiable constant.

In various implementations, in addition to determining whether connection attempts are associated with the same scan, scan detection can also include determining whether different scan are related. Network scans may occur in stages. For example, a network threat may first conduct an ARP scan to identify devices in a network. In this example, the network threat may then conduct a FIN scan on the identified devices. In this example, the ARP scan type and the FIN scan type may be referred to as "compatible" because the first scan can lead to the second scan.

As noted above, in various implementations, scan compatibility can be considered when unmatched connection attempts are examined to determine whether the unmatched connection attempts form a cluster. Doing so can cluster connection attempts with different types, directions, and/or speeds that would otherwise not appear to be related.

Specific details were given in the preceding description to provide a thorough understanding of various implementations of systems and components for deception to detect network scans. It will be understood by one of ordinary skill in the art, however, that the implementations described above may be practiced without these specific details. For example, circuits, systems, networks, processes, and other components may be shown as components in block diagram form in order not to obscure the implementations in unnecessary detail. In other instances, well-known circuits, processes, algorithms, structures, and techniques may be shown without unnecessary detail in order to avoid obscuring the implementations.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured to operate as a deception sensor.

As used below, any reference to a series of examples is to be understood as a reference to each of those examples disjunctively (e.g., "Examples 1-4" is to be understood as "Examples 1, 2, 3, or 4").

Example one is a method, the method including determining, by a network device on a network, a particular network address, wherein the network device is configured as a decoy network device, and wherein a decoy network device monitors network activity and does not participate in network activity. The method further includes determining that the particular network address is unassigned, wherein a network address is unassigned when the network address is not currently participating in the network activity, and wherein packets addressed to an unassigned network address are not expected to be received. The method further includes configuring the network device with the particular network address, wherein the network device uses the particular network address to monitor network activity for one or more network scans. The method further includes receiving a packet addressed to the particular network address. The method further includes determining that received packet is associated with a scan of the network, wherein determining that the received packet is associated with a scan of the network includes associating the received packet with one or more other packets in the monitored network activity. The method further includes configuring one or more security settings for the network when the received packet is determined to be associated with a scan of the network.

Example 2 is the method of examples 1, the method further including determining a pattern of packets, wherein the pattern is determined from the monitored network activity, wherein the pattern of packets includes a series of network addresses, and wherein associating the received packet with the other packets includes determining that the particular network address is associated with the series of network addresses.

Example 3 is the method of examples 1-2, the method further including receiving a second packet addressed to a second network address, wherein the second network address is associated with a non-decoy network device on the network, and wherein the second packet is a broadcast packet. The method further includes determining that the second packet is associated with the scan of the network, wherein determining that the second packet is associated with the scan of the network includes determining that the second packet is associated with a pattern of packets that includes the received packet.

Example 4 is the method of examples 1-3, the method further including generating a response packet using the received packet. The method further includes transmitting the response packet onto the network.

Example 5 is the method of examples 1-4, the method further including transmitting contents of the received packet using another network address, wherein the other network address is associated with a non-decoy network device on the network. The method further includes receiving a response packet. The method further includes using the response packet to respond to the unexpected packet.

Example 6 is the method of examples 1-5, the method further including determining a pattern of packets, wherein the pattern is determined from the monitored network activity, and wherein the pattern of packets includes a series of network addresses. The method further includes determining a second unassigned network address, wherein the second unassigned network address is associated with the series of network addresses, and wherein the pattern of packets does not include a packet addressed to the second unassigned network address. The method further includes configuring the network device with the second unassigned network address.

Example 7 is the method of examples 1-6, the method further including determining, using the monitored network activity, that the scan of the network has concluded. The method further includes configuring the network device to stop using the particular network address.

Example 8 is the method of examples 1-7, the method further including maintaining a list of network addresses, wherein the list of network addresses includes assigned and unassigned network addresses, and wherein the particular network address is determined using the list of network addresses.

Example 9 is the method of examples 1-8, the method further including receiving data associated with another decoy network device, wherein the data includes additional monitored network activity. The method further includes determining that one or more packets in the additional network activity are associated with the scan of the network.

Example 10 is the method of examples 1-9, the method further including receiving data associated with a non-decoy network device on the network. The method further includes determining, using the data, that a network connection was made to the non-decoy network device, wherein the network connection is associated with the scan of the network.

Example 11 is the method of examples 1-10, the method further including determining a category for the network connection, wherein the category is determined using a network protocol associated with the connection.

Example 12 is the method of examples 1-11, the method further including determining a category for the network connection, wherein the category is determined using a port number associated with the connection.

Example 13 is the method of examples 1-12, the method further including determining that a second network connection was made to another network device on the network. The method further includes determining a category for the network connection and the second network connection, where the category is determined using a time interval between the connection and the second connection.

Example 14 is the method of examples 1-13, the method further including transmitting the one or more security settings, wherein, when a security setting is received at another network device on the network, the security setting facilitates defending the other network device from a network threat associated with the scan of the network.

Example 15 is a network device, which includes one or more processors and a non-transitory computer-readable medium. The non-transitory compute readable medium includes instructions that, when executed by the one or more processors, cause the one or more processors to perform operations according to the method(s) of examples 1-14.

Example 16 is a computer-program product tangibly embodied in a non-transitory machine-readable storage medium, including instructions that, when executed by one or more processors, cause the one or more processors to perform steps according to the method(s) of examples 1-14.

What is claimed is:

1. A method comprising:
   configuring a network device on a network with a particular network address, wherein the particular network address is unassigned before configuring the network device, wherein the network device uses the particular network address to present a decoy network device to the network, and wherein the network device uses the decoy network device to monitor network activity for a network scan;
   receiving a first packet addressed to the particular network address;
   determining a pattern of packets, wherein the pattern of packets is determined using the first packet and the monitored network activity, and wherein the pattern of packets includes an arrangement of network addresses;
   configuring the network device with an additional network address, wherein the additional network address follows the particular network address in the arrangement of network addresses, and wherein the network device uses the additional network address to present a second decoy network device to the network;
   receiving a second packet addressed to the additional network address;
   determining that the first packet and the second packet are associated with a scan of the network, wherein determining includes associating the first packet and the second packet with the pattern of packets;
   configuring one or more security settings for the network when the first packet and the second packet are determined to be associated with a scan of the network, wherein configuring the one or more security settings modifies one or more decoy network devices to gain more information about the scan of the network;
   using the information gained about the scan of the network to determine one or more additional security settings; and
   transmitting the one or more additional security settings, wherein, when the one or more additional security settings are received at a second network device on the network, the one or more additional security settings facilitate defending the network from a network threat associated with the scan of the network.

2. The method of claim 1, further comprising:
   generating a response packet for responding to the first packet; and
   transmitting the response packet onto the network.

3. The method of claim 1, further comprising:
   transmitting contents of the first packet to a non-decoy network device on the network;
   receiving a response packet from the non-decoy network device; and
   using the response packet to respond to the first packet.

4. The method of claim 1, further comprising:
   determining, using the monitored network activity, that the scan of the network has concluded; and
   configuring the network device to stop using the additional network address.

5. The method of claim 1, further comprising:
   receiving data from a second network device configured to present decoy network devices, wherein the data describes one or more packets received by decoy network devices used by the second network device to monitor network activity; and
   determining that the one or more packets are associated with the scan of the network.

6. The method of claim 1, further comprising:
   receiving data from a non-decoy network device on the network, wherein the data describes one or more packets received by the non-decoy network device; and
   determining, using the data, that a network connection was made to the non-decoy network device, wherein the network connection is associated with the scan of the network.

7. The method of claim 6, further comprising:
   determining a category for the network connection, wherein the category is determined using a network protocol associated with the network connection.

8. The method of claim 6, further comprising:
   determining a category for the network connection, wherein the category is determined using a port number associated with the network connection.

9. The method of claim 6, further comprising:
   determining that a second network connection was made to another network device on the network; and
   determining a category for the network connection and the second network connection, wherein the category is determined using a time interval between the network connection and the second network connection.

10. The method of claim 1, wherein the monitored network activity includes one or more packets sent between other network devices in the network, and further comprising:
    identifying a packet from the one or more packets that can be used to conduct a scan of the network.

11. A network device on a network, comprising:
    one or more processors; and
    a non-transitory computer-readable medium including instructions that, when executed by the one or more processors, cause the one or more processors to perform operations including:
       configuring the network device with a particular network address, wherein the particular network address is unassigned before configuring the network device, wherein the network device uses the particular network address to present a decoy network device to the network, and wherein the network device uses the decoy network device to monitor network activity for a network scan;
       receiving a first packet addressed to the particular network address;
       determining a pattern of packets, wherein the pattern of packets is determined using the first packet and the monitored network activity, and wherein the pattern of packets includes an arrangement of network addresses;

configuring the network device with an additional network address, wherein the additional network address follows the particular network address in the arrangement of network addresses, and wherein the network device uses the additional network address to present a second decoy network device to the network;

receiving a second packet addressed to the additional network address;

determining that the first packet and the second packet are associated with a scan of the network, wherein determining includes associating the first packet and the second packet with the pattern of packets;

configuring one or more security settings for the network when the first packet and the second packet are determined to be associated with a scan of the network, wherein configuring the one or more security settings modifies one or more decoy network devices to gain more information about the scan of the network;

using the information gained about the scan of the network to determine one or more additional security settings; and transmitting the one or more additional security settings, wherein, when the one or more additional security settings are received at a second network device on the network, the one or more additional security settings facilitate defending the network from a network threat associated with the scan of the network.

12. The network device of claim 11, wherein the non-transitory computer-readable medium further includes instructions that, when executed by the one or more processors, cause the one or more processors to perform operations including:

generating a response packet for responding to the first packet; and transmitting the response packet onto the network.

13. The network device of claim 11, wherein the non-transitory computer-readable medium further includes instructions that, when executed by the one or more processors, cause the one or more processors to perform operations including:

transmitting contents of the first packet to a non-decoy network device on the network;

receiving a response packet from the non-decoy network device; and using the response packet to respond to the first packet.

14. The network device of claim 11, wherein the non-transitory computer-readable medium further includes instructions that, when executed by the one or more processors, cause the one or more processors to perform operations including:

determining, using the monitored network activity, that the scan of the network has concluded; and configuring the network device to stop using the additional network address.

15. The network device of claim 11, wherein the non-transitory computer-readable medium further includes instructions that, when executed by the one or more processors, cause the one or more processors to perform operations including:

receiving data from a second network device configured to present decoy network devices, wherein the data describes one or more packets received by decoy network devices used by the second network device to monitor network activity; and determining that the one or more packets are associated with the scan of the network.

16. The network device of claim 11, wherein the non-transitory computer-readable medium further includes instructions that, when executed by the one or more processors, cause the one or more processors to perform operations including:

receiving data from a non-decoy network device on the network, wherein the data describes one or more packets received by the non-decoy network device; and determining, using the data, that a network connection was made to the non-decoy network device, wherein the network connection is associated with the scan of the network.

17. The network device of claim 16, wherein the non-transitory computer-readable medium further includes instructions that, when executed by the one or more processors, cause the one or more processors to perform operations including:

determining a category for the network connection, wherein the category is determined using a network protocol associated with the network connection.

18. The network device of claim 16, wherein the non-transitory computer-readable medium further includes instructions that, when executed by the one or more processors, cause the one or more processors to perform operations including:

determining a category for the network connection, wherein the category is determined using a port number associated with the network connection.

19. The network device of claim 16, wherein the non-transitory computer-readable medium further includes instructions that, when executed by the one or more processors, cause the one or more processors to perform operations including:

determining that a second network connection was made to another network device on the network; and determining a category for the network connection and the second network connection, wherein the category is determined using a time interval between the network connection and the second network connection.

20. The network device of claim 11, wherein the monitored network activity includes one or more packets sent between other network devices in the network, and wherein the non-transitory computer-readable medium further includes instructions that, when executed by the one or more processors, cause the one or more processors to perform operations including:

identifying a packet from the one or more packets that can be used to conduct a scan of the network.

21. A computer-program product tangibly embodied in a non-transitory machine-readable storage medium, including instructions that, when executed by one or more processors, cause the one or more processors to:

configure a network device on a network with a particular network address, wherein the particular network address is unassigned before configuring the network device, wherein the network device uses the particular network address to present a decoy network device to the network, and wherein the network device uses the decoy network device to monitor network activity a network scan;

receive a first packet addressed to the particular network address;

determine a pattern of packets, and wherein the pattern of packets is determined using the first packet and the monitored network activity, and wherein the pattern of packets includes an arrangement of network addresses;

configure the network device with an additional network address, wherein the additional network address follows the particular network address in the arrangement of network addresses, and wherein the network device uses the additional network address to present a second decoy network device to the network;

receive a second packet addressed to the additional network address;

determine that the first packet and the second packet are associated with a scan of the network, wherein determining includes associating the first packet and the second packet with the pattern of packets;

configure one or more security settings for the network when the first packet and the second packet are determined to be associated with a scan of the network, wherein configuring the one or more security settings modifies one or more decoy network devices to gain more information about the scan of the network;

use the information gained about the scan of the network to determine one or more additional security settings; and transmit the one or more additional security settings, wherein, when the one or more additional security settings are received at a second network device on the network, the one or more security settings facilitate defending the network from a network threat associated with the scan of the network.

22. The computer-program product of claim 21, further comprising instructions that, when executed by the one or more processors, cause the one or more processors to:
generate a response packet for responding to the first packet; and
transmit the response packet onto the network.

23. The computer-program product of claim 21, further comprising instructions that, when executed by the one or more processors, cause the one or more processors to:
transmit contents of the first packet to a non-decoy network device on the network;
receive a response packet from the non-decoy network device; and
use the response packet to respond to the first packet.

24. The computer-program product of claim 21, further comprising instructions that, when executed by the one or more processors, cause the one or more processors to:
determine, using the monitored network activity, that the scan of the network has concluded; and
configure the network device to stop using the additional network address.

25. The computer-program product of claim 21, further comprising instructions that, when executed by the one or more processors, cause the one or more processors to:
receive data from a second network device configured to present decoy network devices, wherein the data describes one or more packets received by decoy network devices used by the second network device to monitor network activity; and
determine that the one or more packets are associated with the scan of the network.

26. The computer-program product of claim 21, further comprising instructions that, when executed by the one or more processors, cause the one or more processors to:
receive data from a non-decoy network device on the network, wherein the data describes one or more packets received by the non-decoy network device; and
determine, using the data, that a network connection was made to the non-decoy network device, wherein the network connection is associated with the scan of the network.

27. The computer-program product of claim 26, further comprising instructions that, when executed by the one or more processors, cause the one or more processors to:
determine a category for the network connection, wherein the category is determined using a network protocol associated with the network connection.

28. The computer-program product of claim 26, further comprising instructions that, when executed by the one or more processors, cause the one or more processors to:
determine a category for the network connection, wherein the category is determined using a port number associated with the network connection.

29. The computer-program product of claim 26, further comprising instructions that, when executed by the one or more processors, cause the one or more processors to:
determine that a second network connection was made to another network device on the network; and
determine a category for the network connection and the second network connection, wherein the category is determined using a time interval between the network connection and the second network connection.

30. The computer-program product of claim 21, wherein the monitored network activity includes one or more packets sent between other network devices in the network, and further comprising instructions that, when executed by the one or more processors, cause the one or more processors to:
identify a packet from the one or more packets that can be used to conduct a scan of the network.

* * * * *